United States Patent [19]

Foote, Jr. et al.

[11] Patent Number: 5,044,144

[45] Date of Patent: Sep. 3, 1991

[54] APPARATUS AND METHOD FOR FORMING AND LOADING A MAGAZINE FOR PREWOUND SPOOLS OF WEB MATERIAL

[75] Inventors: James C. Foote, Jr., York; Robert F. Allen, Spencerport; Paul E. Bailey, Caledonia; Dean B. Campbell, Webster; Thomas A. Cipolla, Rochester; William G. Hoyt, Churchville; Robert L. Huseby, Fairport; Lyndon R. Huttemann, Rochester; David H. Lancy, Rochester; William C. Lebbon, Rochester; Stephen M. Reinke, Rochester, all of N.Y.; Thomas E. Stark, North Fort Myers, Fla.; Joseph A. Watkins, Rochester, N.Y.

[73] Assignee: Eastman Kodak Company, Rochester, N.Y.

[21] Appl. No.: 622,985

[22] Filed: Dec. 6, 1990

[51] Int. Cl.⁵ .................. B65B 43/08; B23P 11/02; B23P 19/00

[52] U.S. Cl. .................. 53/456; 53/563; 29/773; 29/806

[58] Field of Search ............. 53/452, 456, 488, 430, 53/118, 563, 284; 29/773, 806, 450; 413/70, 71, 76

[56] References Cited

U.S. PATENT DOCUMENTS

| | | |
|---|---|---|
| 271,304 | 1/1883 | Boldt . |
| 585,635 | 6/1897 | Sleeper . |
| 698,066 | 4/1902 | Sleeper . |
| 1,063,918 | 6/1913 | Graham . |
| 1,246,437 | 11/1917 | Kruse . |
| 1,310,118 | 7/1919 | Greenfield et al. . |
| 1,955,949 | 4/1934 | Colton ............................ 226/80 |
| 2,215,844 | 9/1940 | VanSyckle ..................... 294/110 |
| 2,339,119 | 1/1944 | Thomas ........................... 226/85 |
| 2,476,996 | 7/1949 | Nebel ............................. 242/71 |
| 2,541,001 | 2/1951 | Vedder ........................... 226/83 |
| 2,626,581 | 1/1953 | Almgren et al. .............. 113/18 |
| 2,703,952 | 3/1955 | Perriguey ...................... 53/140 |
| 2,817,202 | 12/1957 | Lyon ............................... 53/330 |
| 2,940,232 | 6/1960 | Wallace et al. ................ 53/112 |
| 3,127,024 | 3/1964 | McPherson et al. ........... 214/1 |
| 3,198,570 | 8/1965 | Sines ............................. 294/113 |
| 3,238,699 | 3/1966 | Morton ........................ 53/284 X |
| 3,362,545 | 1/1968 | Rowe ............................. 214/1 |
| 3,466,845 | 9/1969 | Beekes et al. ................ 53/194 |
| 3,557,425 | 1/1971 | Scharf ........................... 29/200 |
| 3,585,704 | 6/1971 | Schroeder ..................... 29/275 |
| 3,586,258 | 6/1971 | Horlezerder ................. 242/197 |
| 3,668,824 | 6/1972 | Solomonov et al. .......... 53/330 |
| 3,724,162 | 4/1973 | Lorenzini et al. ............. 53/78 |
| 3,840,966 | 10/1974 | Reid et al. .................... 29/773 |
| 3,938,847 | 2/1976 | Peyton ........................ 294/110 |
| 3,945,584 | 3/1976 | Mangan ........................ 242/71 |
| 3,961,463 | 6/1976 | Dimond ........................ 53/306 |
| 4,080,711 | 3/1978 | Kawada et al. ............... 29/427 |
| 4,115,913 | 9/1978 | Moriya et al. ............. 29/773 X |
| 4,169,621 | 10/1979 | McGill ......................... 294/116 |
| 4,180,905 | 1/1980 | Klinkhammer et al. ...... 29/786 |
| 4,203,795 | 5/1980 | Pupp et al. ................ 53/563 X |
| 4,223,852 | 9/1980 | 242 ............................... 71.1/ |
| 4,301,640 | 11/1981 | Haas ............................. 53/478 |
| 4,317,323 | 3/1982 | Richards et al. .............. 53/563 |
| 4,436,777 | 3/1984 | Karpiloff .................. 53/563 X |
| 4,546,681 | 10/1985 | Owsen ............................ 82/38 |
| 4,614,019 | 9/1986 | Shimizu et al. ............ 29/809 X |
| 4,655,738 | 4/1987 | Jansson .................... 53/563 X |
| 4,728,137 | 3/1988 | Hames et al. .................. 294/88 |
| 4,924,419 | 5/1990 | McIntyre et al. ............ 364/551 |
| 4,974,316 | 12/1990 | Suzuki et al. ............. 29/773 X |

Primary Examiner—Horace M. Culver
Attorney, Agent, or Firm—Charles E. Snee, III

[57] ABSTRACT

An apparatus and method are disclosed for forming a very open shell (28) having axially extending lips (20c,20t) spaced sufficiently far apart to permit a prewound spool of web material (10) to be inserted radially, laterally into the very open form shell, after which the shell is closed and end caps (24) are installed. Apparatus are disclosed for forming the very open form shell (40), transferring the shell to a mechanism for applying end caps (48), inserting a prewound spool of web material (56) into the very open shell, positioning the spool accurately within the shell (780–856), closing the shell about the spool (58) and staking the end caps in place (60).

53 Claims, 43 Drawing Sheets

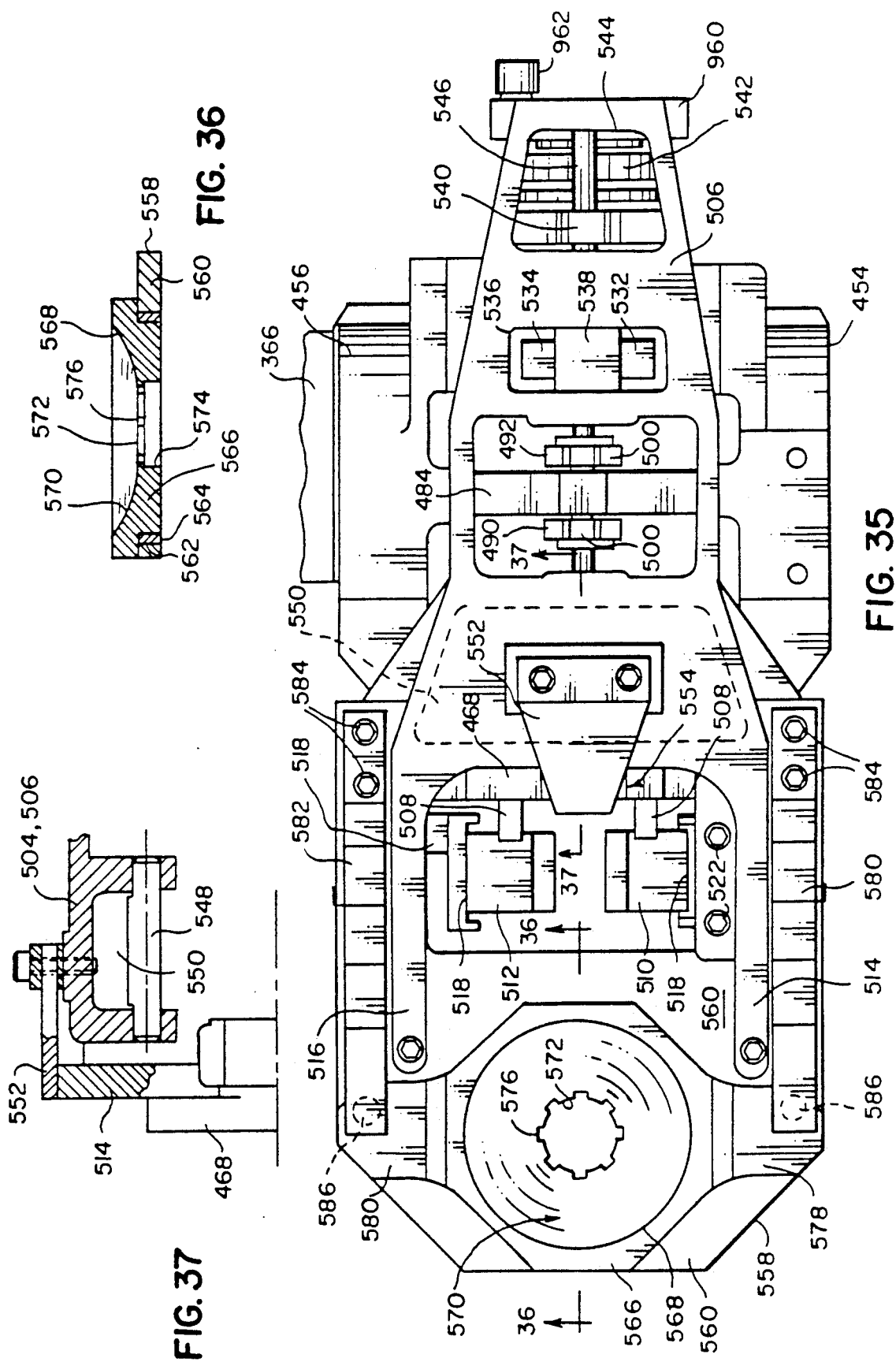

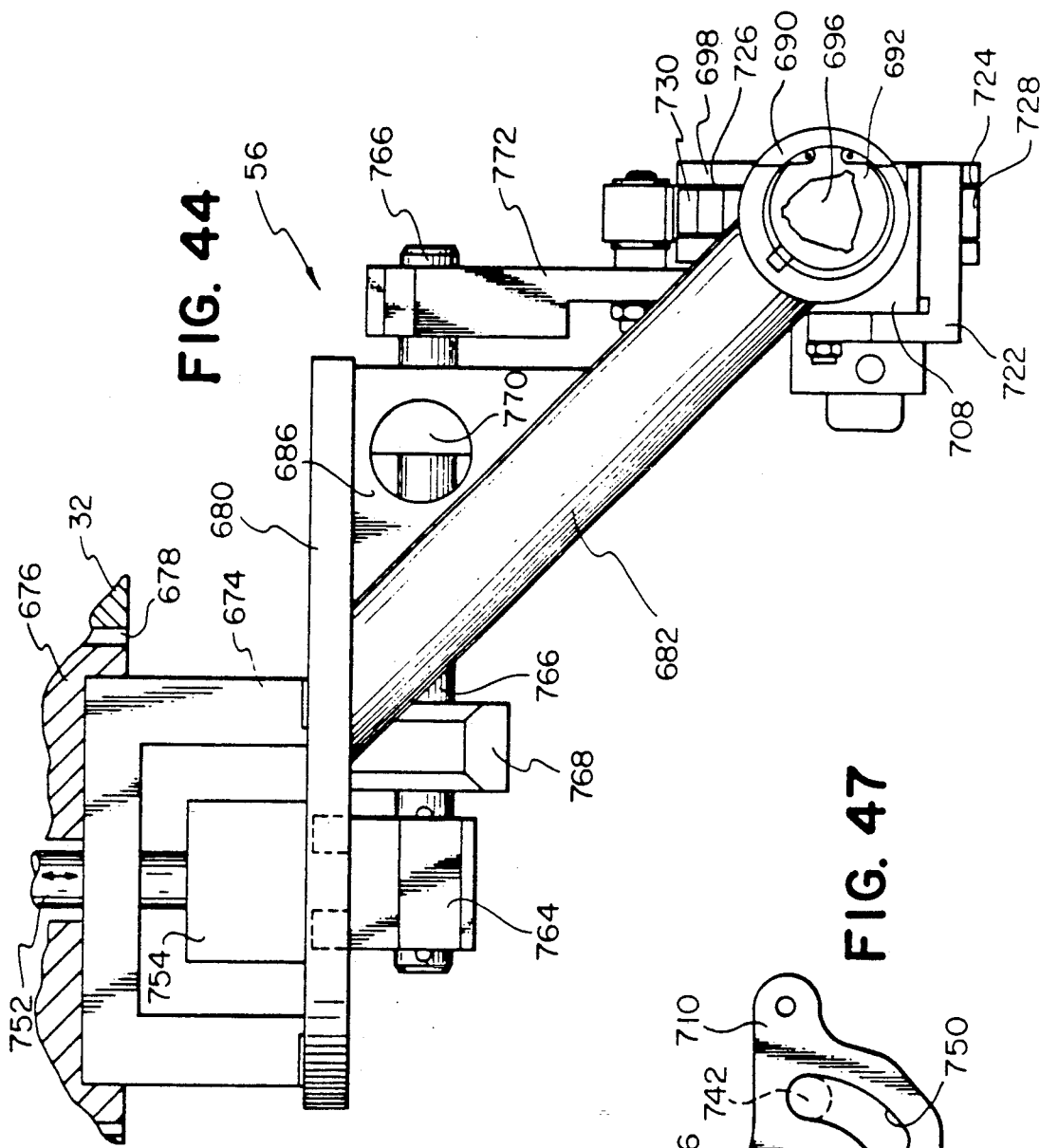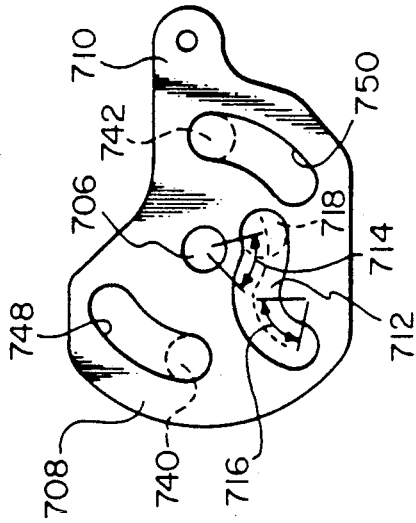

APPARATUS AND METHOD FOR FORMING AND LOADING A MAGAZINE FOR PREWOUND SPOOLS OF WEB MATERIAL

CROSS REFERENCE TO RELATED APPLICATIONS

This application is related to the following concurrently filed applications of: (1) Stephen M. Reinke, Robert F. Allen, Paul E. Bailey, Thomas A. Cipolla, James C. Foote, Jr. and Robert L. Huseby and Thomas E. Stark for Apparatus and Method for Forming a Very Open Shell for Lateral Loading of Product; (2) Stephen M. Reinke, James C. Foote, Jr., Thomas A. Cipolla, William G. Hoyt, Lyndon R. Huttemann and Joseph A. Watkins for Apparatus and Method for Removing a Very Open Shell from a Forming Mandrel; (3) James C. Foote, Jr. and Lyndon R. Huttemann for Apparatus and Method for Applying End Caps to Cylindrical Shells; (4) James C. Foote, Jr. for Apparatus and Method for Transferring a Spool of Web Material; (5) James C. Foote, Jr. and William C. Lebbon for Apparatus for Positioning a Spool or Similar Object; (6) David H. Lancy, James C. Foote, Jr., William G. Hoyt, Stephen M. Reinke and Joseph A. Watkins for Apparatus and Method for Closing and Plastically Forming a Non-Cylindrical Shell for a Container; and (7) William C. Lebbon for Apparatus for Staking End Caps onto a Cylindrical Shell.

DESCRIPTION

1. Technical Field

The present invention concerns methods and apparatus for forming and loading magazines for prewound spools of web material. More particularly, the invention concerns such methods and apparatus which are suitable for use with photographic film or similar sensitized web materials.

2. Background Art

A considerable variety of methods and apparatus have been developed over the years for winding and packaging strips of web material. For example, U.S. Pat. No. 2,940,232 discloses such an apparatus for use with photographic film in which strips of film are wound on spools, after which the wound spools are inserted axially into previously formed cylindrical magazine shells to which one end cap has already been applied, the shells having axially extending lips through which the leader of the film strip extends in the familiar manner. The cap for the open end of the shell is later applied. U.S. Pat. No. 3,466,845 discloses a multistation packaging apparatus in which a bendable chipboard blank is pressed into an elongated arcuate shape having an axially extending slot through which a wound core of product can be inserted, after which end caps are applied. U.S. Pat. No. 3,586,258 shows an apparatus for winding photographic film in which a previously formed magazine is provided which has axially extending lips. The spool is automatically oriented within the magazine to permit a guide tongue to insert film through the lips and into engagement with the core of the spool, after which the film is wound onto the spool within the magazine. U.S. Pat. No. 4,080,711 discloses another apparatus in which the film is inserted into an already complete magazine and wound onto the spool within the magazine. U.S. Pat. Nos. 4,115,913 and 4,614,019 show somewhat different types of methods and apparatus for winding film and loading prewound spools into magazines, in which the magazine shells are preformed with a rather wide axially extending slot, to facilitate axial insertion of a prewound spool of film, after which the shells are closed and end caps are applied.

While automatic packaging apparatus and methods of the types just discussed have achieved a measure of acceptance and success over the years, a need has continued to exist for apparatus and methods suitable for still higher rates of production, without sacrificing quality of the finished package or damaging the product during the packaging process. Particularly for winding and packaging photographic films and other sensitized materials which must be handled in near total darkness, a need has existed for such more productive equipment which would require a minimum of operator intervention during use, thus leading to still further improved rates of production.

SUMMARY OF THE INVENTION

A primary objective of the invention is to provide a method and apparatus for packaging prewound spools of photographic film which will produce film magazines of improved quality and at higher speeds than has been possible, but without requiring frequent operator intervention to keep the apparatus functioning optimally.

Another objective of the invention is to provide an improved method and apparatus for forming a very open shell for such magazines which can be loaded laterally between its film withdrawal lips rather than axially through one of its open ends, but which can be closed to a good right circular cylinder with minimal constraints during closing, the cylinder being suitable for installation of circular end caps.

Yet another objective of the invention is to provide an improved apparatus for transferring such a very open shell to a location for assembly with a prewound spool and application of end caps.

A still further objective of the invention is to provide an improved apparatus for transferring a prewound spool from a spooling apparatus to a location for insertion into such a very open shell.

Still another objective of this invention is to provide an apparatus for closing such a very open shell about a prewound spool to form a good right circular cylinder, but without scratching or abrading the exterior surface of the shell.

Another objective of the invention is to provide an improved mechanism for applying and staking end caps to the shell of the magazine.

These objectives are given only by way of illustrative examples; thus, other desirable objectives and advantages inherently achieved by the disclosed apparatus and method of the invention may occur or become apparent to those skilled in the art. Nonetheless, the scope of the invention is to be limited only by the appended claims.

In accordance with the method of the invention, there are provided a prewound spool; a substantially rectangular metal blank for the side wall of a substantially cylindrical magazine for the spool, the blank having an opposed pair of strip withdrawal lips and an opposed pair of end edges; a pair of substantially circular end caps for the magazine; and a mandrel having an exterior surface about which the blank may be formed. The exterior surface is uniquely configured in accordance with the invention so that when the blank is formed about the exterior surface from near one strip withdrawal lip to near the other and the blank is then removed from the mandrel, the blank springs to a very open form in which the strip withdrawal lips are spaced sufficiently far apart to permit the prewound spool to pass radially, laterally between the strip withdrawal lips, rather than axially through one of the open ends of the very open shell. The blank is formed about the mandrel and then removed. The prewound spool is then laterally inserted between the strip withdrawal lips and the very open shell is then closed about the spool, after which the end caps are applied and staked in place. The spool may have a trailing end which projects outwardly between the strip withdrawal lips after the shell is closed; however, the method of the invention is also applicable to spools whose trailing end is contained within the magazine after the shell is closed.

The method of the invention also is useful for forming substantially cylindrical containers for products other than spools of web material. In such other applications, the exterior surface of the mandrel is configured so that after forming the blank will spring open to a noncircular form having spaced side edges, after which the product can be inserted laterally or axially, the shell closed about the product and the end caps applied.

The apparatus according to the invention comprises a multistation system for forming magazine shells, loading them with prewound spools of web material, closing the shells about the product and applying the end caps. A source of prewound spools, which may be of any conventional type, is provided, along with a source of substantially rectangular blanks of the type previously discussed and a source of end caps. A forming mandrel is used which has an exterior surface of the type previously described. Preferably, means are provided for roll forming the blanks about the mandrel from near one strip withdrawal lip to near the other; however, other techniques for forming about the mandrel may be used. For example, the very open shell may be formed by several die segments that move in radially around the mandrel, by elastomeric dies that engage the very open form shell and yield as the shell is wrapped about the mandrel or by inflatable tools which form the shell about the mandrel. Means are also provided for removing the very open shell from the mandrel, for laterally inserting a prewound spool into the very open shell, for closing the shell about the prewound spool and for applying end caps to the closed shell.

In the preferred embodiment of the invention, the means for forming the blank comprises a rotatable forming dial and at least one frame attached to the forming dial for supporting the mandrel. In the illustrated embodiment, four mandrels are provided on the forming dial. Means are provided for positioning a metal blank on the mandrel prior to forming and for clamping one end of the blank against the mandrel. In the preferred apparatus for forming, a roller contacts the blank and rolls it around the mandrel to form the very open shell, after which the shell is clamped at its other end against the mandrel. At a shell removal station, the mandrel and clamped shell are moved essentially parallel to the axis of rotation of the forming dial to a position where the mandrel and shell enter the fixed claws of a nest fixture of a shell removal mechanism. The clamps on the shell are then released and the mandrel is withdrawn. The shell removal mechanism is mounted on an adjacent assembly dial and comprises at least one transfer arm pivotably connected to the assembly dial. The fixed claws of the mechanism are mounted on this transfer arm. Upon rotation of the assembly dial, the transfer arm rotates away from the shell removal station and positions the very open shell within the means for applying end caps.

The fixed claws of the shell removal mechanism are spaced axially somewhat less than the length of the very open shell and have aligned openings through which the mandrel and the shell can pass and within which the very open shell is held after its release from the mandrel. To facilitate alignment with the mandrel and with the means for applying end caps, the support for the fixed claws is provided with a substantially universal attachment to the transfer arm, thus permitting the support to move enough to account for misalignments of the apparatus. To pivot the transfer arm away from the shell removal station, a stationary cam track is provided around the axis of rotation of the assembly dial and a cam follower attached to the transfer arm is engaged with the stationary cam track as the assembly dial rotates.

The means for applying end caps preferably comprises at least one pair of relatively movable jaws mounted on the assembly dial, the jaws being positioned one opposite each end of the very open shell as held within the jaws of the shell removal mechanism. In the illustrated embodiment, eight pairs of such jaws are arranged around the assembly dial for receiving very open shells in sequence from the first dial. Means are located on each jaw for holding one end cap, such as a recess in an anvil made of magnetic material. Adjacent the assembly dial is provided a mechanism for placing end caps in each of the means for holding. Finally, a means for closing the jaws to apply the end caps is provided. Preferably, the movable jaws are constrained to parallel movement toward and away from each other to ensure that the end caps are properly installed. A rotatable crank shaft is provided between the jaws and is connected to the jaws by oppositely movable connecting rods; so that, rotation of the crank shaft causes the jaws to open and close.

End caps are placed within the jaws of the means for applying them by a mechanism which comprises a pair of cap delivery wheels rotatably mounted next to the assembly dial, each delivery wheel comprising a plurality of circumferentially spaced pockets for receiving end caps, means for feeding end caps into the pockets, and a frame mounted for rotation adjacent to the second dial. A pair of cap transfer arms are pivotably mounted to the frame, each arm having an outer end selectively positionable upon rotation of the frame into proximity either with one of the peripheral pockets or with one of the means for holding end caps in the means for applying end caps. Means are provided for selectively pivoting the cap transfer arms relative to the frame, toward or away from the peripheral pockets or toward or away from the means for holding.

Means are provided for laterally inserting a prewound spool into a very open shell held within the means for applying end caps. A rotatable frame is positioned near the magazine assembly station of the apparatus. A mounting block is slidably mounted on the rotatable frame and pivotably supports a pair of gripping fingers having surfaces for engaging and holding a prewound spool. A cam plate is mounted for rotation about an axis on the mounting block and includes first and second arcuate slots whose centerline distance from the axis decreases from one end to the other of the slots; and a third sinuous slot having a first portion whose centerline distance from the axis is constant and a second portion whose centerline extends away from the axis. Cam followers mounted on the gripping fingers extend into the first and second slots; and a further cam follower mounted on the rotatable frame extends into the third slot. Means are provided for initially rotating the cam plate to cause the gripping fingers to open or close and for then translating the mounting plate relative to the rotatable frame, as the cam followers move through their respective slots. When the prewound spool comprises a trailing end of the srtip projecting outwardly therefrom, means are attached to the mounting block for holding the trailing end to prevent unwinding of the strip during transfer of the spool.

To hold the prewound spool in proper position for application of end caps to the surrounding shell, skewer means are located adjacent the assembly dial for extending through bores in the means for applying end caps and into bores in the hubs of the prewound spools. The skewer means comprise a frame defining an opening through which the movable jaws of the means for applying end caps can pass to reach the magazine assembly station. First and second skewers are positioned on the inboard and outboard side, respectively, of this opening and are movable toward each other to pass through the end caps held by the means for applying end caps and engage the spool and away from each other after the shell has been closed about the spool and the end caps have been installed. To move the skewers in this fashion, a crank member is rotatably mounted to the frame of the skewer means, the crank having first and second oppositely eccentric throws. A U-shaped or dog leg link is pivotably mounted at one end to the first throw and pivotably mounted at the other end to the outboard skewer, the U-shaped link extending around the opening through the frame. A cam plate is mounted to the inboard skewer and provided with a cam slot which extends transverse to the direction of movement of the inboard skewer. A cam follower is mounted on the second throw and extended into the cam slot, whereby rotation of the crank member causes the inboard and outboard skewers to move toward and away from each other. In a preferred embodiment, the cam slot has a portion having a radius of curvature equal to that of the path of movement of the cam follower, whereby the inboard skewer dwells while the outboard skewer continues to move, as the cam follower moves through such portion of the cam slot.

The very open form shell is closed about the prewound spool by a pair of closure jaws having concave surfaces for contacting the exterior surface of the very open shell between its strip withdrawal lips. The closure jaws are placed about the very open shell by a mechanism comprising a pivotable arm rotatably mounted in proximity to the assembly dial, the closure jaws being mounted on the pivotable arm. First and second pulleys are mounted for rotation on and relative to the pivotable arm and are connected by a belt. Means are provided for rotating one of the pulleys to cause the other to rotate. A linkage connected to the other pulley causes the closure jaws to open and close. The means for rotating one of the pulleys preferably comprises a radially extending arm operatively connected to the first pulley and a connecting rod, one end of which is pivotably connected to the radially extending arm and the other end of which is connected to a crank for raising and lowering such assembly. Where the connecting rod is connected to the radially extending arm, the pivot point between and connecting rod and the radially extending arm preferably coincides with the axis of rotation of the pivotable arm when the closure jaws are open, thus preventing movement of the jaws when the pivotable arm moves between its retracted and extended positions.

Once the end caps have been applied to the closed shell, the assembly dial rotates to the end cap staking station according to the invention. The means for holding the end caps comprises a bore aligned with each end cap. A frame is positioned adjacent to the assembly dial and a slide rail is mounted on the frame and extended essentially parallel to the axis of rotation of the assembly dial. A pair of end cap staking mechanisms are mounted for reciprocating movement on the slide rail on opposite sides of the means for applying end caps. Each such staking mechanism comprises a base plate; a mounting flange attached to the face plate and extended toward the axis of rotation of the assembly dial; a quill shaft supported by the mounting flange and extended toward the bore in the means for holding end caps, the quill shaft having a free end. A pivot ring is mounted on the free end and a plurality of elongated staking fingers are pivotably supported between their ends by and arranged around the pivot ring. An outwardly flaring portion is provided on the end of each staking finger closer to the bore in the means for holding, the flaring portion being sized to pass through the bore to engage the end cap. A cam follower is mounted to the opposite end of each staking finger and engaged with a cam plate rotatably mounted to the mounting flange. Means are provided for rotating the cam plate to cause the outwardly flaring portions to move radially inward and outward. Finally, the staking mechanisms can be moved toward the means for holding until the flared portions extend through the bore in position to engage the end cap and away from the means for holding after the end cap has been staked in place.

The cam plate is rotated by a mechanism comprising a spline shaft mounted on the frame essentially parallel to the slide rail. A spline bearing assembly is mounted on the spline shaft for sliding movement along and rotation with the spline shaft. A link is pivotably connected between the spline bearing assembly and the cam plate, whereby rotation of the spline shaft causes the cam plate to rotate to move the staking fingers. To rotate the spline shaft, a crank lever is attached to the spline shaft and a rolling diaphragm pneumatic cylinder assembly having a rod end is pivotably attached to the crank lever. A gimbal mount supports the cylinder. Finally, cam actuated means are provided for raising and lowering the cylinder assembly.

BRIEF DESCRIPTION OF THE DRAWINGS

The foregoing and other objectives, features and advantages of the invention will be apparent from the following more particular description of the preferred embodiments of the invention, as illustrated in the accompanying drawings.

FIG. 35 shows a top view of the mechanism of FIG. 32.

FIG. 36 shows a sectional view taken along line 36—36 of FIG. 35.

FIG. 37 shows a sectional view taken along lines 37—37 of FIG. 35.

FIG. 44 shows a top plan view of the mechanism of FIG. 43.

FIG. 47 shows a plan view of the cam plate used in the mechanism of FIG. 43.

DESCRIPTION OF THE PREFERRED EMBODIMENTS

Figure 1:
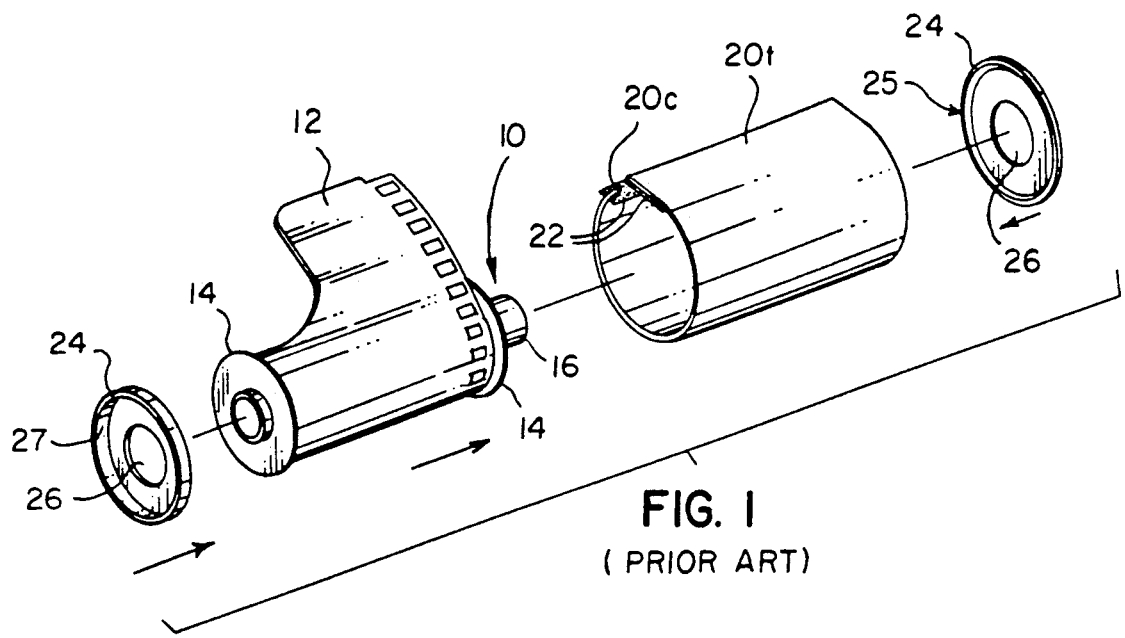
FIG. 1 shows an exploded perspective view of a known type of magazine for photographic film, illustrating one prior art technique for inserting a prewound spool axially into the shell of the magazine and applying the end caps.

The following is a detailed description of the preferred embodiments of the invention, reference being made to the drawings in which the same reference numerals identify the same elements of structure in each of the several Figures.

PRIOR ART METHOD

FIG. 1 illustrates a known process for loading photographic film magazines. A spool 10 has been used which comprises a central core, not illustrated, on which is wound a strip 12 of photographic film. Spool 10 includes a pair of end flanges 14 from which extend hollow axial hubs 16. A preformed metal shell 18 has been used which comprises a pair of axially extending lips 20c, 20t between which strip 12 is withdrawn from or wound back into the magazine in use by the consumer. These axially extending lips typically are different in geometry, lip 20c being folded or crimped back on itself and lip 20t being essentially tangent to the cylindrical preformed shell 18. Typically, preformed shell 18 has been formed from a substantially flat rectangular blank, not illustrated, in which lips 20c, 20t have previously been formed. To prevent leakage of light into the magazine, lips 20c and 20t have for many years been covered with a lightlock material 22 such as black velvet or plush which firmly but gently engages the surfaces of the film and prevents light leakage into the magazine. The ends of the magazine are closed by a pair of annular end caps 24, each having an aperture 26 for rotatably receiving hubs 16 and a circumferentially extending groove and flange for fixedly engaging the end edges of preformed shell 18. Such magazines have been assembled by inserting the prewound spool of film axially into preformed shell 18 and then applying and staking end caps 24. Caps 24 are provided with axially and peripherally extending grooves 25 which receive the end edges of shell 18. On the outside surface of caps 24, the walls of groove 25 define an axially and peripherally extending flange 27 whose radially inner surface is deformed outwardly to stake the end cap to shell 18. While this spooling and assembling process is reliable and has been rather widely used, the apparatus for practicing the process tends to be limited in speed.

BASIC METHOD OF THE INVENTION

Figure 2:
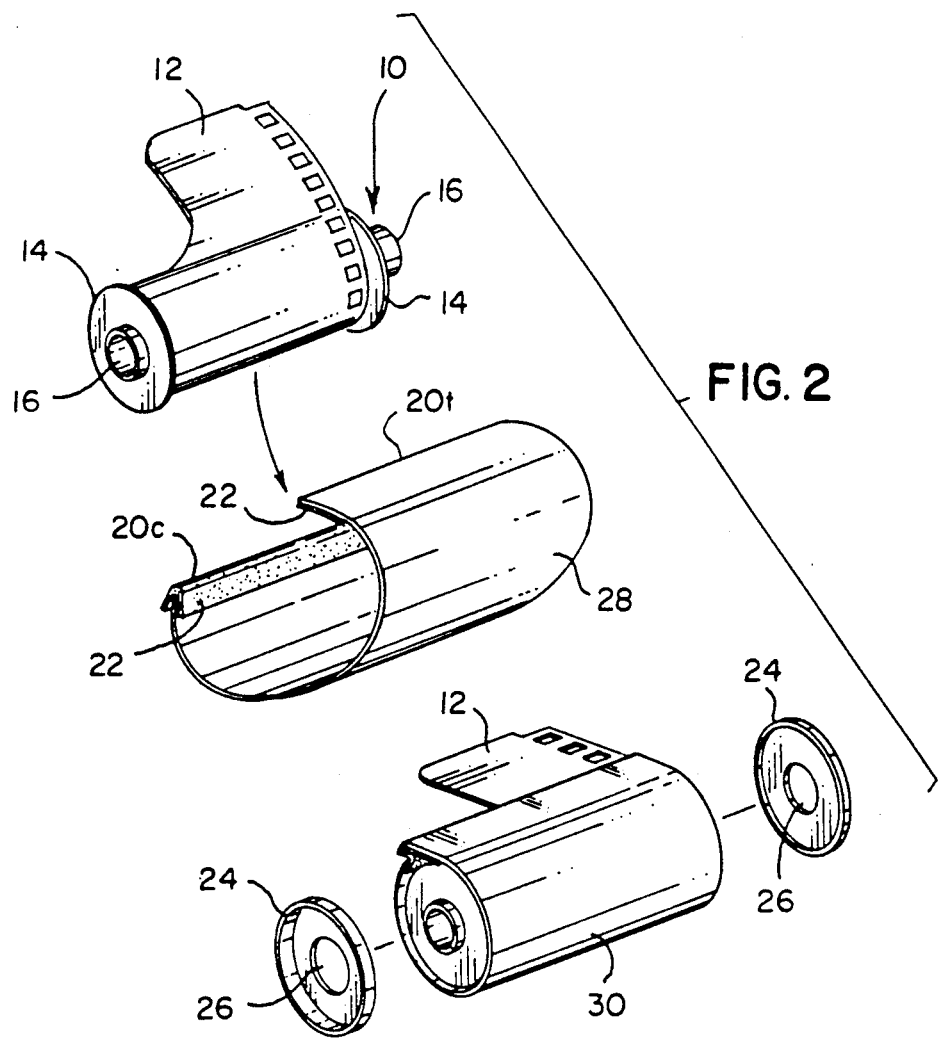
FIG. 2 shows an exploded perspective view of a known type of magazine for photographic film, illustrating the method of the present invention for inserting a prewound spool radially, laterally into the shell of the magazine and applying the end caps.

FIG. 2 illustrates how a magazine is assembled in accordance with the method and apparatus of the present invention. In this instance, instead of the essentially cylindrical preformed shell 18 used in the past to permit axial insertion of the prewound spool, a very open preformed metal shell 28 is provided. Very open shell 28 is configured such that axially extending lips 20c, 20t are spaced far enough apart to permit the prewound spool to be inserted laterally or radially into shell 28. Then, very open shell 28 is closed about the prewound spool to a substantially cylindrical configuration 30 with the lead end of strip 12 captured between lips 20c, 20t. Then end caps 26 are applied and staked to complete the magazine. In the remainder of this specification, the process and apparatus will be described for forming the very open shell 28, inserting a prewound spool therein, closing the shell and applying the end caps.

OVERALL OPERATION

Figure 3:
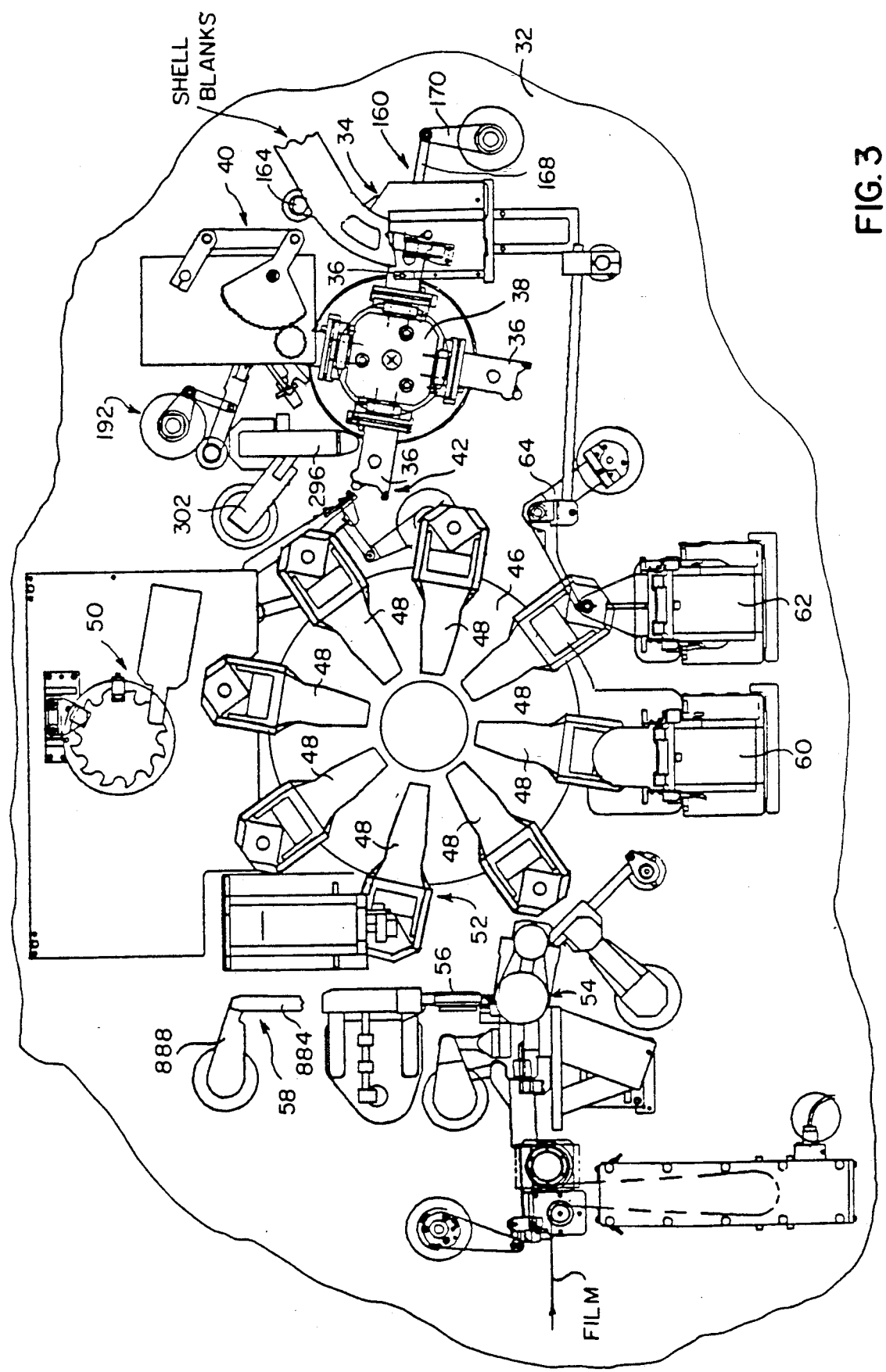
FIG. 3 shows a simplified schematic front elevation view of a synchronous film spooling and packaging apparatus according to the invention.

FIG. 3 illustrates the overall layout of the apparatus according to the invention. A rigid, vertically standing face plate 32 is preferred to provide a mount for the components of the invention; however, face plate 32 may be oriented differently or replaced with a structural framework without departing from the scope of the invention. A shell blank feeding mechanism 34 receives substantially flat, rectangular metal blanks to be formed into the cylindrical side wall of the completed magazine, each blank having been previously provided with lips 20c, 20t and lightlock strips 22. The shell blanks are fed one at a time to sequentially presented forming mandrels mounted on mandrel carriers 36 which in turn are mounted on a first forming dial 38 which rotates intermittently to index mandrel carriers 36 from position to position. As forming dial 38 is indexed, each mandrel carrier 36, having received a shell blank from feeding mechanism 34, is presented to a forming station 40 where very open shell 28 is formed about the mandrel. As forming dial 38 is indexed again, each mandrel carrier, with very open shell 28 formed about its mandrel, is presented to a shell removal station 42 where very open shell 28 is removed from the mandrel by a shell removal mechanism 44, FIGS. 20 to 25, mounted on an adjacent assembly dial 46.

As assembly dial 46 is indexed away from removal station 42, removal mechanism 44 is rotated by a cam and follower to position very open form shell 28 between the movable jaws of one of a plurality of end cap applying mechanisms 48 also mounted on dial 46. Then when dial 46 has stopped, an end cap placing mechanism 50 transfers a pair of end caps to magnetic holders on the anvils of end cap applying mechanism 48 between which very open shell 28 has been positioned.

Assembly dial 46 continues to index until a magazine assembly station 52 is reached, where a prewound spool will be inserted.

Figure 48:
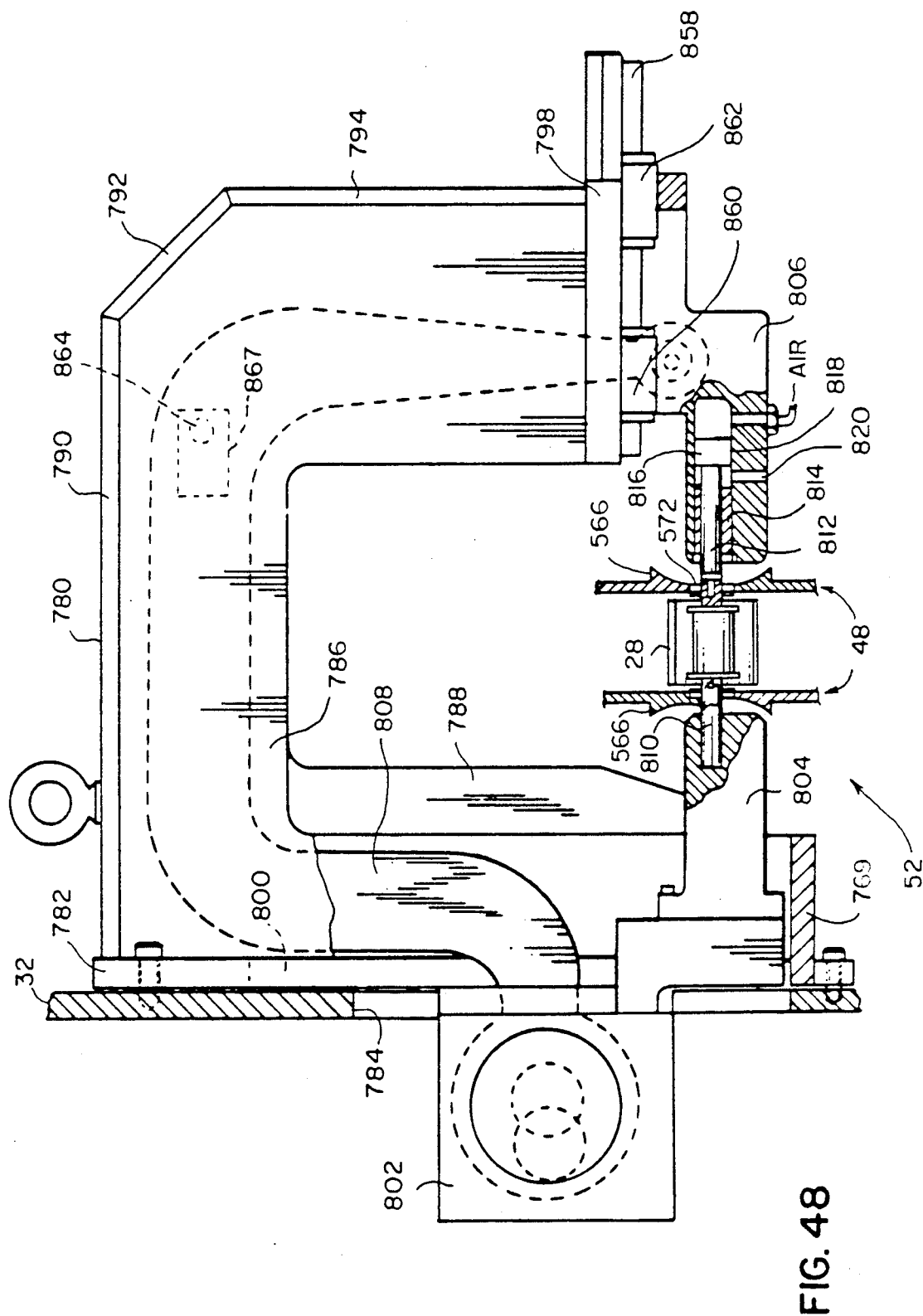
FIG. 48 shows a side elevation view, partially fragmentary and partially in section, of the station of the apparatus of FIG. 3 at which prewound spools are inserted radially, laterally into the roll formed shells, after which skewers are inserted, the very open form shell is closed and the end caps are installed.

While the overall operations described in the preceding paragraphs are taking place, empty spools are provided to a spool winding station 54, which is described in copending, commonly assigned application Ser. No. 595,130. Once a spool has been wound, it is picked up and swung up into the waiting very open shell 28 at assembly station 52, by a wound spool transfer mechanism 56. To hold the spool steady during subsequent operations, a pair of skewers, not visible in FIG. 3 but shown in FIG. 48, are then inserted through openings in the jaws of end cap applying mechanism 48 and apertures 26 of end caps 24, into the hollow hubs 16 on the spool. A shell closing mechanism 58, shown only fragmentarily in FIG. 3 but in detail in FIGS. 53 to 57, is then extended to surround very open shell 28 and close it about the prewound spool. Wound spool transfer mechanism 56 is then withdrawn and end cap applying mechanism 48 is actuated to close its jaws and apply end caps 24 to the now cylindrical end edges of the shell. Shell closing mechanism 58 and the pair of skewers are then withdrawn to permit assembly dial 46 to index to end cap staking station 60 where end caps 24 are staked into firm engagement with the cylindrical walls of the completed magazine. Assembly dial 46 then indexes to a magazine removal station 62 where the jaws of end cap applying mechanism 48 are opened and the completed magazine is removed by a magazine removal mechanism 64.

SHELL FEEDING AND ROLL FORMING STATIONS 34,40

Figure 4:
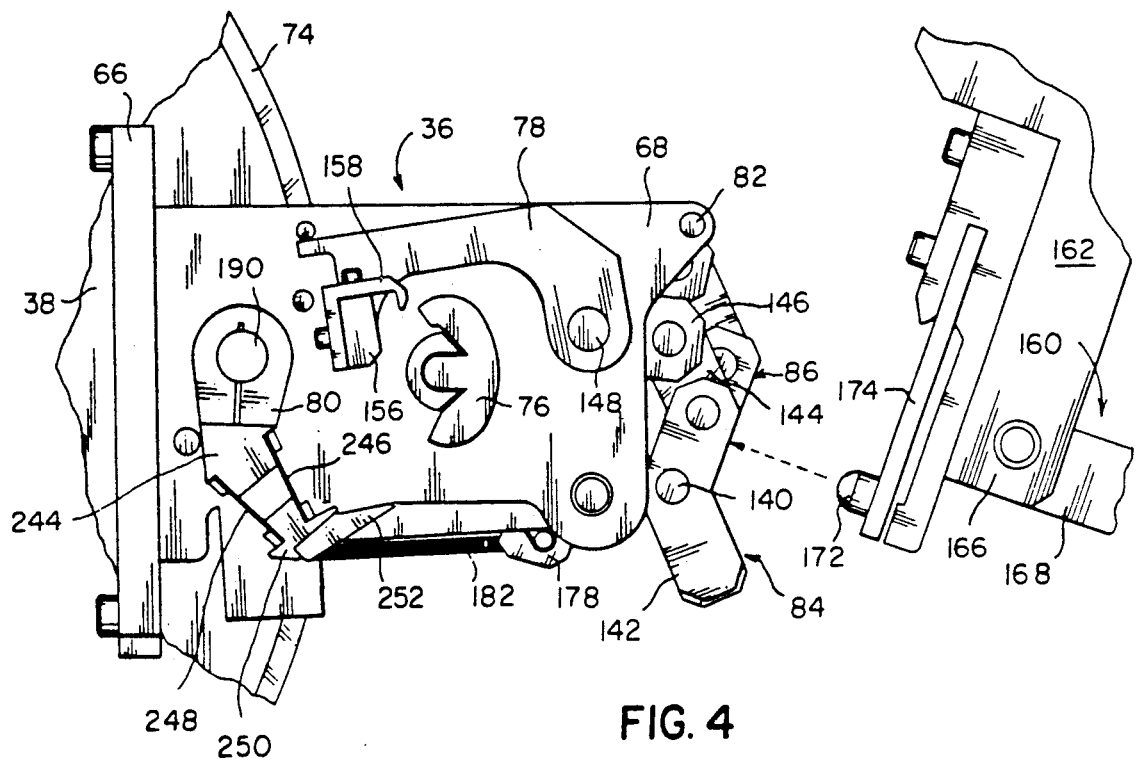
FIG. 4 shows a fragmentary front elevation view of the apparatus of FIG. 3, illustrating the mandrel used to form a shell for a film magazine in accordance with the invention.
Figure 5:
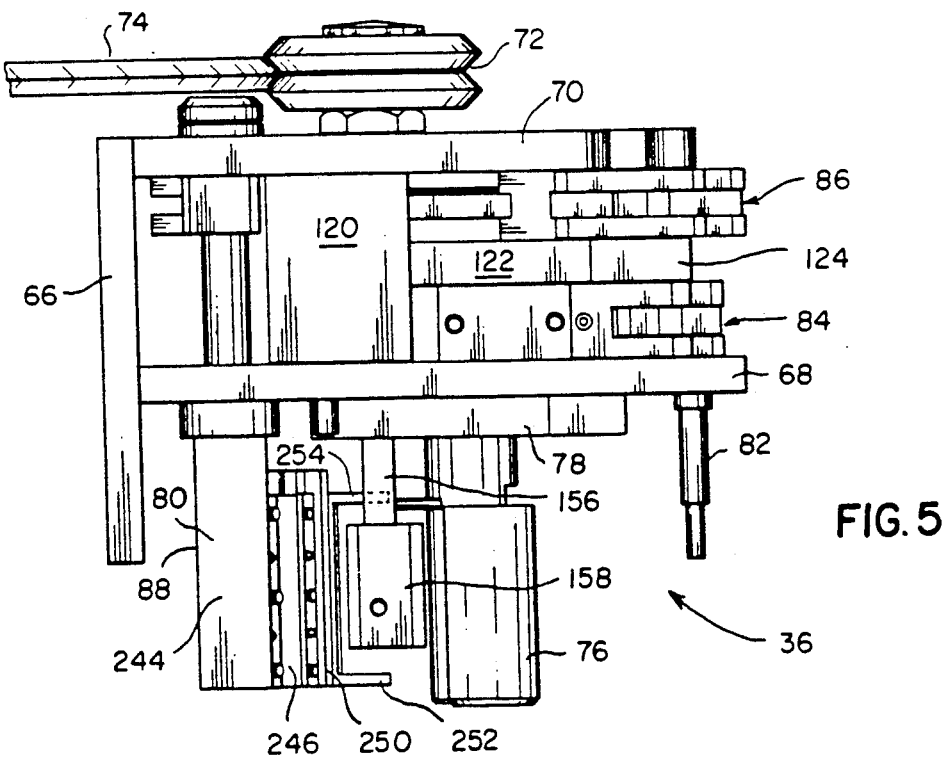
FIG. 5 shows a top plan view of a portion of the apparatus of FIG. 4.
Figure 6:
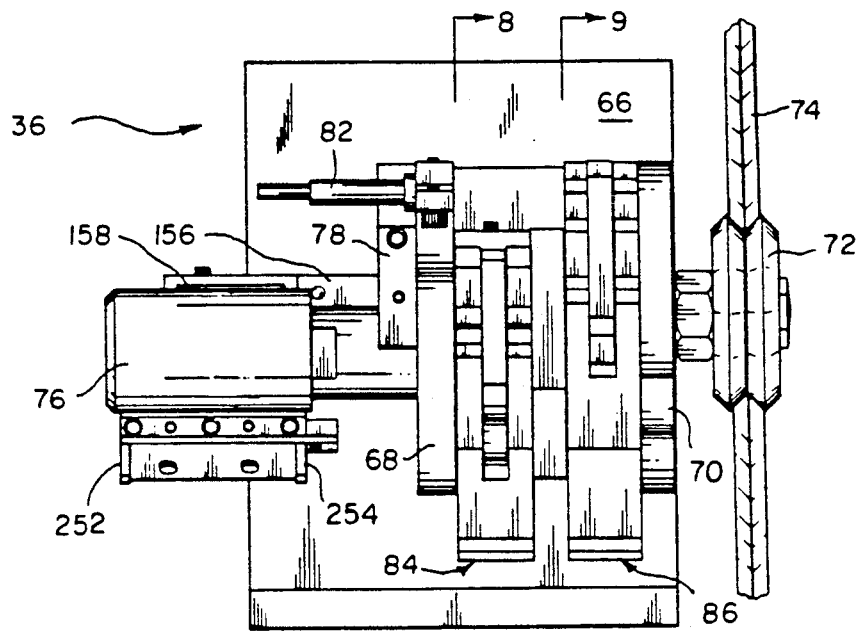
FIG. 6 shows a side elevation view of the apparatus of FIG. 4, taken from the right side as viewed in FIG. 4.

FIGS. 4, 5 and 6 show front, top and right side views of one of mandrel carriers 36 as positioned for delivery of a substantially flat, metal shell blank. Each mandrel carrier 36 is mounted on forming dial 38 via a carriage, not shown in FIGS. 4, 5 and 6, which permits the mandrel carrier to be moved in and out of the plane of FIG. 4, as will be discussed in greater detail with regard to FIGS. 20, 21 and 22. Each mandrel carrier 36 comprises a base plate 66 from which extend radially a pair of front and rear side plates 68, 70. On the rear surface of side plate 70 is mounted a grooved guide wheel 72 which engages a circular guide track 74 fixed to face plate 32 behind dial 38, to axially position each mandrel carrier 36 as forming dial 38 rotates from position to position. On the front surface of side plate 68 are mounted a fixed roll forming mandrel 76, a first rotatable clamping arm 78, a second rotatable clamping arm 80 and a stop pin 82 for the shell blank. Between side plates 68, 70 are located over-center toggle linkages 84 for rotating clamping arm 78 to initially clamp lip 20c of a shell blank against mandrel 76 prior to and during roll forming, and 86 for rotating clamping arm 80 to subsequently clamp lip 20t of the rolled shell blank against mandrel 76 after roll forming.

Figure 7:
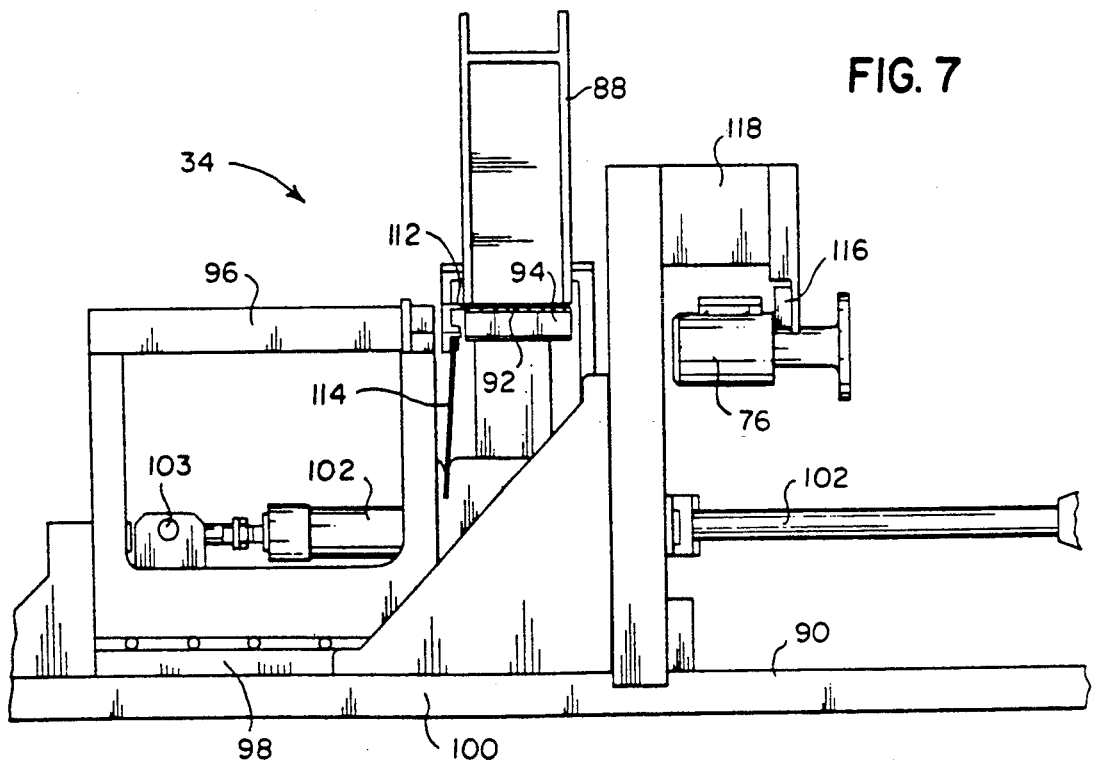
FIG. 7 shows a side elevation view of the apparatus for delivering metal blanks to the forming mandrel in accordance with the invention, taken from the right side as viewed in FIG. 3.
Figure 10:
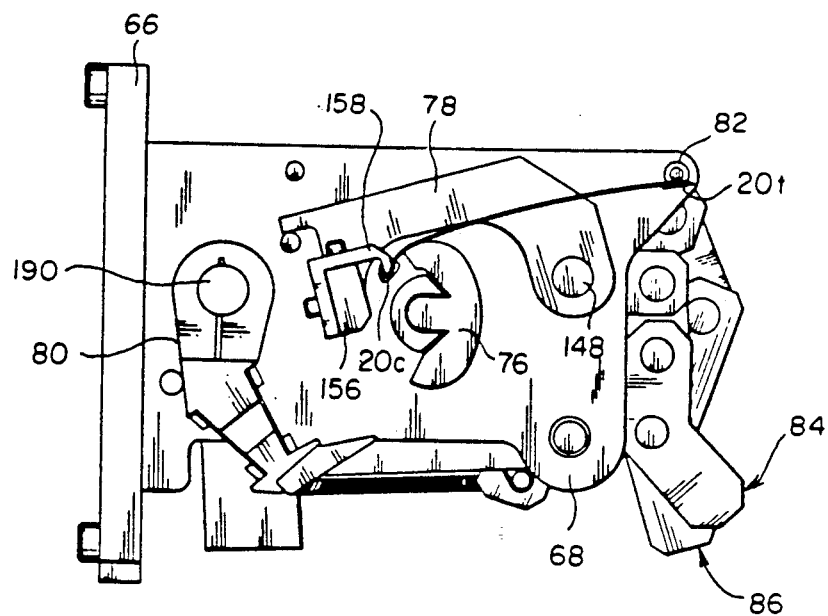
FIG. 10 shows the apparatus of FIG. 4 after a metal blank has been delivered to the mandrel and clamped in place.

FIG. 7 illustrates schematically the shell blank feeding mechanism 34 used to present a metal shell blank to mandrel 76 for roll forming. A supply of such blanks is maintained by the operator in a gravity feed chute 88 mounted on a frame member 90 attached to face plate 32. The lowermost blank 92 is withdrawn from chute 88 by a magnet 94 and positioned in a plane tangent to the upper edge of mandrel 76 as viewed in FIG. 4. The upper surface of magnet 94 is located in this plane and magnet 94 is supported on a frame 96 which is mounted on a slide 98 supported by a frame member 100 attached to face plate 32. To deliver blank 92 to mandrel 76, frame 96 is pulled along slide 98 by an actuator rod 102 which is pivoted at 103 to frame 96 and may be oscillated back and forth by a conventional rotating crank mechanism, not illustrated. As blank 92 slides onto the upper surface of mandrel 76, magnet 94 passes in front of mandrel 76, as viewed in FIG. 7. Blank 92 is prevented from rearward movement by a pair of positioning fingers 112, only one of which is visible in FIG. 7, which contact the trailing edge of blank 92 during movement and which are supported on a leaf spring 114 attached to frame 96. When frame 96 has reached the limit of its travel, the leading edge of blank 92 contacts a stop 116 supported by an arm 118 of frame 100. In this position, fingers 112 are biased against the trailing edge of the blank to hold it against stop 116. The use of leaf spring 114 makes it possible to use a continuously rotating crank mechanism, since the flexibility of the spring provides a brief dwell to hold the blank in place while the frame 96 stops and reverses direction. Rotatable clamping arm 78 is then actuated to clamp lip 20c against mandrel 76, which causes the end of the blank including lip 20t to swing up into contact with stop pin 82, as shown in FIG. 10. Frame 96 is then returned to the position shown in FIG. 7, where the next blank is drawn onto magnet 94.

Figure 8:
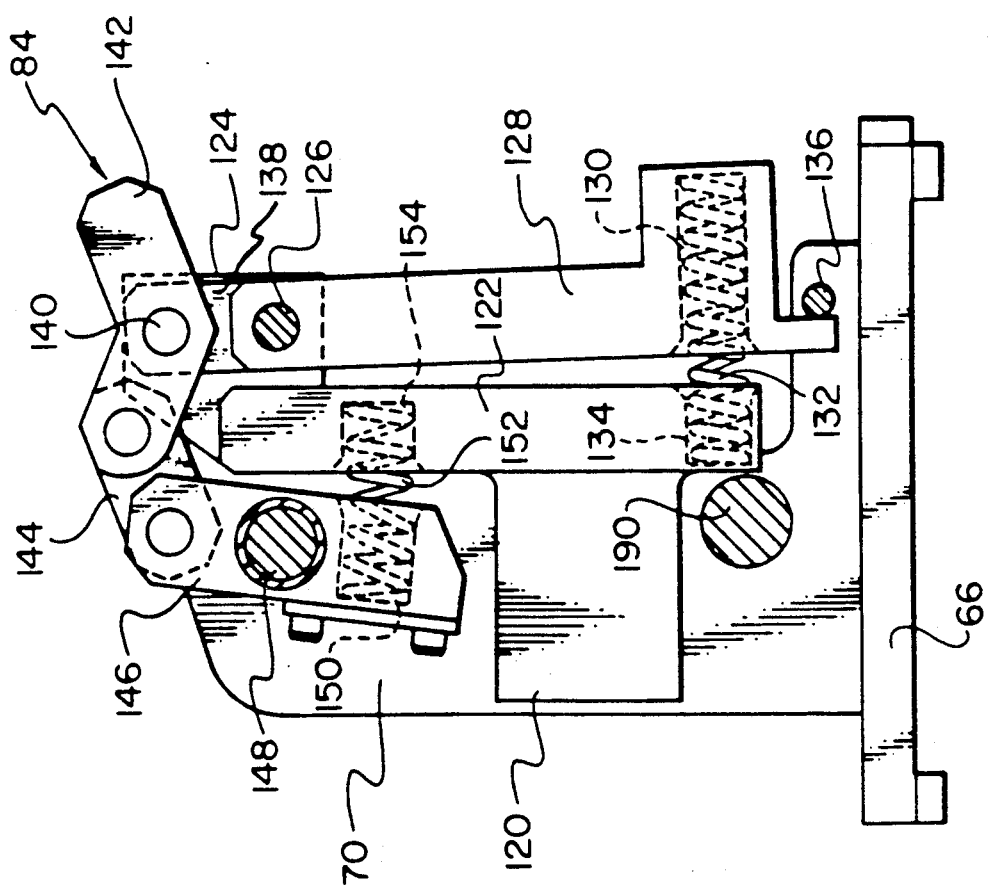
FIG. 8 shows a view along line 8—8 of FIG. 6.

FIG. 8 shows the toggle linkage 84 which actuates and releases rotatable clamping arm 78. An anchor block 120 extends between side plates 68, 70. Preferably, block 120 includes, at a location essentially midway between side plates 68, 70, an integral radially extending arm 122 having a transversely extending head 124 at its radially outer end. Pivoted on a shaft 126 between side plate 68 and head 124 is a load arm 128 having near its radially inner end a spring pocket 130 which captures one end of a spring 132 whose other end is captured in a spring pocket 134 located in the radially inner end of arm 122. Rotational movement of load arm 128 is limited by a stop pin 136 extending from side plate 68. On the opposite side of shaft 126 from spring pocket 130, arm 122 includes an extension 138 which supports a shaft 140 on which a vee-shaped trip arm 142 is rotatably mounted. One end of trip arm 142 is pivotably connected to one end of a link 144, the opposite end of which is pivotably connected to a pivot arm 146 fixedly mounted on a shaft 148 which is pivotably mounted between side plates 68, 70. Pivot arm 146 includes a spring pocket 150 which captures one end of a spring 152, the other end of which is captured in a spring pocket 154 located in radially extending arm 122. Shaft 148 extends outwardly through side plate 68 where, as shown in FIG. 4, it supports rotatable clamping arm 78. As shown in FIGS. 4 and 5, arm 78 includes a transversely extending portion 156 which supports a hook member 158 for engaging lip 20c as shown in FIG. 10.

To operate the toggle linkage shown in FIG. 8, an actuator mechanism 160 is provided as shown schematically in FIG. 3 and fragmentarily in FIG. 4. An actuator arm 162 is pivoted at its upper end 164 to face plate 32 and at its lower end 166 to a connecting rod 168 operatively connected to a crank arm 170 which may be rotated by a conventional oscillator. not illustrated. When a shell blank has been placed in contact with stop 116, arm 170 is rotated to move connecting rod 168 and cause actuator arm 162 to move from the position shown in FIG. 4 toward the end of trip arm 142 connected to link 144. A contact button 172 is mounted on the free end of a cantilever leaf spring 174 attached to lower end 166 of actuator arm 162. Button 172 is pressed against trip arm 142, causing it to rotate counterclockwise as seen in FIG. 4. This movement causes shaft 148 to rotate so that hook member 158 engages lip 20c on the shell blank and moves the blank to the position shown in FIG. 10. Reverse motion of shaft 148 under the influence of springs 132 and 154 is prevented because the pivot point between trip arm 142 and link 144 moves over center. Thus, the shell blank is fixed near lip 20c to the outer surface of mandrel 76 and near lip 20t against stop pin 82.

Figure 9:
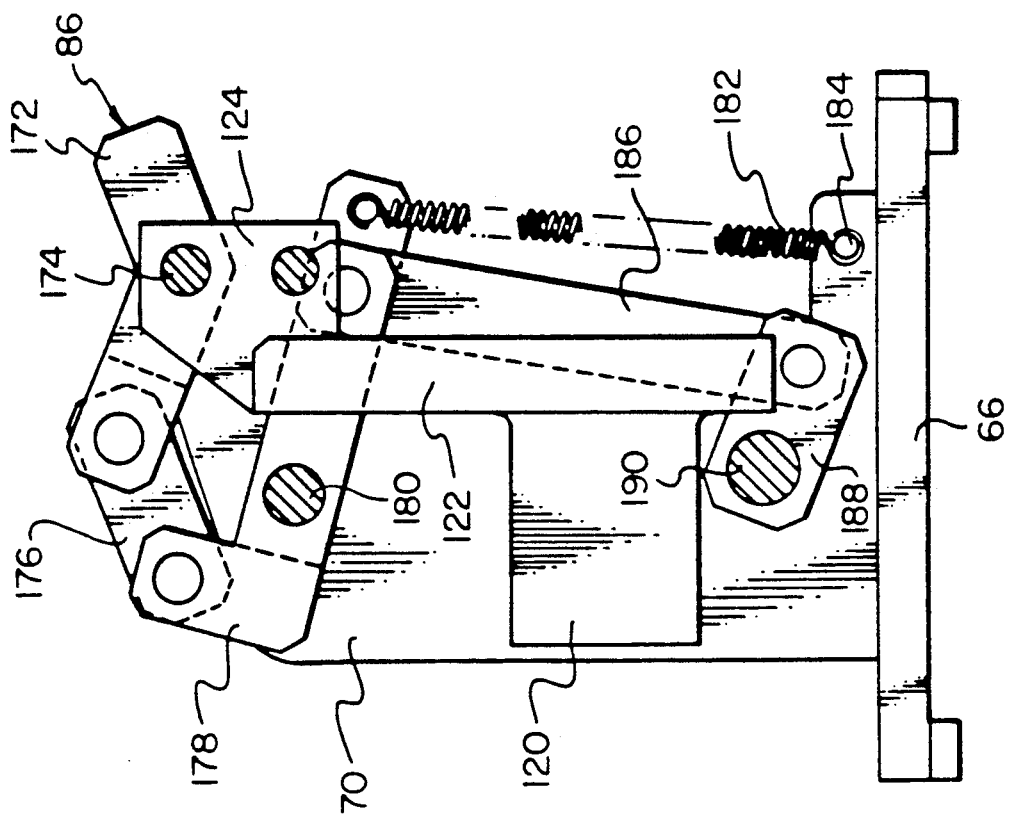
FIG. 9 shows a view along line 9—9 of FIG. 6.

Second rotatable clamping arm 80 is actuated and released by the toggle linkage 86 shown in FIG. 9. Near the radially outer edge of transversely extending portion 124, a vee-shaped trip arm 172 is pivotably mounted on a shaft 174 extending between portion 124 and side plate 70. One side of trip arm 172 is pivotably connected to one end of a link 176 whose opposite end is pivotably connected to an elongated crank arm 178 pivotably supported on a shaft 180 extending from side plate 170. At the opposite end of crank arm 178 from its connection to link 176, the crank arm is pulled radially inwardly by an extension spring 182 connected between the crank arm and a pin 184 extending from side plate 70. Between shaft 180 and the point of attachment of spring 182, an elongated link 186 is pivotably connected, the opposite end of link 186 being pivotably connected to a pivot arm 188 mounted for rotation with a shaft 190 which extends from side plate 70 through side plate 68 and supports rotatable clamping arm 80. The toggle linkage shown in FIG. 9 is operated by an actuator mechanism 192 shown schematically in FIG. 3 and in larger scale in FIG. 11, as will be discussed in detail subsequently.

Figure 11:
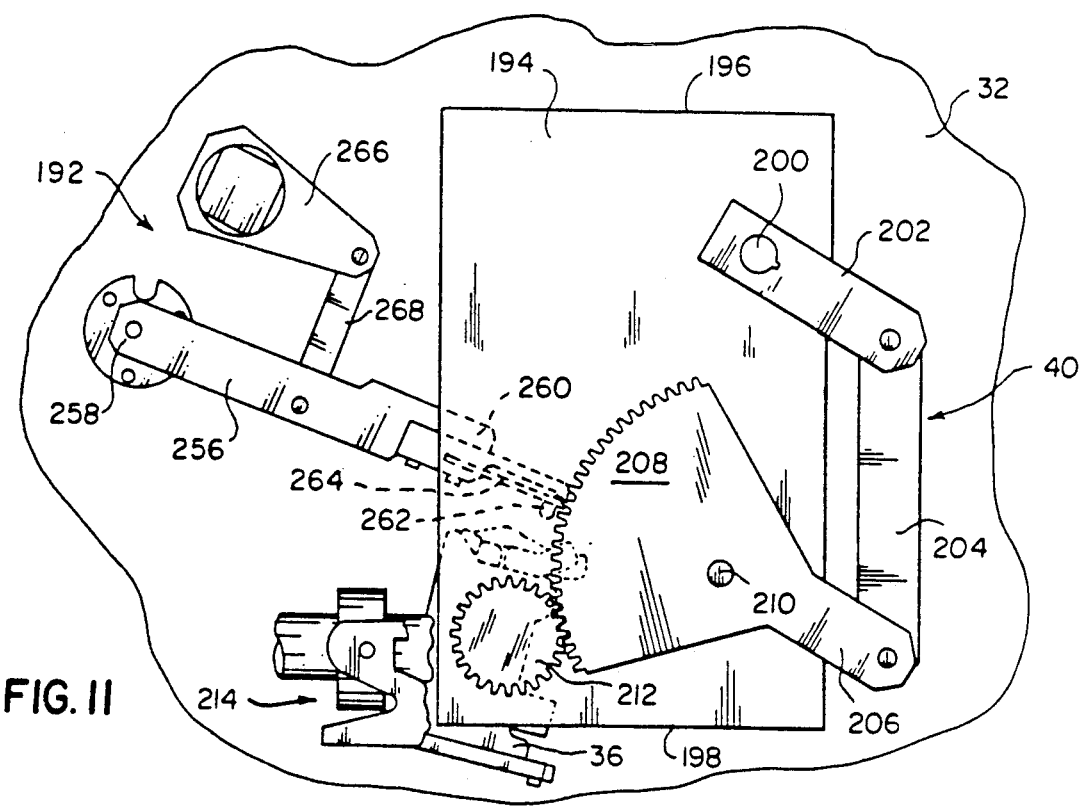
FIG. 11 shows a fragmentary front elevation view of the apparatus of FIG. 3, illustrating portions of the mechanism for roll forming a metal blank about the mandrel.

Once a shell blank has been placed in position on mandrel 76 as shown in FIG. 10, forming dial 38 is rotated by a conventional indexer, not illustrated, until mandrel carrier 36 is positioned at forming station 40. FIG. 11 shows an enlarged view of roll forming station 40. A support plate 194 is spaced in front of face plate 32 by supports extending behind its upper edge 196. Thus, the lower edge 198 of plate 194 is spaced from face plate 32 sufficiently to permit mandrel carrier 36 to move into position for forming of the shell blank positioned on mandrel 76. Preferably the shell blank is roll formed and the mechanism for actuating the roll former is mounted on or supported in part by support plate 194. This mechanism comprises an actuator shaft 200 mounted for reciprocating rotation in support plate 194 and face plate 32, a crank arm 202 mounted for rotation with shaft 200, a link 204 pivotably connected at one end to crank arm 202 and at the other end to a pivot arm 206 formed integrally with a gear sector 208 mounted for rotation on an axle 210 journaled in plate 194. Actuator shaft 200 may be driven by a conventional indexer, not illustrated. A pinion gear 212 is mounted for rotation in support plate 194, meshed with gear sector 208 and operatively connected to the roll former as shown in FIG. 12.

Figure 12:
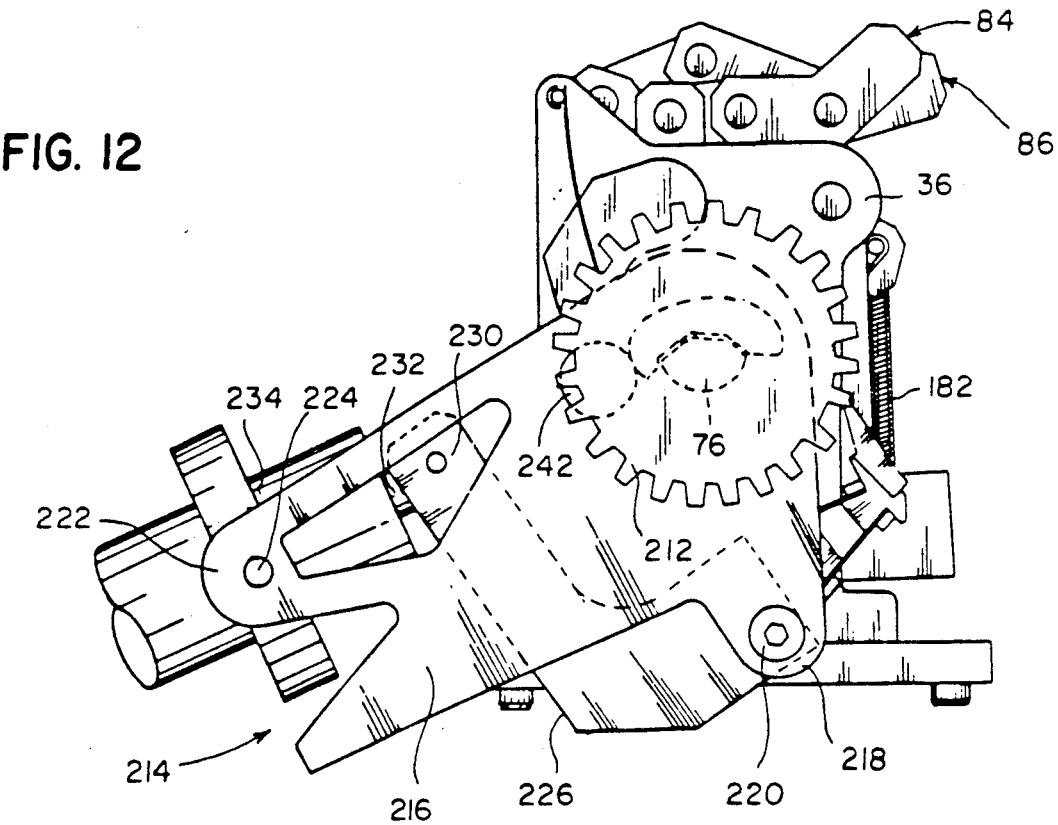
FIG. 12 shows the mechanism of FIG. 11 with its front plate and gear train removed and with the mechanism of FIG. 4 rotated into position for roll forming of the metal blank.
Figure 13:
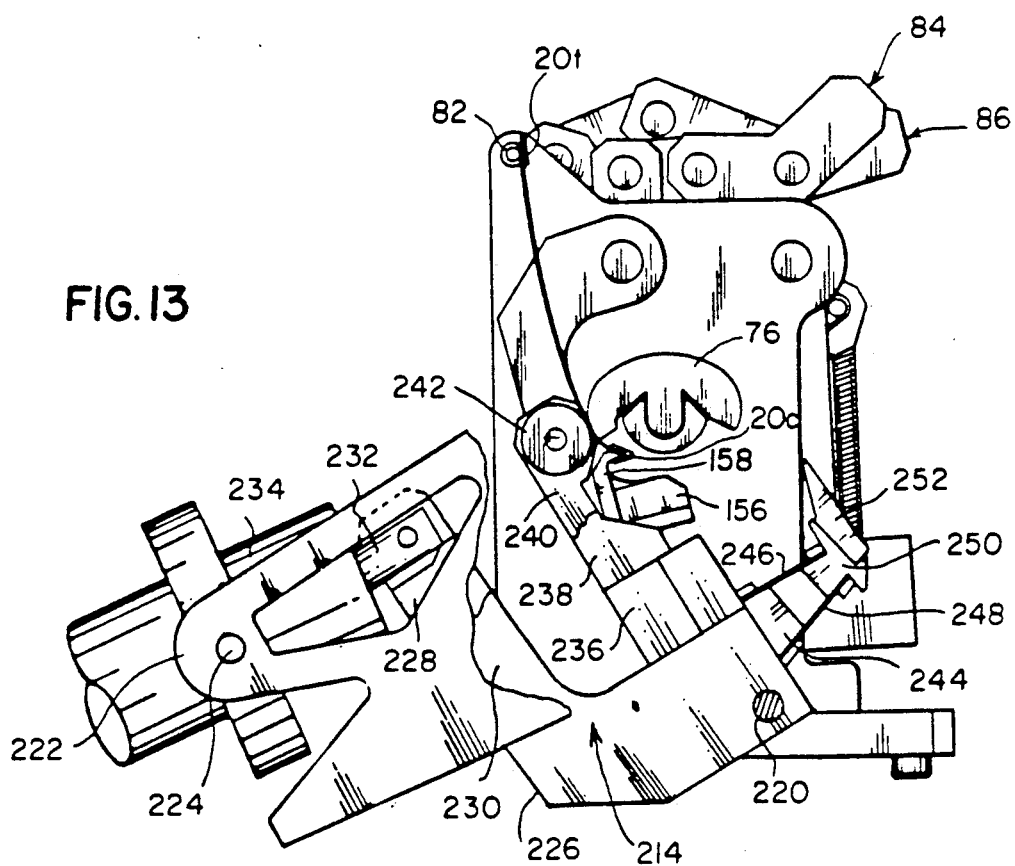
FIG. 13 shows the mechanism of FIG. 12 partially broken away to illustrate the cooperation of the forming roller with the metal blank and the mandrel.
Figure 14:
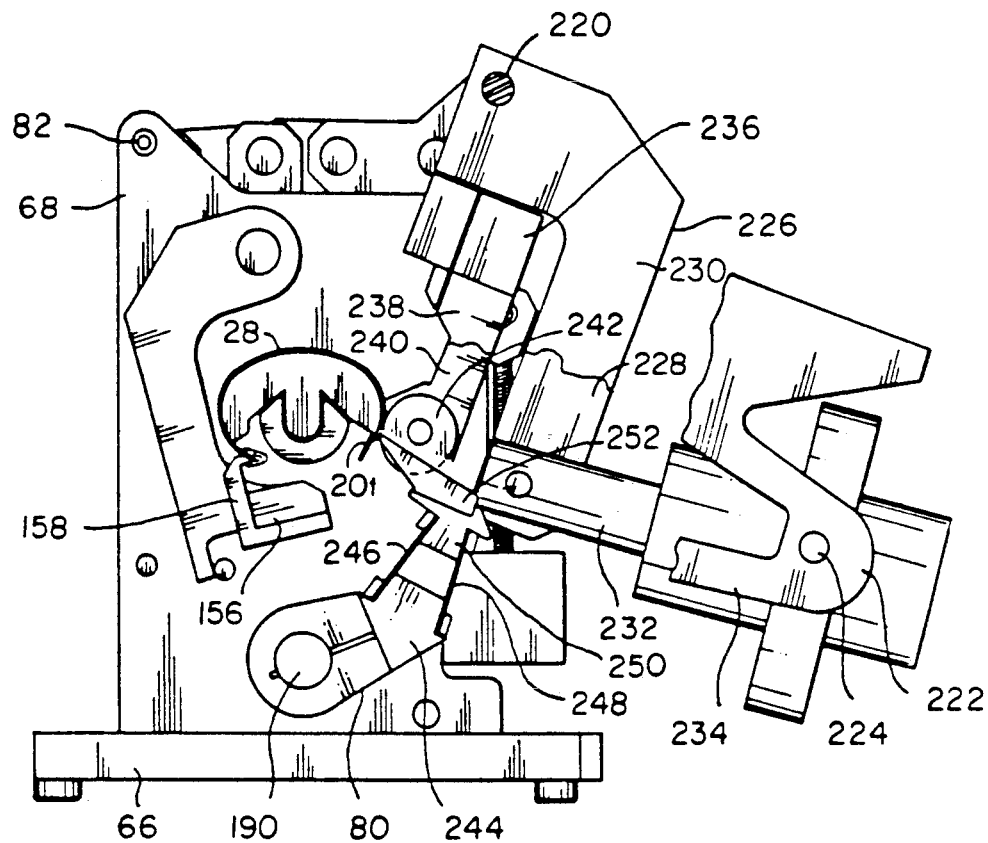
FIG. 14 shows the mechanism of FIG. 13 with the forming roller rotated about the mandrel to complete forming a very open form shell from the metal blank and with both ends of the shell clamped to the mandrel.
Figure 15:
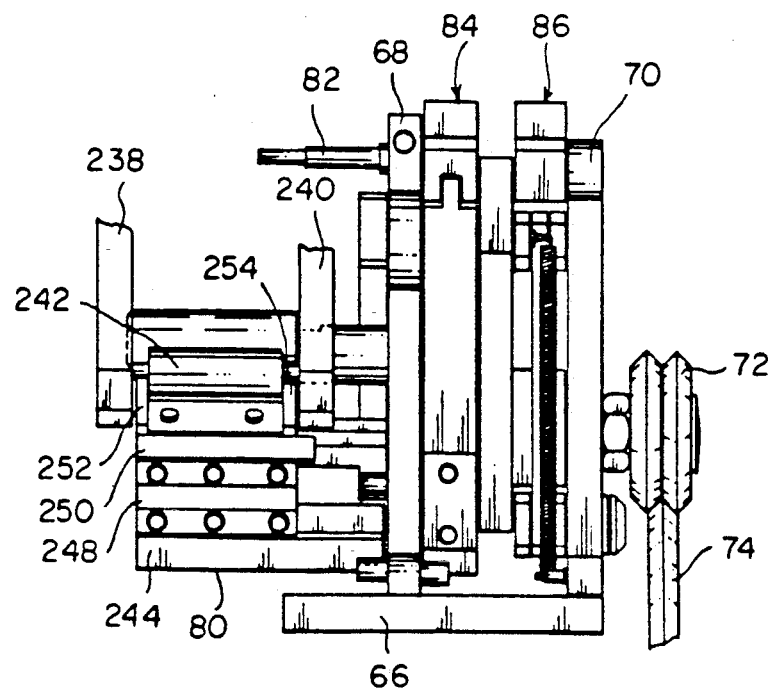
FIG. 15 shows a view of the right side of the mechanism of FIG. 14, partially broken away to illustrate the cooperation of the forming roller with the clamp for the end of the shell.

In FIG. 12, support plate 194 has been removed from view, leaving visible only pinion gear 212 and mandrel carrier 36, while revealing the roll former mechanism 214. An elongated support plate 216 is connected for reciprocating rotation to the shaft of pinion gear 212. The axis of pinion gear 212 preferably is parallel to all elements of the forming surface of mandrel 76, shown in phantom in FIG. 12. Along its lower edge as seen in FIG. 12, support plate 216 includes a downwardly projecting ear 218 which supports an axle 220 which extends beneath mandrel 76 in the positions of FIGS. 12 and 13. Along its upper edge as seen in FIG. 12 and at the opposite end from the location of axle 220, support plate 216 includes a further ear 222 which supports an axle 224. In FIGS. 13 and 14, support plate 216 has been partially broken away to reveal the components of roll former mechanism 214. Axle 220 rotatably supports a yoke 226 having a pair of arms 228,230 as seen in FIG. 13. The ends of arms 228,230 are positioned on opposite sides of and pivotably connected to the plunger rod 232 of a disk compression spring device 234 pivotably mounted on axle 224; so that, device 234 constantly biases yoke 226 to rotate about shaft 220 in the clockwise direction as viewed in FIG. 13. Those skilled in the mechanical arts will appreciate that device 234 may comprise a stack of disk springs captured within a cylinder and that movement of plunger rod 232 into such cylinder would compress the washers to produce the desired biasing force. Mounted on yoke 226 just above axle 220 is a forming roller support yoke 236 having a pair of arms 238,240 as seen in FIGS. 13 and 14. The ends of arms 238,240 are positioned at opposite ends of and rotatably support a forming roller 242. As mandrel carrier 36 is indexed into the position shown in FIGS. 12 and 13, the shell blank contacts forming roller 242 near lip 20c which, as previously discussed, has already been clamped against mandrel 76. As a result of this contact, forming roller 242 and yoke 226 pivot counterclockwise about shaft 220 as seen in FIGS. 12 and 13, causing plunger 232 to press inward against the springs in device 234, thereby firmly pressing forming roller 242 into engagement with the shell blank and the underlying mandrel.

To form the shell blank into very open shell 28 as shown in FIG. 2, crank arm 202 is rotated counterclockwise thereby causing gear sector 208 to rotate in the same direction which causes pinion gear 212 to rotate clockwise until roll forming mechanism 214 reaches the position of FIG. 14. During this rotation, the biasing force of device 234 holds forming roller 242 firmly in contact with the shell blank as roller 242 rolls the blank about the outer surface of mandrel 76. When roller 242 has reached a position near to lip 20t as shown in FIG. 14, toggle linkage 86 is actuated by mechanism 192, shown in FIG. 11, thereby causing shaft 190 to rotate clamping arm 80 to the position shown in FIG. 14. Mechanism 192 comprises an actuator arm 256 pivotably connected at its end 258 to face plate 32. At the opposite end 260 of arm 256, a toggle actuating button 262 is supported on a cantilever spring 264, as shown in phantom in FIG. 11. A crank arm 266 is pivotably mounted to face plate 32 for reciprocating rotation by a conventional oscillator, not illustrated, and is connected by a link 268 to actuator arm 256.

When a shell blank has been roll formed to the configuration shown in FIG. 14, mechanism 192 is actuated to press trip arm 172 and link 176 toward shaft 180, thereby causing shaft 190 to rotate clamping arm 80 into engagement with the completed very open shell 28. As shown in FIGS. 4, 5, 14 and 15, clamping arm 80 comprises a transverse portion 244 which extends beneath forming roller 242 in the position of FIG. 14. A pair of canted leaf springs 246,248 are attached between portion 244 and a transverse bar 250 having at its opposite ends clamping fingers 252,254 which, when toggle linkage has been actuated to the position of FIGS. 14 and 15, extend between the ends of forming roller 242 and arms 238,240 of support yoke 236 and into contact with the shell blank near lip 20t. The use of canted leaf springs 246,248 causes bar 250 and clamping fingers 252,254 to rotate relative to portion 244 and thus to pull the shell in the direction of lip 20t to ensure good contact with the mandrel during subsequent processing. Thus, very open shell 28 is held firmly against mandrel 76. With roll former mechanism 214 in the position of FIG. 14, mandrel carrier 36 can be indexed away to shell removal station 42, after which shaft 200 is rotated in the opposite direction, to return roll former mechanism 214 to the position of FIG. 11, ready to receive the next mandrel carrier.

GEOMETRY OF FORMING MANDREL 76

FIGS. 16 to 19 illustrate a preferred technique for determining the geometry of the exterior surface of mandrel 76 about which the shell blank is formed. The objectives in determining this geometry are to ensure (a) that when a substantially flat, rectangular metal shell blank is formed about the exterior surface from near lip 20c to near lip 20t and the blank is then removed from the mandrel, the blank will spring to a very open form in which lips 20c,20t are spaced sufficiently far apart as seen in FIG. 2 to permit a previously wound spool to pass laterally or radially between lips 20c,20t with the trailing end of the film on the spool projecting outwardly between the lips; and (b) that after lateral insertion of the prewound spool, the blank can be closed to form a substantially cylindrical shell to which end caps 24 can be readily applied.

Figure 16:
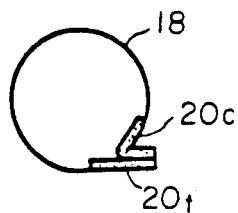
FIG. 16 shows a simplified crossectional view of a magazine of the type assembled in accordance with the invention.
Figure 17:
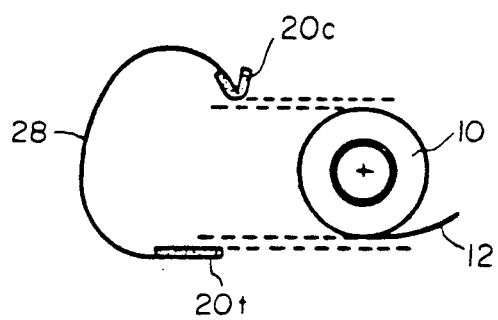
FIG. 17 shows such a magazine with its film withdrawal lips pulled open.

Using commercially available software such as NASTRAN published by the McNeal Schwendler Corporation for modelling preformed metal shell 18, a simplified computer based model of the shell is created as illustrated in FIG. 16. Assuming that lip 20t is held fast; that there are no internal stresses in the shell; that the material of the shell has the lowest yield strength anticipated in the actual product and the actual thickness to be used in the product; and that the stress-strain curve of the material has a positive slope, shell 18 is deflected by applying force to lip 20c, pulling upward and separating the lips as viewed in FIG. 17 while permitting lip 20c to move laterally if needed. The force is then removed and the model is allowed to relax to its free standing condition. The force applied is increased or decreased until the spacing between lips 20c,20t in the relaxed condition is sufficient to permit lateral insertion of a prewound spool. This technique produces a model of very open form shell 28 as shown in FIG. 2 and FIG. 17.

Figure 18:
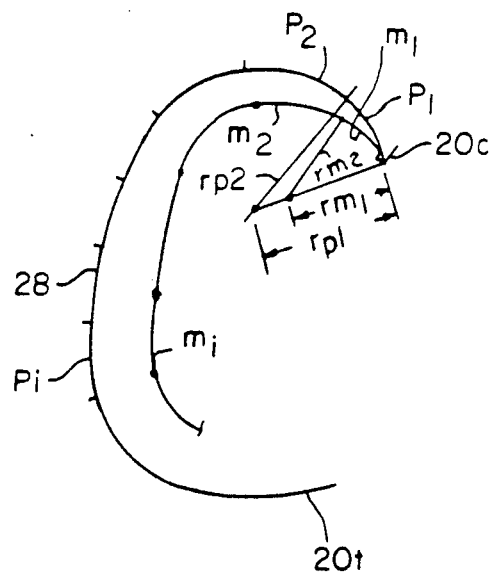
FIG. 18 shows a geometric construction illustrating how the geometry of the mandrel can be determined from the open shell geometry of FIG. 17.
Figure 19:
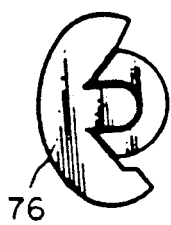
FIG. 19 shows an end view of a mandrel having an exterior surface configured in accordance with the construction of FIG. 18.

Using finite element analysis and assuming that the model of very open shell 28 has no internal stresses and no memory of having once been round as in FIG. 16, as would be the case for a shell formed from an originally flat blank, the model can then be closed back to the configuration of FIG. 16 to confirm that the shell will close to a good, cylindrical shape suitable for installation of end caps. Then, using material of the desired thickness and the lowest anticipated yield strength, a series of tests are conducted to develop plots showing for mandrels of different radii, the radii to which parts spring back following roll forming around the mandrel; that is, plots of part radius versus mandrel radius. Such plots can be modeled using commercially available software and it can be shown that $$R_{part} = 0.5t + e - [a - bR_{mandrel} + c(R_{mandrel})^2],$$

where t is the thickness of the shell material and a,b and c are constants. Then, as shown in FIG. 18, the model of very open form shell 28 is broken into small but not necessarily equal length arc segments $P_1$ to $P_i$ along its circumference. From the computer model of very open shell 28, the radius $r_{p1}$ of shell 28 at lip 20c can be determined, which is the radius at the beginning of segment $P_1$. From the value of $r_{p1}$, the corresponding radius $r_{m1}$ of mandrel 76 to produce $r_{p1}$ can be calculated using the relationship given above. With minor adjustment for the thickness of the wall of shell 28, the length of segments $P_1$ to $P_i$ along the circumference of the shell will be about the same as corresponding segments $M_1$ to $M_i$ along the circumference of the mandrel. Using radius $r_{m1}$ and assuming that the radius is perpendicular to the beginning of its corresponding segment $M_1$ near lip 20c, the location of the center for $r_{m1}$ can be determined and segment $M_1$ can be constructed as illustrated. Then, the computer determines from the model for shell 28 the radius $r_{p2}$ for the beginning of segment $P_2$, calculates $r_{m2}$, locates the center for $r_{m2}$ and constructs segment $M_2$ of the surface of the mandrel. This process is then repeated for each segment of very open form shell 28 until the geometry of a mandrel surface has been determined, as shown in FIG. 19, on which shell blanks can be roll formed to produce a very open form shell 28. Because the shape of the mandrel is determined using the lowest yield strength material, the mandrel will produce proper very open form shells 28 with higher yield strength materials as well and such shells will also close to a good cylindrical form.

SHELL REMOVAL STATION 42

Figure 20:
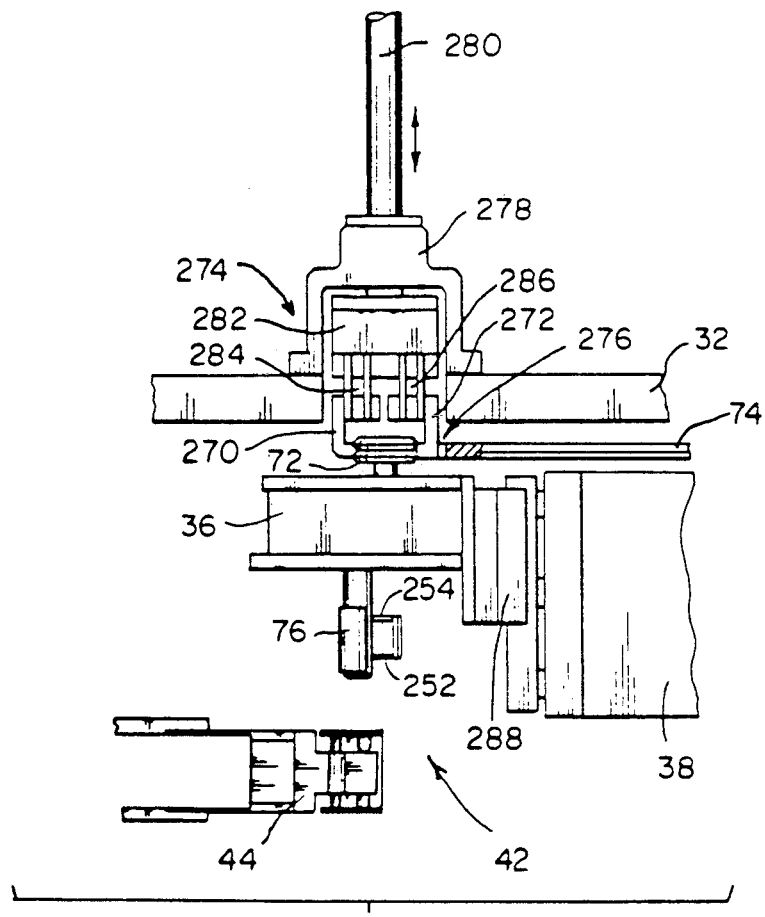
FIG. 20 shows a fragmentary top plan view of the roll forming mechanism, illustrating the mechanism which moves the mandrel carrier outward to deliver the very open shell to the means for removing the shell.
Figure 21:
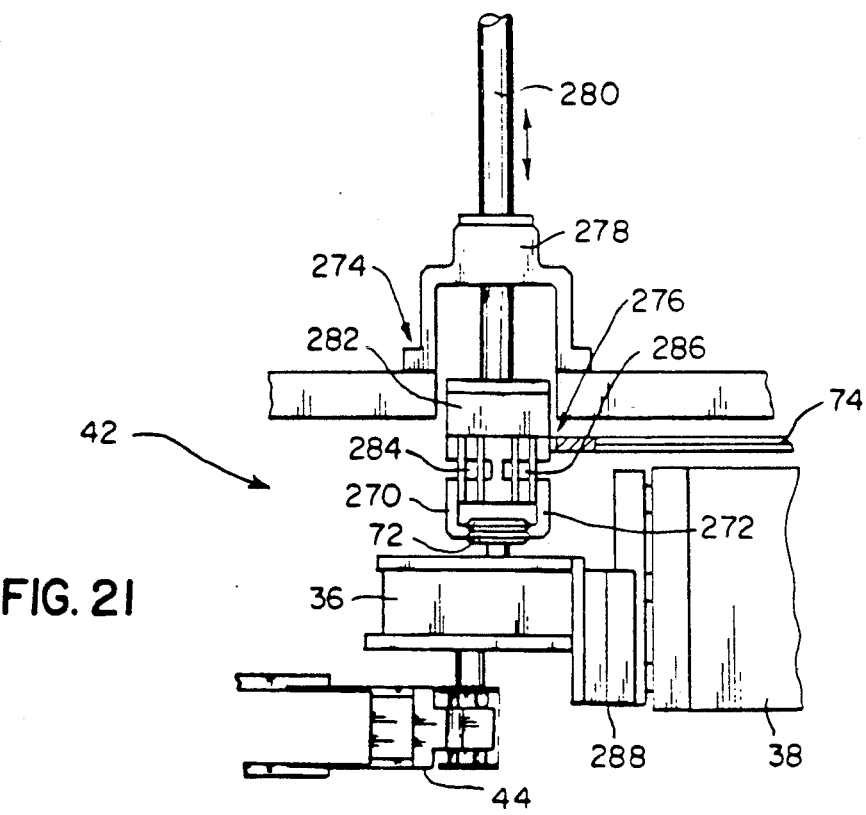
FIG. 21 shows the mechanism of FIG. 20 with the mandrel inserted into the means for removing the shell.

When mandrel carrier 36 reaches shell removal station 42 as shown in FIG. 20, grooved guide wheel 72 rolls from guide track 74 to a position between the jaws 270,272 of a mechanism 274 mounted on face plate 32. Mechanism 274 is configured to move mandrel carrier 36 outward from the position of FIG. 20 to the position of FIG. 21 in which very open shell 28 is accessible to shell removal mechanism 44. In the position of FIG. 20, jaws 270,272 extend into a circumferentially extending gap 276 in guide track 74; so that, as guide wheel 72 leaves guide track 74, it moves directly between the jaws. Only the radially inner portion of gap 276 is visible in FIGS. 20 and 21. Mechanism 274 comprises a housing 278 mounted on the back side of face plate 32, a spline shaft 280 supported by housing 278 for sliding movement and extended through an opening in face plate 32, and a conventional oscillator, not illustrated, for moving shaft 280 between the positions of FIGS. 20 and 21. Attached to the end of shaft 280 is a mounting block 282 to which are attached pairs 284,286 of stiff leaf springs which in turn are attached to jaws 270,272, respectively. When guide wheel 72 moves between jaws 270,272, springs 284,286 are deflected radially outward; so that, the jaws are biased into engagement with the guide wheel. Each mandrel carriage 36 is attached to forming dial 38 by means of a slide 288 which, once guide wheel 72 has left guide track 74, permits movement of mandrel carriage 36 between the positions of FIGS. 20 and 21. Thus, when mandrel carriage 36 reaches the position of jaws 270,272, forming dial 38 is stopped and mechanism 274 is actuated to move carriage 36 outwardly, essentially parallel to the axis of rotation of dial 38, to the position of FIG. 21.

Figure 22:
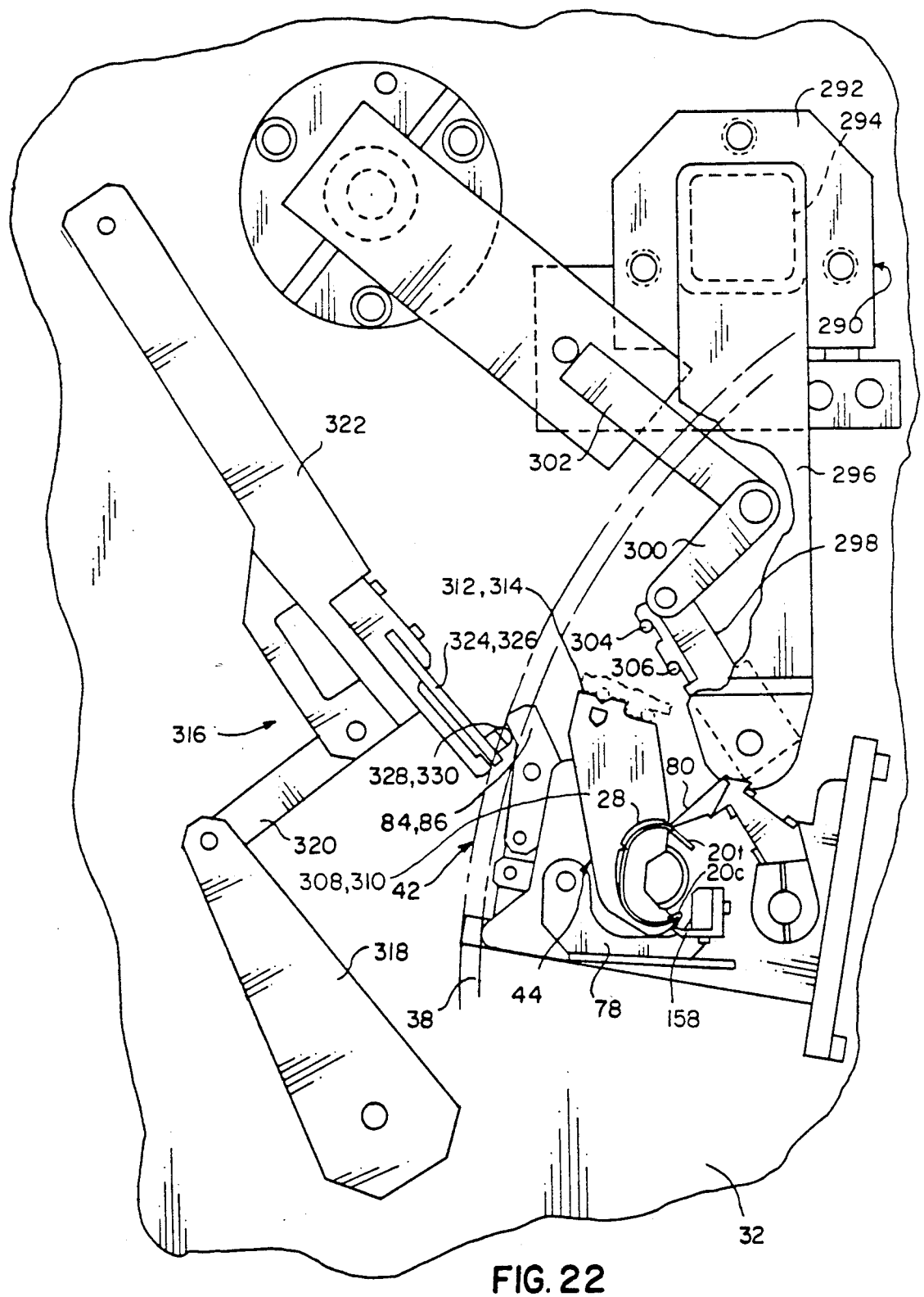
FIG. 22 shows a fragmentary front elevation view of the mechanism of FIG. 4 after the forming dial has been rotated 180 degrees counterclockwise, illustrating the cooperation between the mandrel and the means which removes the very open shell from the mandrel.

FIG. 22 shows a front elevation view of shell removal station 42. As mandrel carrier 36 is indexed into the illustrated position, it passes behind a portion of support structure 290 which is attached to face plate 32 by means of an adaptor plate 292. Extending out of the plane of the figure from plate 292 is an arm 294, illustrated in phantom, from which depends a further arm 296. Thus, mandrel carrier 36 passes between face plate 32 and arm 296 to reach the illustrated position. The lower end of arm 296 pivotably supports a reference datum arm 298 whose opposite end is pivotably attached to a link 300 which in turn is pivotably attached to a crank arm 302 pivotably mounted to face plate 32. When crank arm 302 is rotated clockwise by a conventional oscillator, not illustrated, datum arm 298 moves to the position illustrated in phantom. Datum arm 298 includes on its under side a pair of transversely extending positioning bars 304,306 which in the phantom position provide a reference or docking location for shell removal mechanism 44, only a fragment of which is illustrated in FIG. 22. Mechanism 44, which will be discussed in detail subsequently, comprises a pair of spaced claws 308,310, only the outermost one of which is visible in FIG. 22, which are swung into the illustrated position just before mandrel carrier 36 arrives. The openings of claws 308,310 are sized so that when mandrel carrier 36 is moved outwardly by mechanism 274, mandrel 76 and very open shell 28 move through the openings in claws 308,310 while lips 20c,20t remain outside the openings and held against the mandrel by hook 158 and clamping fingers 252,254, respectively. Along their edges remote from such openings, claws 308,310 include reference edges 312,314, only the outermost one of which is visible in FIG. 22. Just before claws 308,310 are swung into the illustrated position, datum arm 298 is moved to the illustrated phantom position. Positioning bars 304,306 are thus located so that reference edges 312,314 will contact them and accurately position claws 308,310 to allow mandrel 76 and very open shell 28 to enter.

Once mandrel 76 and very open shell 28 have been positioned within the openings of claws 308,310, hook 158 and clamping fingers 252,254 must be released to permit the shell to spring into the openings of the claws for subsequent removal from mandrel 76. For this purpose, a toggle release mechanism 316 is provided which in one embodiment may comprise a crank arm 318 rotatably mounted to face plate 32, a link arm 320 pivotably connected to the outer end of crank arm 318 and a release arm 322 pivotably connected near one end to link arm 320 and pivotably mounted at the other end to face plate 32. Crank arm 318 may be driven by a conventional oscillator, not illustrated. At its free end, release arm 322 supports a pair 324,326 of stiff leaf springs having toggle release buttons 328,330 located on their outer ends, only the outermost leaf spring and release button being visible in FIG. 22. When release buttons 328,330 are pressed against the free ends of trip arms 142 and 172 of mandrel carrier 36, toggle mechanisms 84,86 are released and very open shell 28 springs into the embrace of the openings in claws 308,310.

Figure 23:
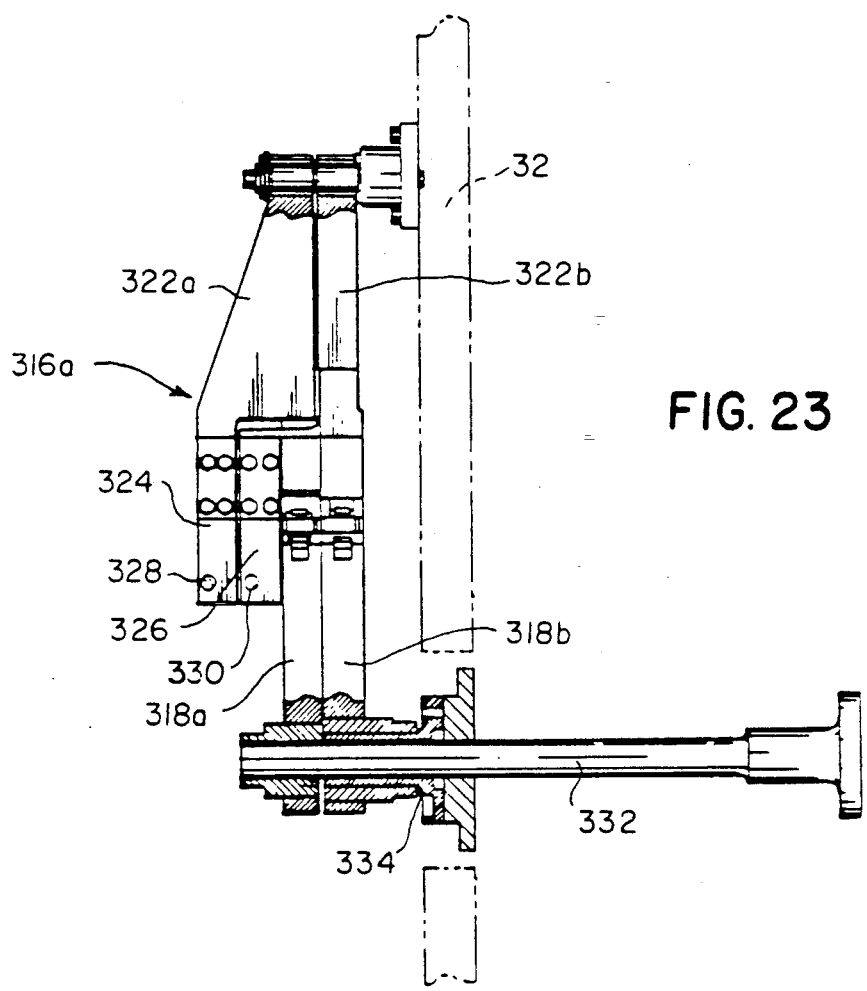
FIG. 23 shows a side elevation view, partially in section of the mechanism for releasing the clamps holding the shell against the mandrel in FIG. 22.
Figure 24:
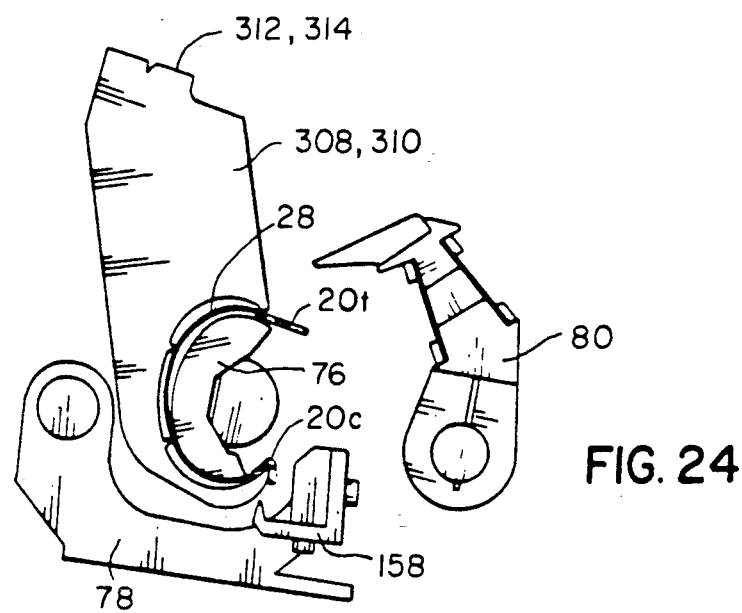
FIG. 24 shows an enlarged fragmentary front elevation view of the mandrel within the means for removing after release of the clamps, illustrating how the shell springs open into the means for removing.

In a toggle release mechanism as just described, release buttons 328,330 would tend to release toggle mechanisms 84,86 simultaneously; so that lips 20c,20t would spring away from mandrel 76 into engagement with claws 308,310. It is preferred, however, that lip 20c be released first since its crimp tends to engage one lip of claws 308,310 and thereby guide the rest of very open shell 28 into proper engagement with the claws, after lip 20t has been released. To achieve this sequence of release, the toggle release mechanism 316a of FIG. 23 is preferred. In this instance, a first crank arm 318a is mounted for rotation with a shaft 332 extending outwardly through face plate 32 and a second crank arm 318b is mounted on a tubular shaft 334 concentric with shaft 332, thus permitting the crank arms to be independently actuated by a conventional oscillator, not illustrated, acting on shafts 332 and 334. Crank arms 318a and 318b are pivotably connected to links not visible in FIG. 23 but identical in function to link 320, which links are pivotably connected to release arms 322a, 322b. Thus, by rotating shaft 332 before shaft 334, release arm 322a is rotated to press release button 328 against the free end of trip arm 142 and release clamping arm 78 just before release arm 322b is rotated to press release button 330 against the free end of trip arm 172 and release clamping arm 80. FIG. 24 shows a fragmentary view of the structure of FIG. 22 after clamping arms 78,80 have been released and very open shell 28 has sprung away from mandrel 76 into engagement with claws 308,310.

Figure 25:
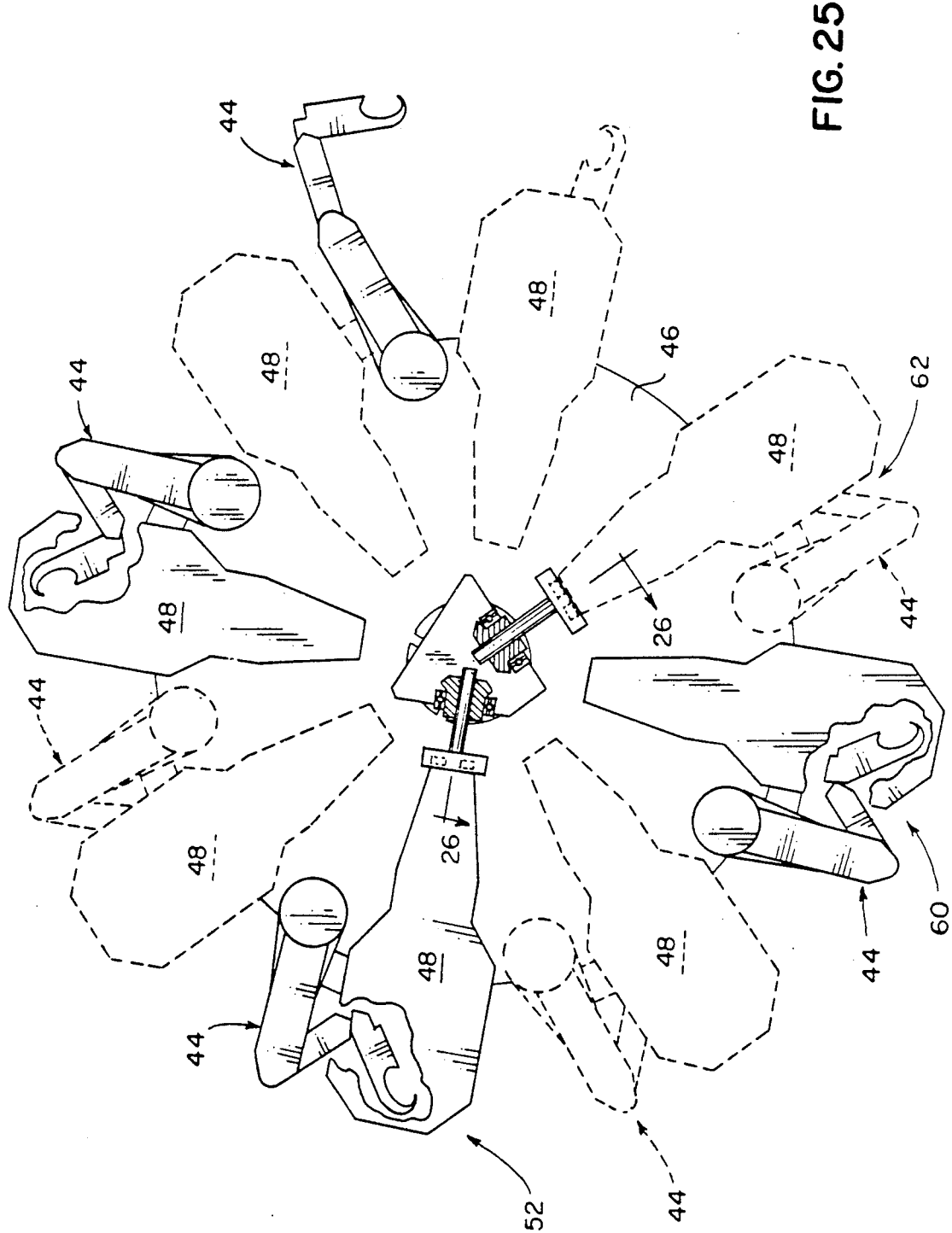
FIG. 25 shows a schematic, partially fragmentary front elevation view of the mechanisms which remove a roll formed shell from the mandrel and deliver it to an assembly station where a prewound spool is inserted into the shell.
Figure 26:
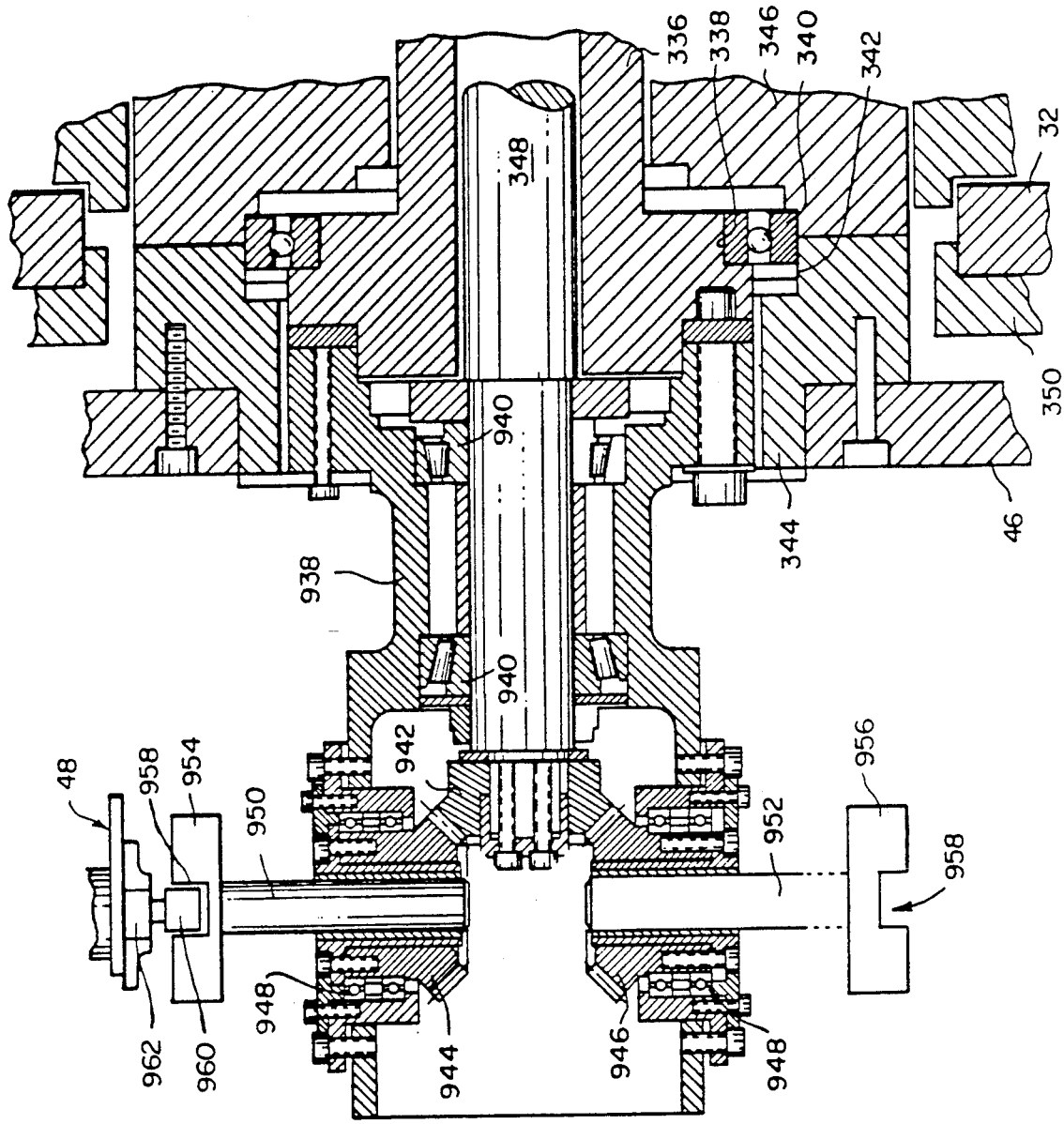
FIG. 26 shows an enlarged sectional view taken along line 26—26 of FIG. 25.

Once very open shell 28 has been released into claws 308,310 and mandrel 76 has retracted, the shell is swung away from forming dial 38 by shell removal mechanism 44 which is supported by the adjacent assembly dial 46, illustrated schematically in FIG. 25. Assembly dial 46 comprises an annular plate mounted for rotation relative to face plate 32 by a conventional indexer, not illustrated. Around the periphery of assembly dial 46 is arranged a plurality of end cap applying mechanisms 48 and on one side of each mechanism 48 is mounted a shell removal mechanism 44, some of which are shown in solid lines in FIG. 25, some in phantom lines. The manner of mounting assembly dial 46 to face plate 32 is illustrated in FIG. 26. An opening is provided through face plate 32, through which a central, stationary support tube 336 extends from a stationary support, not illustrated, at the back side of face plate 32. At its outer end, support tube 336 comprises a bearing mounting surface 338 for the inner race of a bearing 340. The outer race of bearing 340 is supported within a central counter bore 342 provided in an annular dial support plate 344 on the outer side of which assembly dial 46 is rigidly attached by bolts, for example. At its inner side, support plate 344 is rigidly attached to an annular adapter plate 346 having a central bore through which support tube 336 extends. Adapter plate 346 also supports the outer race of bearing 340. Adapter plate 346 is operatively attached to a conventional indexer, not illustrated, for rotating dial 46. An actuator shaft 348 extends through support tube 336 to a mechanism for actuating and deactuating end cap applying mechanisms 48, as will be discussed subsequently.

Figure 27:
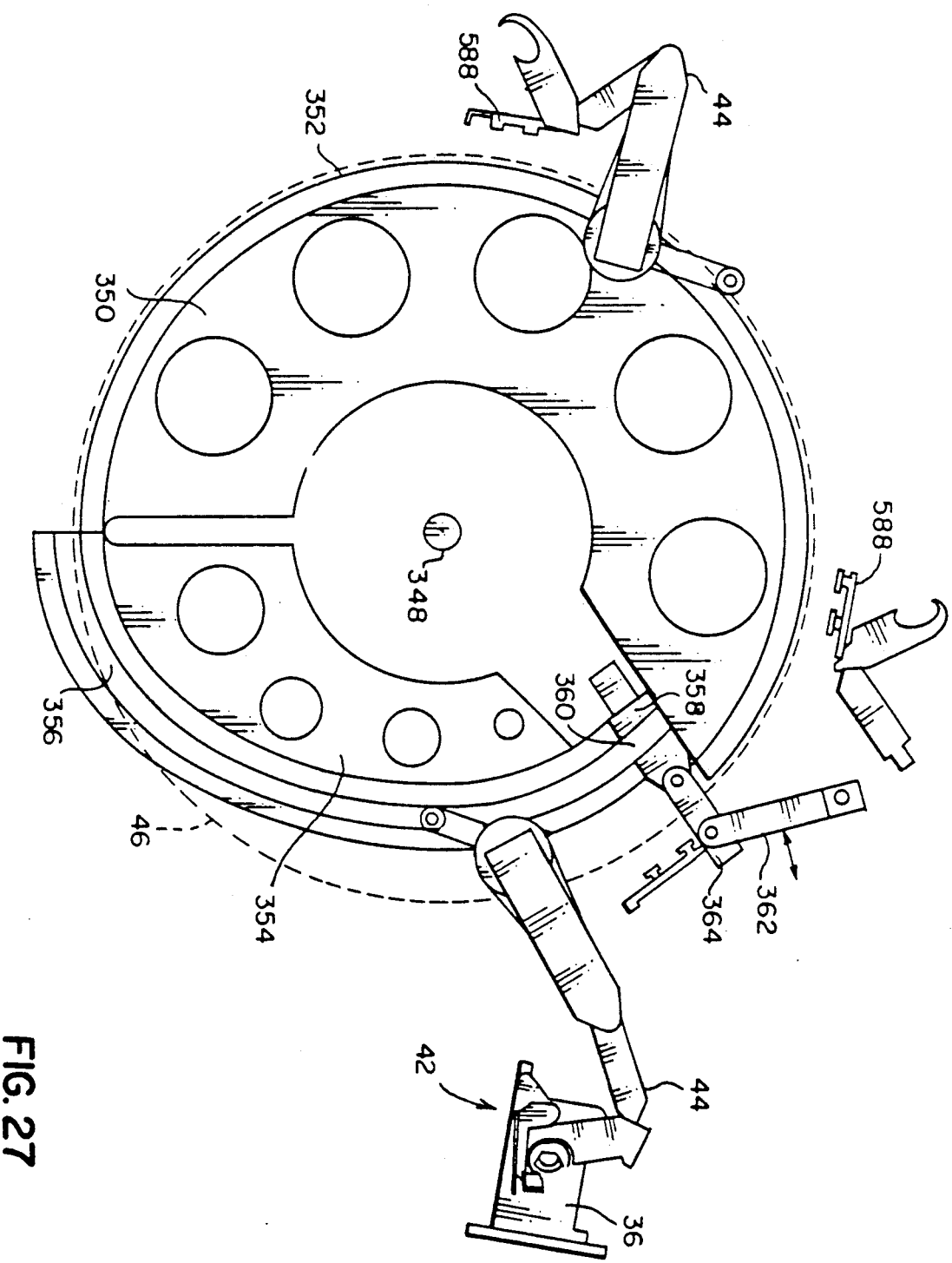
FIG. 27 shows the stationary cam plate which actuates the means for removing a roll formed shell.

As shown in FIGS. 26 and 27, behind assembly dial 46 and rigidly attached to face plate 32 is an essentially annular cam plate 350 which cooperates with a cam follower on shell removal mechanism 44 to swing very open shell 28 away from shell removal station 42 and place the shell in position for cooperation with one of end cap applying mechanisms 48. As seen in FIG. 27, cam plate 350 comprises a dwell segment 352 extending over approximately five eighths of the circumference of the plate and a decreasing radius segment 354 extending over the remainder of the circumference. As assembly dial 46 is rotated, the cam follower of each shell removal mechanism 44 rolls from the outside edge of dwell segment 352 into a slot 356 in decreasing radius segment 354, just as the associated end cap applying mechanism 48 is rotated away from magazine removal station 62. Subsequently, each cam follower is shifted from segment 354 back to segment 352, one indexing step after the associated end cap applying mechanism 48 is rotated away from shell removal station 42. This shifting of each cam follower is accomplished by means of a radially movable switch plate 358 having a slot segment 360 which can be positioned to receive a cam follower from slot 356 or to deliver the cam follower to the outside edge of dwell segment 352. Switch plate 358 may be moved when necessary by a crank arm 362 pivotably mounted at one end to face plate 32 and pivotably connected at its other end to a link 364 which in turn is pivotably connected to the radially outer end of switch plate 358. Crank arm 362 may be driven by a conventional oscillator, not illustrated.

Shell removal mechanism 44 is illustrated in FIGS. 28 to 31. A mounting plate 366 is attached to one side of each end cap applying mechanism 48 as illustrated fragmentarily in FIG. 28 and supports a transfer arm housing 368 having a rearwardly projecting shaft housing 370. Mounted for rotation within housing 370 is a shaft 372 which extends rearwardly toward face plate 32 through a bore 374 in dial 46. At its rearmost end, shaft 372 fixedly supports a cam follower 376 comprising a clamp block 378 fixedly attached to the end of shaft 372, a pair of flexure elements 380 extending from block 378 essentially parallel to cam plate 350, a roller support block 382 attached to the opposite ends of flexure elements 380 and a roller 384 rotatably supported by block 382. As assembly dial 46 is rotated, roller 384 rolls along the periphery of dwell segment 352 of cam plate 350 or through slot 356 in decreasing radius segment 354. As roller 384 traverses dwell segment 352, shaft 372 remains stationary; however, as roller 384 moves through slot 356, shaft 372 is rotated to position shell removal mechanism 44 to acquire a very open shell 28 from mandrel 76 and then to transfer the shell into position for cooperation with the associated end cap applying mechanism 48.

Figure 29:
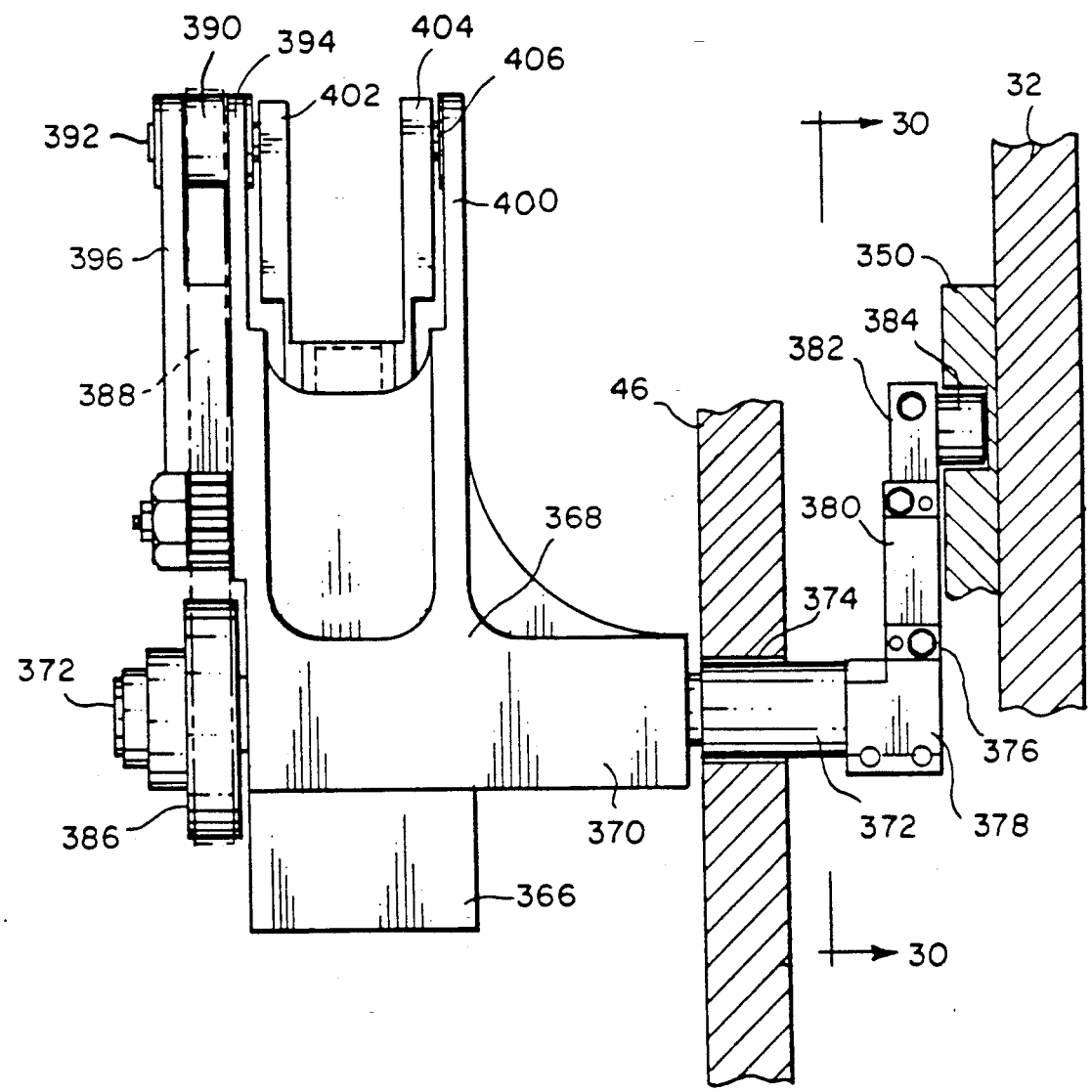
FIG. 29 shows a side elevation view of the mechanism of FIG. 28.
Figure 28:
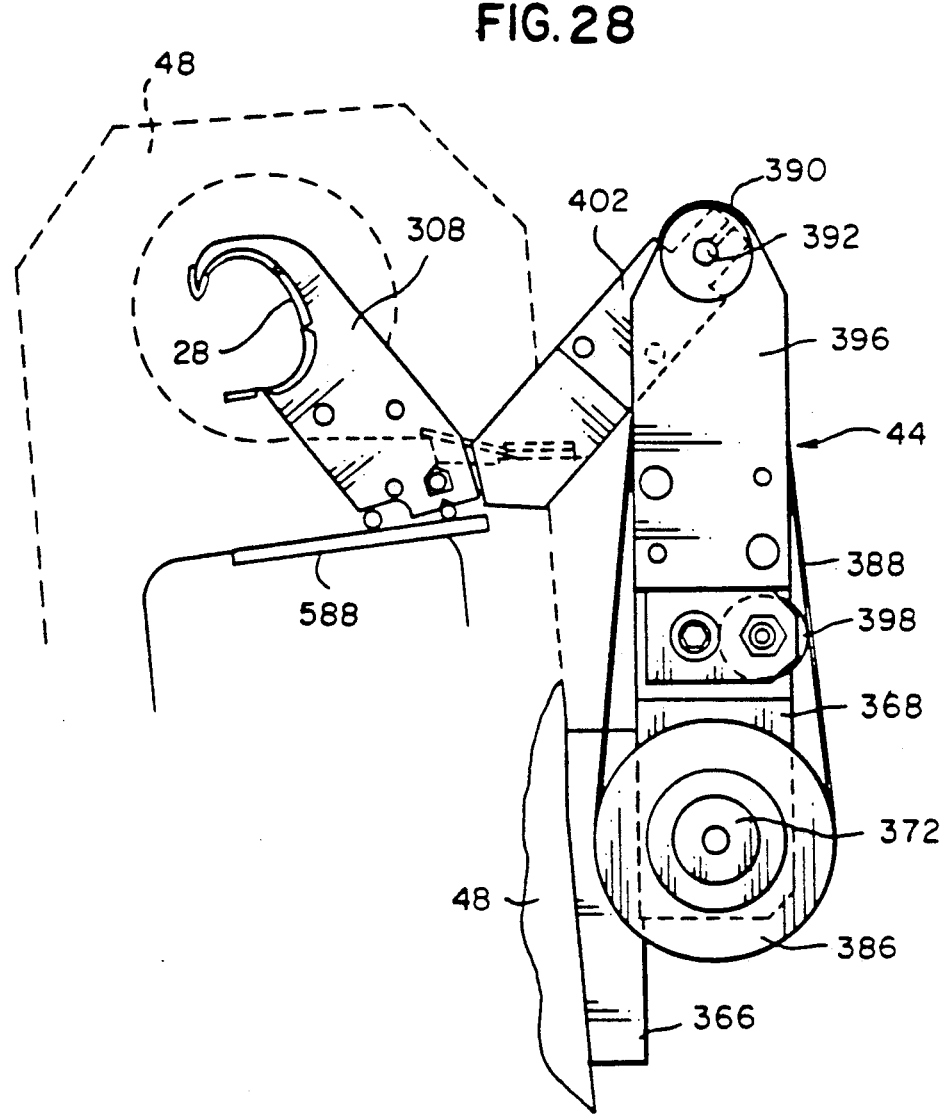
FIG. 28 shows a front elevation view of the means for removing a roll formed shell.
Figure 30:
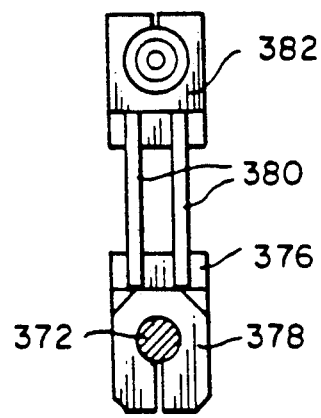
FIG. 30 shows a view of the cam follower arm of the mechanism of FIG. 29, taken along line 30—30 in FIG. 29.

At the opposite end of shaft 372 is fixedly mounted a pulley 386 about which a timing belt 388 is wrapped. A pulley 390 is supported on a shaft 392 rotatably supported between an arm 394 extending from housing 368 essentially parallel to assembly dial 46 and a support plate 396 attached to arm 394. Timing belt 388 also is wrapped around pulley 390. The tension of timing belt 388 may be adjusted in the familiar manner using a tension roller 398 slidably mounted on the side of housing 368. To the rear of arm 394 is provided a second arm 400 extending from housing 368 essentially parallel to dial 46. A front support plate 402 is fixedly mounted for rotation with shaft 392. A rear support plate 404 is fixedly mounted on a shaft 406 rotatably mounted near the end of second arm 400 and coaxial with shaft 392. As seen in FIGS. 28 and 29, support plates 402,404 extend away from shafts 392,406 and are attached at their outer ends to an elongated support base 408 for fixed claws 308,310 of shell removal mechanism 44. Base 408 includes an outwardly protruding tongue portion 410 having a pair of laterally protruding stub axles 412,414 in its side edges, axles 412,414 being loosely received in pentagonal shaped apertures 416,418 provided near reference edges 312,314 of claws 308,310. The vee-shaped sides of apertures 416,418 normally support axles 412,414, with clearances to the remaining sides of the apertures which serve as stops against excess movement. A tie plate 420 extends between claws 308,310 and fixes the claws in parallel planes by means of through pins 424,426 which mate with corresponding apertures in the claws. A pair of bearing buttons 428,430 are attached to the inner sides of claws 308,310 facing tongue portion 410 and are provided at their rounded tips with a small clearance to tongue portion 410. Tie plate 420 is biased toward tongue portion 410 by means of a leaf spring 432 attached by a hold down plate 434 to support base 408. The outer end of spring 432 extends into a pocket 436 in tie plate 420. The movement of tie plate 420 toward tongue portion 410 is limited by a bearing button 438 centrally located near the outer end of tongue portion 410.

Because of the loose fit between stub axles 412,414 and apertures 416,418, the assembly of tie plate 420 and claws 308,310 is permitted limited universal movement relative to support base 408. In the direction transverse to support plates 402,404, this movement is limited by bearing buttons 428,430 and the sides of apertures 416,418. In the direction about stub axles 412,414, this movement is limited by bearing button 438 and the sides of apertures 416,418 if the assembly is rotated toward tongue portion 410; whereas, if the assembly is rotated away from tongue portion 410, this movement is limited ultimately by contact between claws 308,310 and support plates 402,404. This range of movement is important to proper operation of the apparatus according to the invention. When shell removal mechanism 44 is swung into the position shown in FIG. 22, reference edges 312,314 must engage properly with positioning bars 304,306 on reference datum arm 298. The range of movement of the assembly of claws 308,310 and tie plate 420 ensures that the assembly will be able to orient properly against the positioning bars to facilitate subsequent acquisition of very open shell 28. As will be discussed shortly, end cap applying mechanisms 48 each include a similar datum element 588 which cooperates with the assembly of claws 308,310 and tie plate 420 to ensure that very open shell 28 is properly positioned to receive a prewound roll of film to be closed about the film and to receive a pair of end caps.

Figure 31:
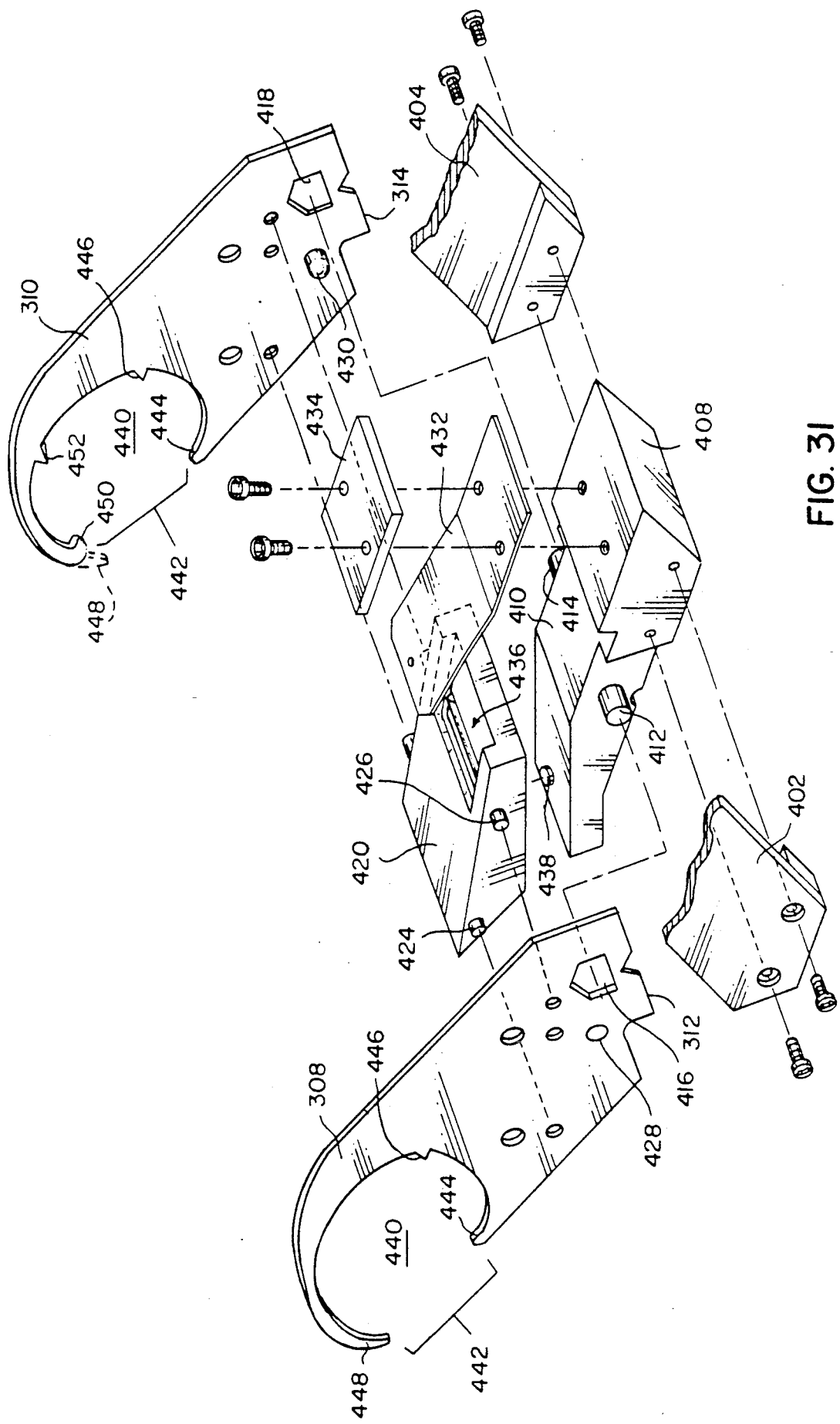
FIG. 31 shows an exploded perspective view of the nest mechanism which receives and holds the roll formed shells.

As indicated in FIG. 31, it has been found that the openings of claws 308,310 must be somewhat differently configured to facilitate transfer of very open shell 28 from mandrel 76. Each jaw comprises a central opening 440 sized sufficiently larger than mandrel 76 to permit axial passage of the mandrel with a shell clamped in place. Opening 440 is also sized to permit the shell to spring into and be firmly held within the central opening due to the spring force of the shell. Since the spring force of the shell causes it to spring into a fixed configuration within opening 440, changes in the material properties of the shell can be accommodated without influencing the shape of the shell as held within opening 440. Each jaw includes a throat 442 on one side of opening 440, the throat being sufficiently wide to permit lateral passage of a prewound roll of film into a very open shell 28 held between the two claws. Each claw includes on the side of throat 442 closer to support base 408 a tine 444 which engages the shell near lip 20t. Spaced along the circumference of opening 440 from tine 444, each jaw includes a shell positioning protrusion 446 which prevents the shell from springing open farther than necessary. On the opposite side of throat 442 from tine 444, claw 308 includes a tine 448 which engages the roll formed shell in the crimp formed by lip 20c. However, in the case of claw 310, a different arrangement was found necessary on the opposite side of throat 442. As previously discussed with regard to FIGS. 20, 21 and 22, mandrel 76 with a shell clamped in place is moved outwardly from forming dial 38 to a position where the shell can be removed by mechanism 44. Because clamping fingers 252,254 press against the roll formed shell near lip 20t, they move easily past tines 444 as mandrel 76 and the roll formed shell are moved outwardly. See FIG. 22. In contrast to this, hook member 158 is engaged in the crimp formed by lip 20c which would prevent the mandrel and shell from passing a tine configured like tine 448 of claw 308, if such tine were used on claw 310. So, claw 310 is provided with a tine 450 spaced circumferentially away from the path of hook member 158. For comparison, the location of a tine such as tine 448 is shown in phantom on claw 310. To ensure that the end of the shell held by claw 310 is positioned identically with that held by claw 308, an additional shell positioning protrusion 452 is provided on claw 310 between tine 450 and protrusion 446.

END CAP APPLYING MECHANISM 48

Figure 32:
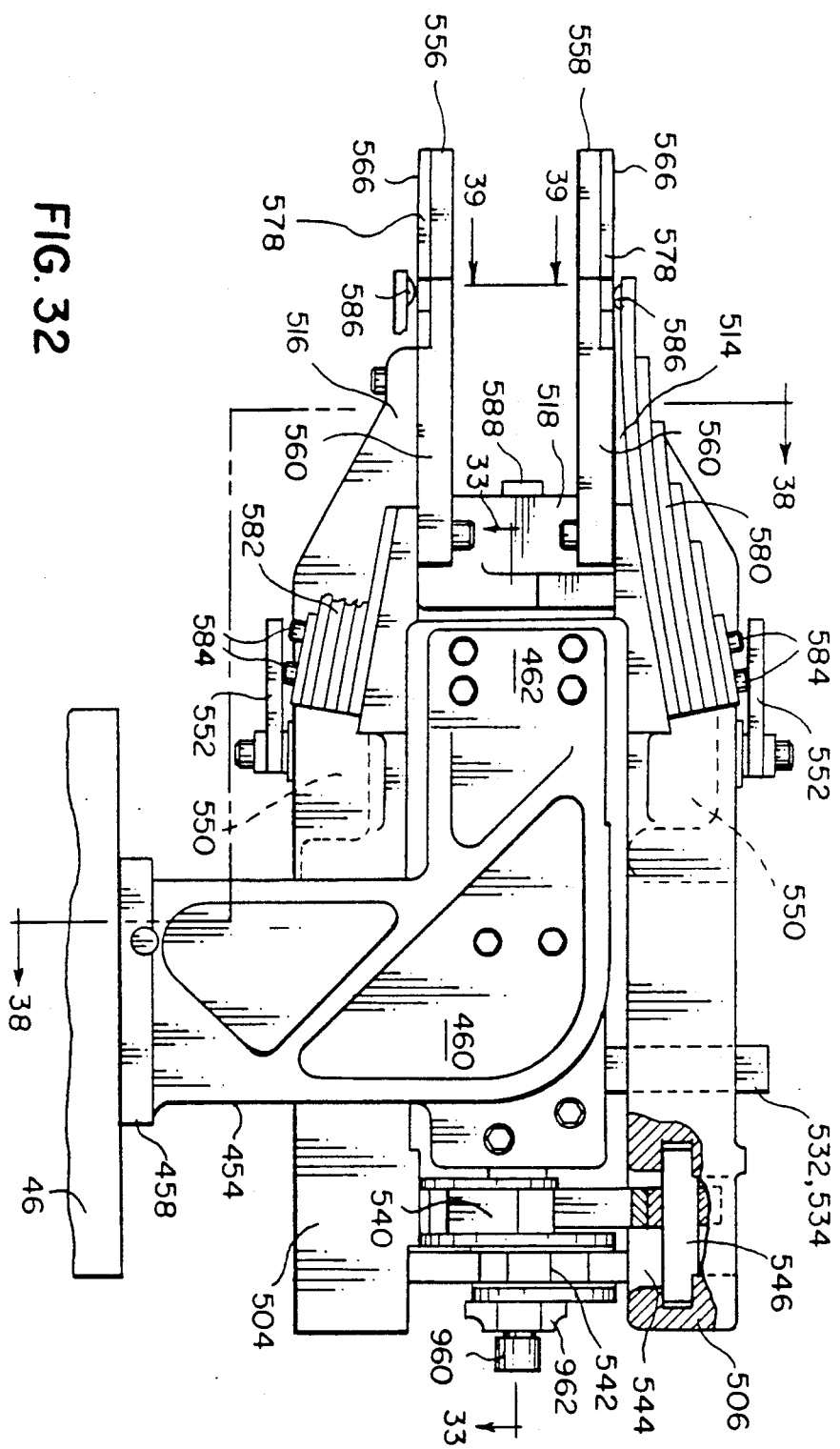
FIG. 32 shows a side elevation view of the mechanism for applying end caps to the magazine and holding the caps on the magazine during transport to the staking mechanism.
Figure 33:
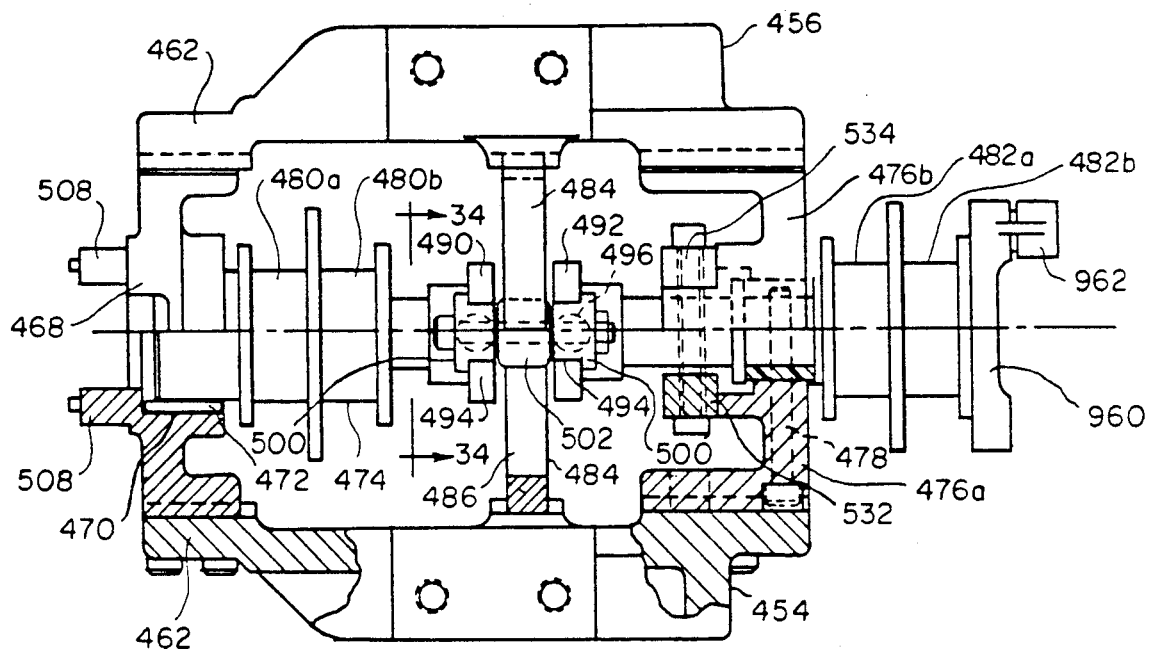
FIG. 33 shows a sectional view taken along line 33—33 of FIG. 32.
Figure 38:
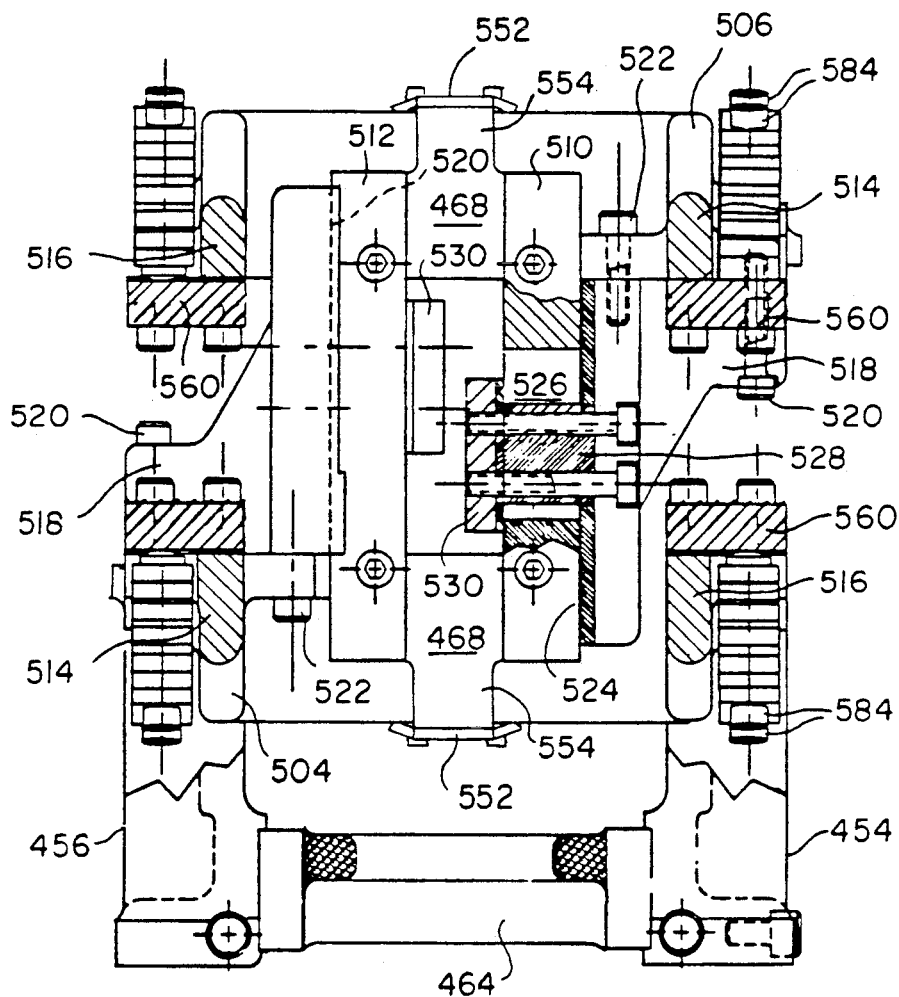
FIG. 38 sows a sectional view taken along line 38—38 of FIG. 32.

FIGS. 32 to 39 illustrate the structure of end cap applying mechanism 48. A pair of frame members 454,456, which are essentially mirror images of each other, are provided. Each frame member comprises a base flange 458 for rigid attachment to dial 46, an outwardly protruding leg 460 formed integrally with flange 458 and a radially extending arm 462 formed integrally with leg 460. As shown in FIG. 38, legs 460 are joined near base flanges 458 by a cross member 464. As shown in FIG. 33, the radially outer ends of arms 462 are joined by a bearing block 468 which comprises a central bore for receiving a bearing 472 which supports one end of a crank shaft 474 extending lengthwise of mechanism 48. Near its other end, crank shaft 474 is supported by a two piece bearing block 476a, 476b, the two pieces being attached respectively to frame members 454,456. Bearing block 476a,476b is assembled around crank shaft 474 by a pair of bolts 478, one passing on either side of crank shaft 474 and only one being shown in phantom in FIG. 33. Crank shaft 474 comprises two pairs of throws 480a, 480b located adjacent to bearing block 468, and 482a, 482b located on the opposite side of bearing block 476 from pair 480a, 480b. The throws in each pair are positioned 180 degrees apart about the axis of crank shaft 474; so that, connecting rods riding on the throws of each pair will be moved in opposite directions as crank shaft 474 is rotated.

Figure 34:
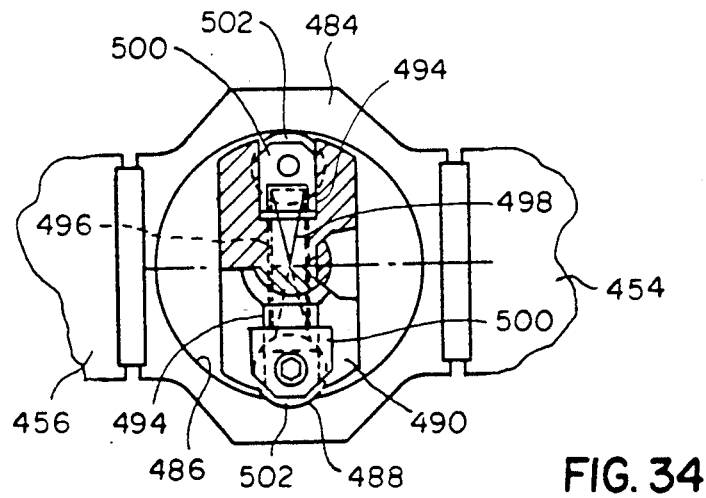
FIG. 34 shows a sectional view taken along line 34—34 of FIG. 33.

Approximately midway between bearing blocks 468,476, a detent ring 484 is rigidly connected between frame members 454,456 and around crank shaft 474 as shown in FIGS. 33 and 34. A central bore 486 is provided in detent ring 484, the bore having a detent recess 488 on a diameter midway between frame members 454,456. On either side of detent ring 484, crank shaft 474 is provided with radially extending, integral flanges 490,492. Each flange includes diametrally oppositely inwardly extending slots 494 which are joined at their inner ends by a diametral bore 496 which houses a spring 498. Slidably mounted in each of slots 494 is a roller guide block 500, the pair of guide blocks mounted on opposite sides of diametral bore 496 being biased outwardly in slots 494 by spring 498. Between the guide blocks on flange 490 and those on flange 492 are mounted rollers 502 which are biased into contact with the surface of bore 486 in detent ring 484. Thus, for each 180 degrees of rotation of crank shaft 474, one of rollers 502 enters detent recess 488 to deter further rotation of crank shaft 474.

Rotation of crank shaft 474 actuates end cap applying mechanism 48. A pair of essentially identical, rugged platens 504,506 is positioned one on each side of crank shaft 474 between frame members 454,456. Preferably, platens 504,506 are ductile iron castings. In use of mechanism 48, platens 504,506 are moved toward each other to apply end caps and away from each other to release a completed magazine. To constrain platens 504,506 to essentially parallel movement, guides are provided at both of bearing blocks 468,476. As best seen in FIGS. 33 and 35, bearing block 468 includes spaced, radially extending protrusions 508 which support a pair of guide posts 510,512 extending essentially perpendicular to the surface of dial 46. Each of platens 504,506 comprises a radially outwardly opening yoke having a pair of side arms 514,516. As seen in FIGS. 32 and 38, attached to the side of each arm 514 which faces arm 516 on the opposite platen is a guide support block 518 secured by oppositely extending bolts 520 and 522. A seen in FIG. 38 support block 518 includes an elongated guide surface 524 which may be covered with a suitable self lubricating material such as Oilite, Teflon or Delrin and which bears against a flat side of one of guide posts 510,512. Guide posts 510,512 are provided with intermediately located elongated slots 526. A spacer block 528 is captured in each slot by a back block 530 held by bolts extending from support block 518. The surface of back block 530 contacting guide posts 510,512 is covered with a suitable self lubricating material. Thus, as platens 504,506 move up and down as viewed in FIG. 38, their motion is guide by surfaces 524 and blocks 530 as they slide along fixed guide posts 510,512. Thus, guide posts 510,512 restrain both radial and tangential movement relative to assembly dial 46.

Guidance against tangential movement relative to assembly dial 46 is provided at bearing block 476 as best seen in FIGS. 33 and 35. A pair of rectangular cross section guide posts 532,534 are attached to opposite sides of bearing block 476 by means of bolts passing on either side of crank shaft 474. Guide posts 532,534 extend parallel to guide posts 510,512 and pass outwardly from bearing block 476 through openings 536 in platens 504,506. Attached to the inner side of each of platens 504,506 and extended across opening 536 is a bearing block 538 having flat side surfaces which slidably engage the flat side surfaces each of guide posts 532,534. Thus, as platens 504,506 move up and down as viewed in FIG. 32, their motion is guided by fixed guide posts 532,534.

Platens 504,506 are operatively connected to crank shaft 474 by pairs of connecting rods mounted on crank throws 480a, 480b and 482a, 482b. To simplify illustration, only one pair of connecting rods 540,542 is shown in FIG. 32, the pair mounted on crank throws 482a, 482b. Connecting rod 540 extends outwardly into an opening 544 in platen 506 where it is rotatably connected to a wrist pin 546 extending across opening 544. A similar arrangement, not illustrated, operatively connects connecting rod 542 to platen 504. At crank throws 480a, 480b, a further pair of connecting rods, not illustrated, is mounted between the crank throws and wrist pins 548 extending across hollows 550 in the inner side of each platen, as seen in FIGS. 32, 35 and 37. Thus, as crank shaft 474 is rotated, platens 504,506 move toward each other during an initial 180 degrees of rotation, at which time one of rollers 502 engages detent recess 488; and then away from each other during the next 180 degrees of rotation, at which time the other of rollers 502 engages detent recess 488. To more securely hold the platens in their closest position following application of end caps to a magazine as will be described subsequently, each of platens 504,506 is provided on its outer surface with a cantilevered leaf spring 552 which extends over the space between side arms 514,516 of the platen yoke. When the platens are brought to their closest position, each spring 552 bears resiliently against an outward extension 554 of bearing block 468, thereby biasing the platens toward their open position and taking up any back lash in the crank mechanisms. This maintains a consistent dimension between the end cap applying anvils discussed in the next paragraph and gives repeatable, accurate end cap to end cap dimensions on the completed magazine.

Actual application of end caps is accomplished by a pair of juxtaposed tools 556,558 mounted on the inner sides of side arms 514,516. Each tool 556,558 comprises a face plate 560 supported on the inner sides of side arms 514,516 and extended across the opening of the platen yoke. As shown in FIG. 36, a bore 562 is provided through face plate 560, within which a plastic bushing 564 is seated. Mounted within bushing 564 is an end cap applying anvil 566 which is made from a magnetic material. As shown in FIGS. 35 and 36, anvil 566 comprises a central portion 568 having an outwardly opening concavity 570 surrounding a central bore 572. Concavity 570 and central bore 572 provide access to a loaded magazine held between anvils 566, as will be described in more detail subsequently and also facilitates detection of missing or misaligned end caps using optical means, for example, not illustrated. At its inner end, central bore 572 is provided with a counter bore 574 for receiving end caps 24 in a manner to be described subsequently. At its outer end, central bore 572 is provided with a plurality of peripheral notches 576 which provide alternate magnetic pole locations for magnetic retention of the end caps and also cooperate with a finished magazine ejector at magazine removal station 62. Magnetization of anvils 566 to provide such alternate poles can be achieved using conventional techniques, such as those described in the *Permanent Magnet Design and Application Handbook*, Robert E. Krieger Publication Company, Malabar, Fla., 1986. Anvil 566 further comprises laterally extending portions 578 which rest on the outer surface of base plate 560. Normally, anvils 566 follow base plate 560 during application of an end cap unless there is an exceptional situation, such as a cocked magazine. They then will move relative to base plate 560 to relieve the problem and prevent damage. The anvils close only to a fixed spacing, rather than until the end caps bottom out on the closed shell, which helps to control dimensions of the completed magazine. During such execeptional situations, portions 578 tend to rise slightly above the surface of base plate 560 as anvil 566 moves slightly through bushing 564. The force applied to anvil 566 is controlled by a pair of cantilevered leaf spring assemblies 580,582 which are attached by suitable bolts 584 to the platens just outside the yoke of the platen adjacent to side arms 514,516. The free ends of spring assemblies 580,582 are provided on their inner sides with plastic contact buttons 586 which bear on the ends of laterally extending portions 578, thereby resisting movement of anvils 566 through bushing 564.

Figure 39:
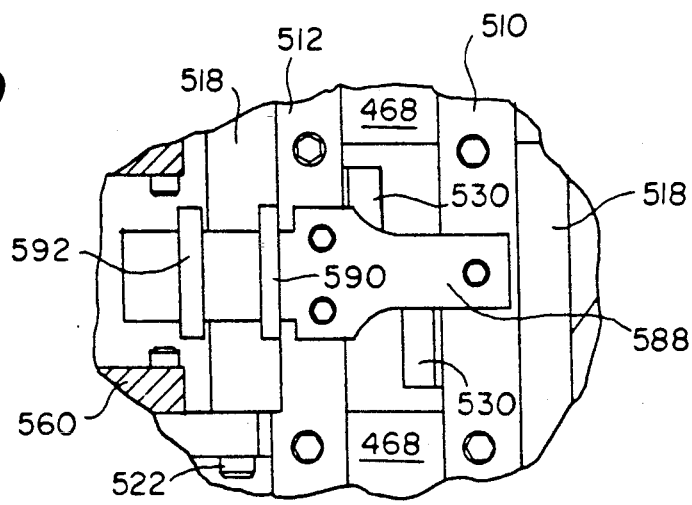
FIG. 39 shows a fragmentary view taken along line 39—39 of FIG. 32.

FIG. 39 shows a view along line 39—39 of FIG. 32, in which a reference datum plate 588 is shown attached to the radially outer faces of guide posts 510,512. Datum plate 588 extends toward the side of end cap applying mechanism 48 which supports shell removal mechanism 44, as previously described. Mounted on datum plate 588 are a pair of laterally spaced positioning bars 590,592 which cooperate with reference edges 312,314 of fixed claws 308,310 of the shell removal mechanism. Thus, when the shell removal mechanism 44 is swung between anvils 566, it comes to rest with edges 312,314 contacting positioning bars 590,592 and very open shell 28 positioned opposite central bores 572, as indicated schematically in FIG. 25.

END CAP PLACING MECHANISM 50

Figure 40:
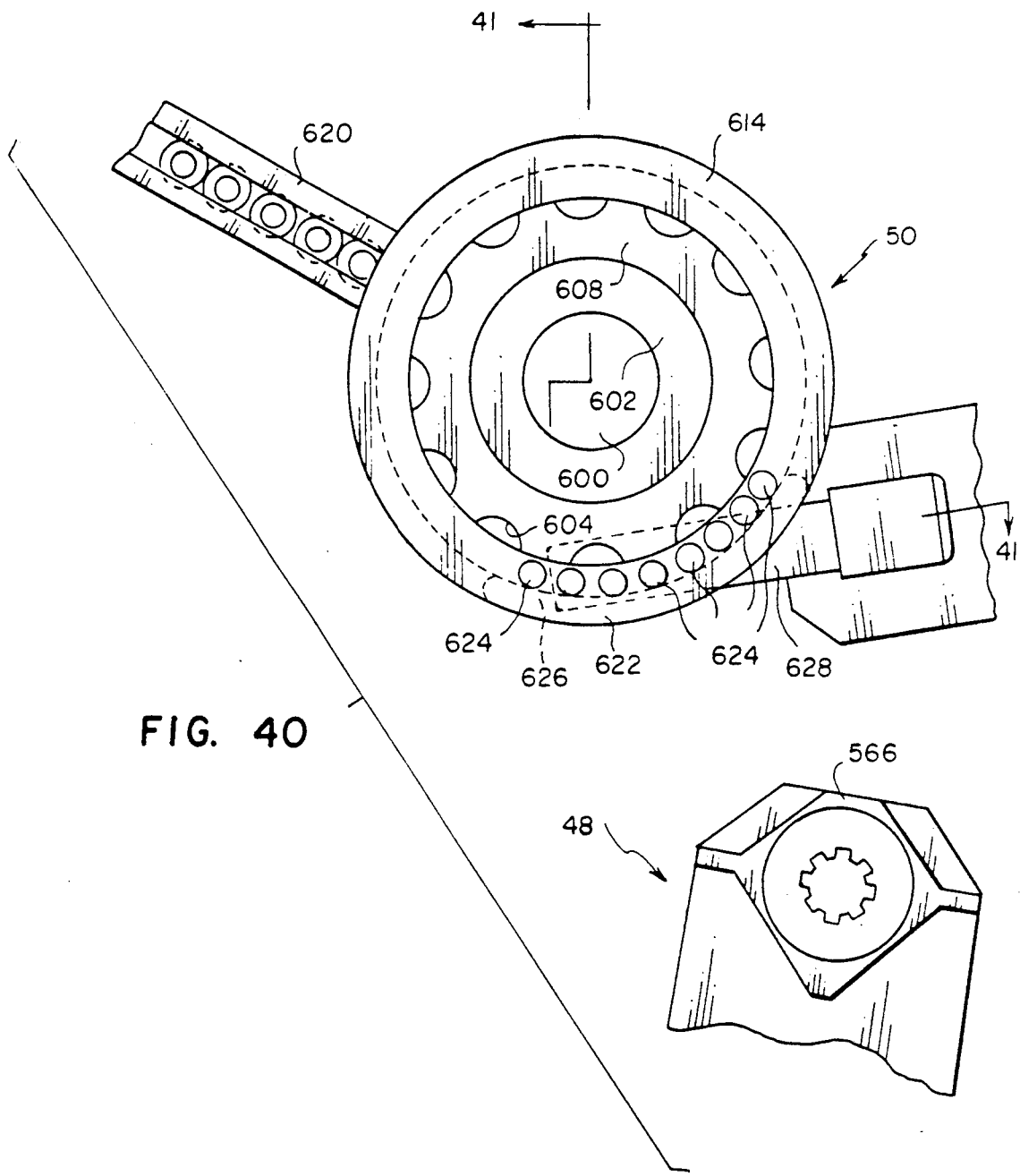
FIG. 40 shows a fragmentary front elevation view of the mechanism for supplying end caps to the mechanism of FIG. 32.
Figure 42:
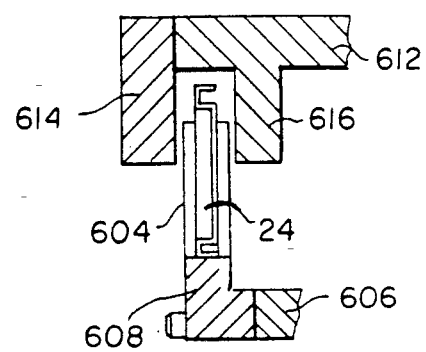
FIG. 42 shows an enlarged fragmentary view of the mechanism of FIG. 41, illustrating how the end caps are retained by the star wheels.
Figure 41:
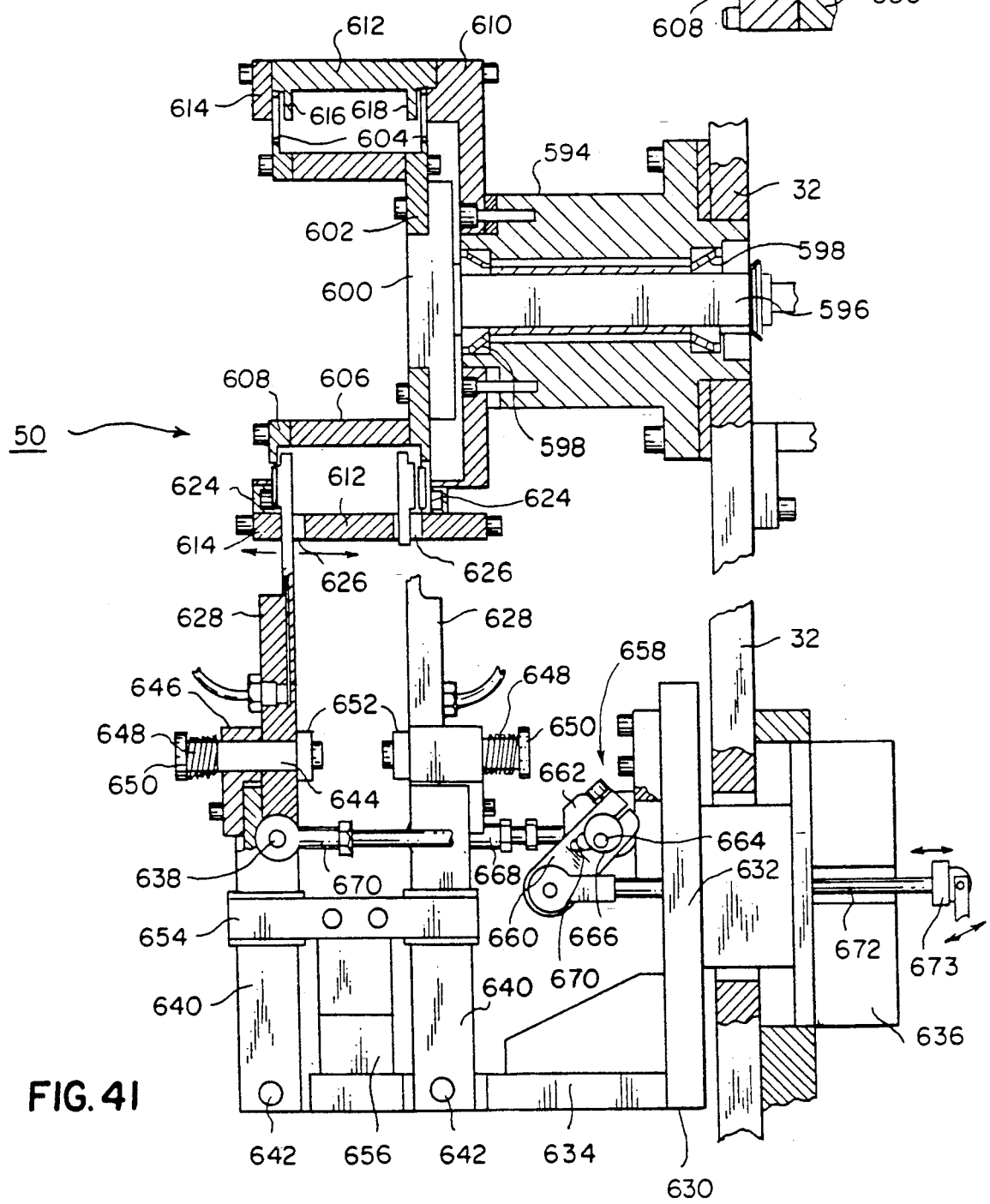
FIG. 41 shows a side elevation view, partially in section, of the mechanism of FIG. 40.

FIGS. 40, 41 and 42 illustrate details of end cap placing mechanism 50. A standoff housing 594 is attached to face plate 32 above assembly dial 46 and rotatably supports a shaft 596 on a pair of bearings 598. Shaft 596 may be driven by a conventional indexer, not illustrated. At its outer end, shaft 596 is provided with a hub 600 to which is attached a first annular star wheel 602 having spaced around its circumference a plurality of semicircular recesses 604 for receiving end caps 24. An annular spacer 606 is attached at its inner end to first star wheel 602 and at its outer end to a second star wheel 608 also having a plurality of recesses 604 axially aligned with those of star wheel 602. Surrounding the assembly of hub 600, star wheels 602,608 and annular spacer 606, is a housing comprising a back guide ring 610 mounted on the outer end of stand off housing 594, an outside annular spacer 612 attached at its inner end to guide ring 610 and at its outer end to a front guide ring 614. As shown in FIG. 42, outer guide ring 614 extends radially inwardly past the circumference of star wheel 608; so that, end caps 24 carried in recesses 604 are prevented from falling out. Back guide ring 610 is similarly sized for recesses 604 in star wheel 602. To keep end caps 24 from falling in the opposite directions, outside annular spacer 612 is provided with circumferentially and radially extending flanges 616,618 which extend radially inwardly past the circumference of the adjacent star wheels. End caps 24 are fed into recesses 604 from a pair of chutes 620, one of which is visible in FIG. 40, which extend through outside annular spacer 612 and gravity feed the end caps into recesses 604 as star wheels 602,608 are rotated by shaft 596.

As star wheels 602,608 rotate clockwise as seen in FIG. 40, end caps 24 carried in recesses 604 eventually reach the lowermost point 622 in the rotation of the star wheels, where they are removed from the star wheels for placement in end cap applying mechanism 48. On either side of point 622, guide rings 610,614 are provided with a plurality of circumferentially spaced permanent magnets 624 which hold the end caps against the guide rings at this location, to prevent their dropping out through arcuate radial slots 626 provided through annular spacer 612. Slots 626 and corresponding gaps in flanges 616,618, not illustrated, provide access to end caps 24 by a pair of vacuum gripper arms 628 rotatably supported by face plate 32 adjacent to the assembly of star wheels. A frame 630 is mounted for rotation in front of face plate 32 and comprises a back plate 632 rigidly attached to an outwardly projecting base plate 634. Back plate 632 is connected through an opening in face plate 32 to a conventional oscillator 636, mounted on the opposite side of face plate 32. Each vacuum gripper arm 628 is pivotably attached by a pin 638, only one of which is visible in FIG. 41, to an actuator arm 640 which in turn is pivotably attached to base plate 634 at pin 642. To provide a limited range of rotation of actuator arm 640 relative to back plate 632, side guides 654 are provided. To provide a limited range of movement of vacuum gripper arm 628 relative to actuator arm 640, a breakaway pin 644 is provided which extends through a bore in vacuum gripper arm 628 above pin 638 and a bore provided in a bearing block 646 attached to the upper end of actuator arm 640. A spring 648 is captured between a head 650 on breakaway pin 644 and bearing block 646 and the opposite end of the pin 644 is secured with a clamping collar 652. Pivoting movement of actuator arms 640 is limited by side guides 654 supported between the arms on a leg 656 attached to base plate 634.

The two assemblies of actuator arm 640 and vacuum gripper arm 628 are pivoted by means of a double eccentric mechanism 658 supported on the front face of back plate 632. A crank arm 660 is pivotably mounted between a pair of brackets 662, only one of which is visible in FIG. 41, by means of a shaft 664. The opposite ends of shaft 664 are provided with eccentric throws 666, only one of which is visible in FIG. 41, the throws being 180 degrees out of phase with each other. One throw is joined by a connecting rod 668, partially obscured in FIG. 41, to pin 638 of the nearer actuator arm 640; while the other throw is joined by a connecting rod 670, shown fragmentarily in FIG. 41, to pin 638 of the farther actuator arm 640. Thus, pins 638 perform the dual functions of pivotably connecting vacuum gripper arms 628 to actuator arms 640 and of pivotably connecting rods 668,670 to the respective assemblies of vacuum gripper arm and actuator arm. Crank arm 660 is oscillated by an actuator rod 672 pivotably attached to the outer end of crank arm 660 and extended rearwardly through face plate 32 to a conventional oscillator, not illustrated. To permit actuator rod 672 to withstand the rotation of frame 630, a swivel bearing 673 is provided on the end of rod remote from crank arm 660.

In operation of end cap placing mechanism 50, end caps 24 are fed into recesses 604 of star wheels 602,608 as the assembly of star wheels is stepped along in rotation. As end cap applying mechanism 48 is rotated by assembly dial 46 into position to receive a pair of end caps, indexer 636 is actuated to rotate vacuum gripper arms 628 into the positions shown in FIG. 41, with the tips of the vacuum gripper arms spaced from the end caps in recesses 604, as shown for the right hand vacuum gripper arm in FIG. 41. Actuator rod 672 is then pulled toward the back of face plate 32, so that double eccentric mechanism 658 causes connecting rod 670 to move to the left and connecting rod 668 to move to the right, as illustrated in FIG. 41. Such movement of the connecting rods causes the tips of the vacuum gripper arms to move apart from each other into contact with end caps 24 in recesses 604, as shown for the left hand vacuum gripper arm in FIG. 41. In practice, the vacuum gripper arms are caused to overtravel slightly as they are moved apart, to ensure that end caps 24 are properly acquired from star wheels 602,608 and, as will be subsequently discussed, deposited within anvils 566. Vacuum is then applied to the gripper arms to pull end caps 24 away from magnets 624. Actuator rod 672 is then pushed toward the front of face plate 32, so that double eccentric mechanism 658 causes the tips of the vacuum gripper arms to move toward each other away from recesses 604 while carrying a pair of end caps 24. Oscillating drive 636 is then actuated to rotate vacuum gripper arms 628 downward into position between magnetic anvils 566 of end cap applying mechanism 48. Actuator rod 672 is then pulled toward the back of face plate 32, so that double eccentric mechanism 658 causes the tips of the vacuum gripper arms to move apart from each other and place end caps 24 within counterbores 574 of anvils 566, at which time the vacuum is released to leave the end caps magnetically held by the anvils. The overtravel of the vacuum gripper arms, previously discussed, ensures that end caps are properly deposited within the anvils. Actuator rod 672 is then pushed back toward the front of face plate 32, so that the tips of the vacuum gripper arms move toward each other away from anvils 566. Finally, oscillating drive 636 is actuated to rotate vacuum gripper arms 628 back to the position shown in FIG. 41 where, in the meantime, a new pair of end caps has been moved in position for delivery to the next end cap applying mechanism 48 rotated into position on dial 46.

After the end cap applying mechanism has been provided with a pair of end caps 24, assembly dial 46 is indexed to bring the next end cap applying mechanism into position for receiving its end caps. Eventually, each end cap applying mechanism 48 reaches magazine assembly station 52, where a prewound spool of film will be inserted into very open shell 28, the shell will be closed and end caps 24 will be applied. When end cap applying mechanism 48 has reached assembly station 52, the radially outer ends of the mechanism come to rest between the inboard and outboard skewer mechanisms illustrated in FIGS. 48 to 52, to be described subsequently. In this position of end cap applying mechanism 48, lips 20c, 20t of very open shell 28 are oriented so that the shell opens essentially downwardly, as illustrated schematically in FIG. 25, thus permitting a prewound spool of film to be inserted from below.

WOUND SPOOL TRANSFER MECHANISM 56

Figure 43:
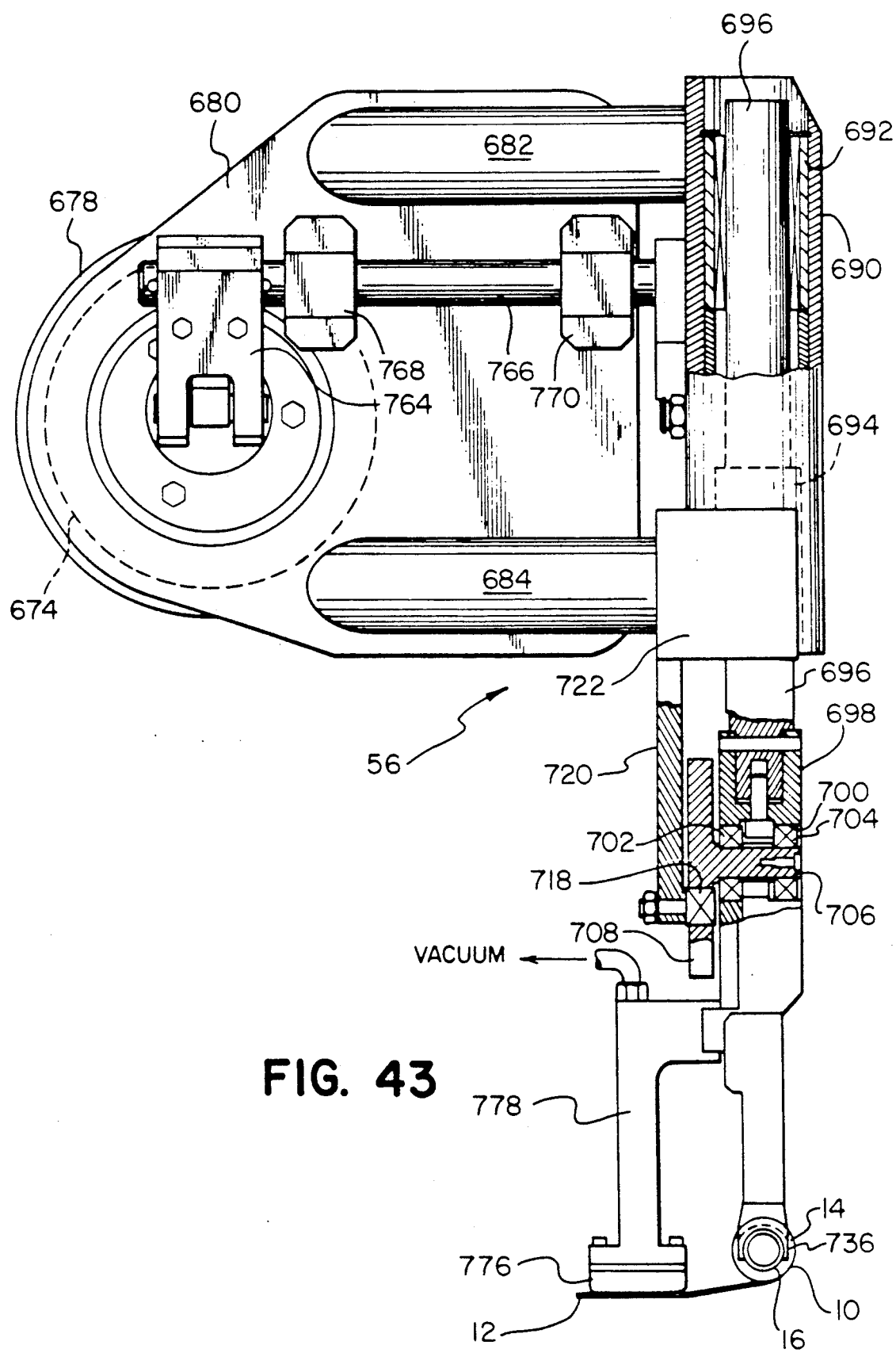
FIG. 43 shows a front elevation view, partially in section, of the mechanism for transferring a prewound spool into a preformed shell.
Figures 45, 46:
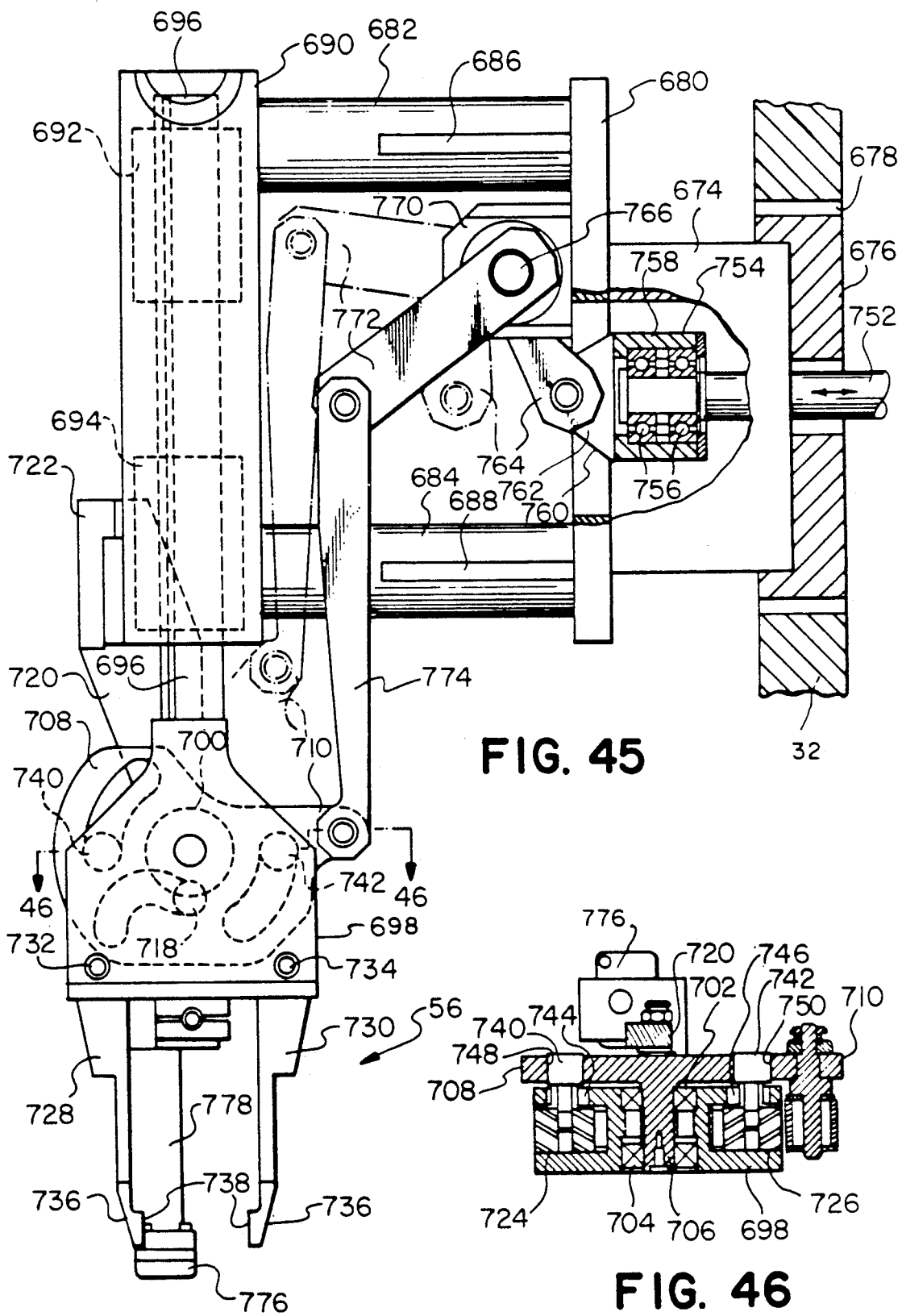
FIG. 45 shows a side elevation view, partially in section, of the mechanism of FIG. 43.
FIG. 46 shows a sectional view taken along line 46—46 of FIG. 45.

When end cap applying mechanism 48 has come to rest, the wound spool transfer mechanism 56 illustrated in FIGS. 43 to 47 is actuated to insert a prewound spool into very open shell 28. Wound spool transfer mechanism 56 comprises a circular frame base 674 which is attached to the output hub of a conventional oscillator 676, through a hole 678 in face plate 32. As shown in FIG. 3, mechanism 56 is positioned to the left of magazine assembly station 52 and above spool winding station 54. A frame plate 680 is attached to the outer end of frame base 674 and extends to the right as illustrated in FIGS. 43 and 44. A pair of support tubes 682, 684 are rigidly attached to frame plate 680 and extend outward at an angle to frame base 674 as shown in FIG. 44. A pair of gusset plates 686,688 complete the attachment of support tubes 682,684 to frame plate 680, as shown in FIGS. 44 and 45. At their outer ends, support tubes 682,684 are rigidly attached to a tubular housing 690 within which a pair of linear bushings 692,694 slidably support a spline shaft 696. Attached to the lower end of shaft 696 is a mounting block 698 having near its center as viewed in FIG. 45 a through bore 700 in which a pair of bearings 702,704 rotatably support the shaft 706 of a cam plate 708. As seen in FIGS. 45 to 47, cam plate 708 comprises a laterally extending arm 710 which is used to actuate the cam in a manner to be described. Just beneath the center of rotation of cam plate 708, as viewed in FIGS. 45 and 47, a sinuous through slot 712 is provided which comprises an arc 714 of constant centerline radius from the center of shaft 706, located close to the circumference of shaft 706; and an arc 716 of steadily increasing radius from the center of shaft 706. As shown in FIG. 47, the centerline of arc 716, shown in phantom, is essentially straight following an initial transition from arc 714. A static cam follower roller 718 is positioned within slot 712 by means of a downwardly depending static follower arm 720 which is attached to the lower end of tubular housing 690 by an integral mounting block 722. Due to the configuration of slot 712, pulling upward on laterally extending arm 710 will cause rotation of cam plate 708 in the counterclockwise direction as viewed in FIGS. 45 and 47, thus causing static roller 718 first to roll within arc 714 of constant centerline radius; so that, mounting block 698 remains stationary. However, as cam plate 708 continues to rotate in response to upward force applied to arm 710, static roller 718 is encountered by the essentially straight portion of arc 716 of steadily increasing radius; so that, without further rotation of cam plate 708, mounting block 698 and spline shaft 696 move upward until static roller 718 nears the end of arc 716 when cam plate 708 has reached the position shown in phantom in FIG. 45.

As seen in FIGS. 44 and 46, mounting block 698 is provided in its side surfaces with axial through slots 724,726 which extend from the bottom surface to the upper surface of the mounting block. Within slots 724,726 are pivotably mounted gripping fingers 728,730 by means of hinge pins 732,734 located above the lower ends of the slots. As seen in FIG. 43, at their lower ends gripping fingers 728,730 are provided with essentially semicircular fixed jaws 736 sized to fit readily over the hubs 16 of a prewound spool 10 of film. The inner surfaces of the lower ends of gripping fingers 728,730 are provide with flat surfaces 738 to frictionally engage flanges 14 of each spool, as shown in FIG. 45. Above flat surfaces 738, the gripping fingers are provided with reduced crossections to make them somewhat resilient, thus minimizing the chance for damaging a spool as the fingers close.

At their upper ends, gripping fingers 728,730 are provided with movable cam follower rollers 740,742 whose support axles extend, as shown in FIG. 46, through arcuate slots 744,746 in the side walls of slots 724,726 to permit rollers 740,742 to engage arcuate slots 748,750 in cam plate 708. Refering to FIG. 47, the center line radius of arcuate slot 750 from the center of shaft 706 is somewhat longer at the upper end of the slot than at the lower; while for arcuate slot 748, it is the center line radius at the lower end that is longer. Because of this change in centerline radius along slots 748,750, rotation of cam plate 708 in the counter clockwise direction in the manner previously described will cause the upper ends of gripping fingers 728,730 to move toward one another, thereby causing the flat surfaces 738 at the lower ends of the gripping fingers to move apart and releasing any spool previously held therebetween. When movable rollers 740, 742 near the ends of slots 748, 750 opposite to their positions in FIGS. 45 and 47, the shape of slots 748, 750 causes rollers 740, 742 to dwell so that the gripping fingers do not swing outward into contact with the anvils. At about the same time, static roller 718 enters the straight portion of slot 712; so that, further upward movement of mounting block 698 occurs without rotation of cam plate 708. Then, when cam plate 708 is acted upon by a force downward on laterally extending arm 710, mounting block 698 moves downward while static roller 718 is in the straight portion of slot 712 and stops when static roller 718 encounters the constant radius portion 714 of slot 712, at which time cam plate 708 begins to rotate in the clockwise direction, causing the upper ends of gripping fingers 728,730 to move outwardly and forcing flat surfaces 738 toward one another to grip a spool.

Cam plate 708 is rotated between the positions just described by the mechanism shown in the upper portions of FIGS. 43 to 45. An actuator shaft 752 extends through oscillating drive 676 from a conventional oscillator, not illustrated, which can move the shaft parallel to its axis as indicated by the arrows. Within frame base 674, actuator shaft 752 is operatively connected to a swivel bearing assembly 754 comprising a pair of bearings 756 whose inner races are fixed relative to shaft 752 and whose outer races are held within a bearing body 758. Opposite the end of shaft 752, a cap 760 is attached to bearing body 758 and provided with a flange 762 pivotably connected to an actuator link 764 rigidly attached to a drive shaft 766. A pair of bearing blocks 768,770 support drive shaft 766 and are attached to the front surface of frame plate 680. Drive shaft 766 extends beyond gusset plate 686 as seen in FIG. 44 and at its end is rigidly attached to one end of an intermediate link 772 whose opposite end is pivotably attached to one end of a cam plate link 774 whose opposite end is pivotably attached to laterally extending arm 710 of cam plate 708. Thus when actuator shaft 752 is moved to the left as seen in FIG. 45, drive shaft 766 is rotated clockwise to raise cam plate link 774 to the position shown in phantom, thereby applying a force essentially parallel to spline shaft 696, thus rotating cam plate 708 and translating the assembly of mounting block 698 and cam plate 708 in the manner previously described. Because of the presence of swivel bearing assembly 754, frame base 674, frame plate 680 and everything attached to them may be rotated by oscillating drive 676 while actuator shaft 752 is translating without rotation.

In operation of the mechanism shown in FIGS. 43 to 47, a prewound spool 10 is prepared at spool winding station 54 and presented by means not shown to the position shown in FIG. 43. At this position, the free end of the film strip 12 is acquired by a vacuum foot 776 secured to mounting block 698 by a downwardly depending arm 778. Vacuum applied to foot 776 by means not illustrated holds the free end of the film to prevent the film's unwinding during transfer to magazine assembly station 52. Gripping fingers 728,730 are lowered simultaneously over the hubs of spool 10 and moved laterally into secure engagement with flanges 14. Oscillating drive 676 is then actuated to rotate the assembly counterclockwise, as viewed in FIG. 43, until the prewound spool has been positioned within very open shell 28 held within end cap applying mechanism 48 at magazine assembly station 52. In this position, gripping fingers 728,730 are located outside fixed claws 308,310, thereby leaving the space between the fixed claws for insertion of the jaws of shell closing mechanism 58, as will be discussed subsequently.

SPOOL SKEWER MECHANISMS

Then, the skewer mechanisms shown in FIGS. 48 to 52 are actuated to accurately position the spool for closure of very open shell 28 and application of end caps 24. Just above magazine assembly station 52, face plate 32 supports a frame 780 for the skewer mechanisms provided to properly position prewound spool 10 within very open shell 28. Frame 780 comprises a base plate 782 attached to face plate 32 in front of an opening 784 through face plate 32. Attached to and extended outwardly from base plate 782 are essentially inverted U-shaped side plates 786,788, joined along their upper edges by top plate 790, along their outer edges by end plates 792,794 and along their lower edges by bottom plates 796,798. Base plate 782 is provided with an opening 800 opposite opening 784 in face plate 32. Supported on either side of opening 800 on the back side of base plate 782 is the skewer actuating mechanism 802 illustrated in detail in FIGS. 50 to 52. Mechanism 802 actuates an inboard skewer assembly 804 and an outboard skewer assembly 806. In the latter case, a dog leg, or U-shaped, link 808 extends outward from mechanism 802, upward between side plates 786,788, across the gap defined by the U-shaped side plates and downward through an opening, not illustrated, in bottom plate 798. After an end cap applying mechanism 48 has been indexed into magazine assembly station 52, as illustrated fragmentarily in FIG. 48, wound spool transfer mechanism 56 swings a prewound spool into position between magnetic anvils 566 and in approximate alignment with central bores 572 of the anvils. Mechanism 802 is then actuated to cause inboard skewer assembly 804 to move outwardly a fixed distance and stop with its skewer probe 810 inserted through the end cap 24 held by anvil 566 and into the inboard hub of the prewound spool. Acting through dog leg link 808, mechanism 802 causes outboard skewer assembly 806 to continue to move inwardly until its skewer probe 812 is inserted through the other end cap 24 and into the outboard hub of the prewound spool. To allow for some lateral mispositioning of the prewound spool, to compensate for variability in spool length and also to push the spool against the reference datum provided by the dwelling inboard skewer, outboard skewer probe 812 is enabled to retract somewhat into the housing of skewer assembly 806. Probe 812 is slidably mounted in a bushing 814 and on the opposite side of bushing 814 is provided with a piston 816 which moves in a bore 818 provided in the housing. The side of piston 816 opposite to probe 812 is constantly pressurized with air to provide a force to hold probe 812 outward, the air being permittedto bleed by the piston and escape through a vent passage 820 through the wall of the housing. After the prewound spool has been properly positioned by probes 810,812, shell closing mechanism 58, to be described subsequently, is actuated to close very open shell 28 about the prewound spool. The free end of the film strip 12 thus is held between lips 20c,20t. Wound spool transfer mechanism 56 then releases the spool and withdraws to pick up the next spool. With shell closing mechanism 58 still gripping the closed shell, end cap applying mechanism 48 is then actuated in a manner to be described subsequently, so that end caps 24 are applied to the closed shell. Shell closing mechanism 58 then withdraws, leaving the assembled magazine held by anvils 566. Mechanism 802 then causes skewer assemblies 804,806 to withdraw their probes from the assembled magazine, so that assembly dial 46 can be indexed to end cap staking station 60.

Figure 50:
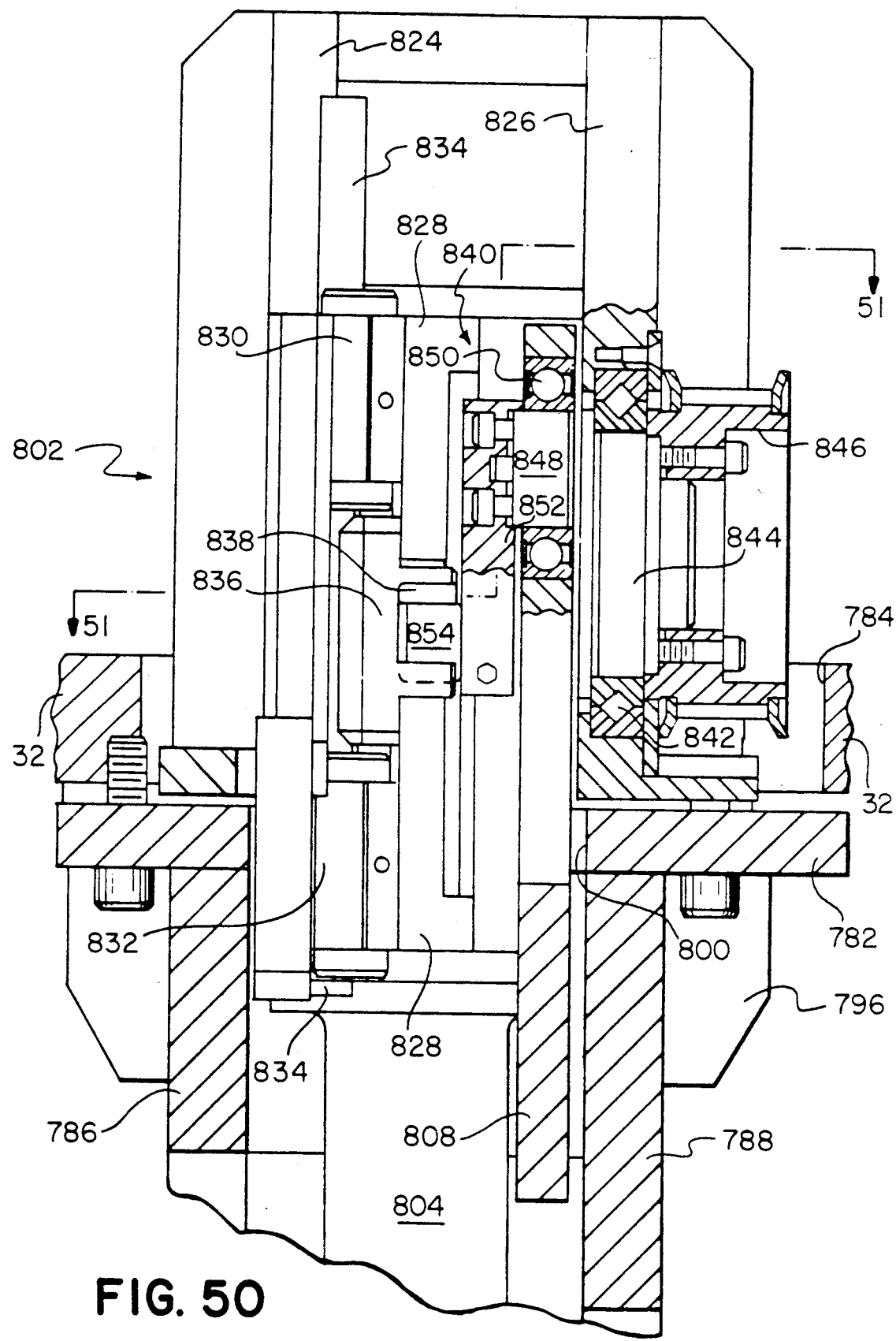
FIG. 50 shows a top view, partially in section, of the actuator mechanism for the mechanism of FIG. 48.
Figure 51:
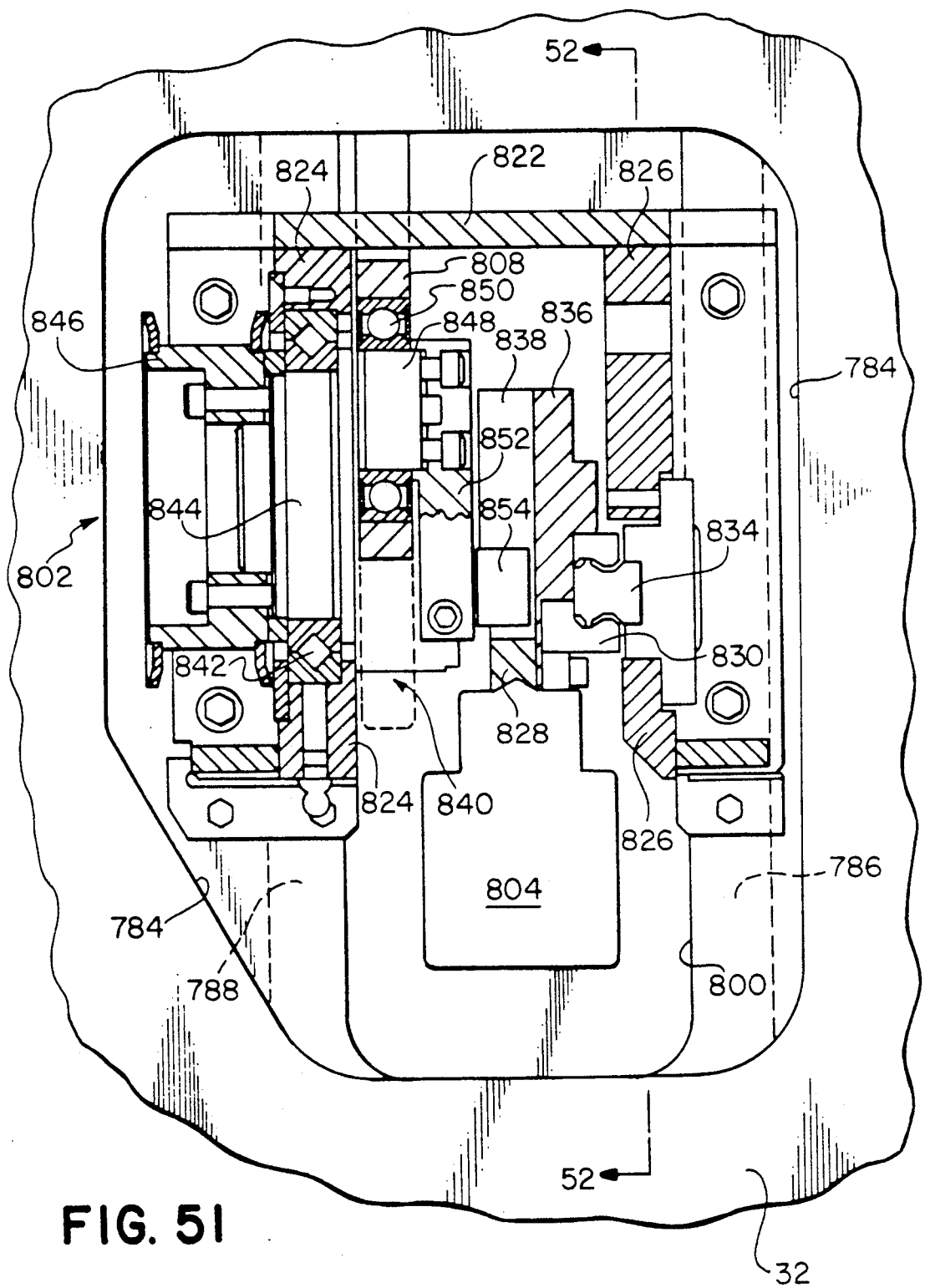
FIG. 51 shows a view taken along line 51—51 of FIG. 50.
Figure 52:
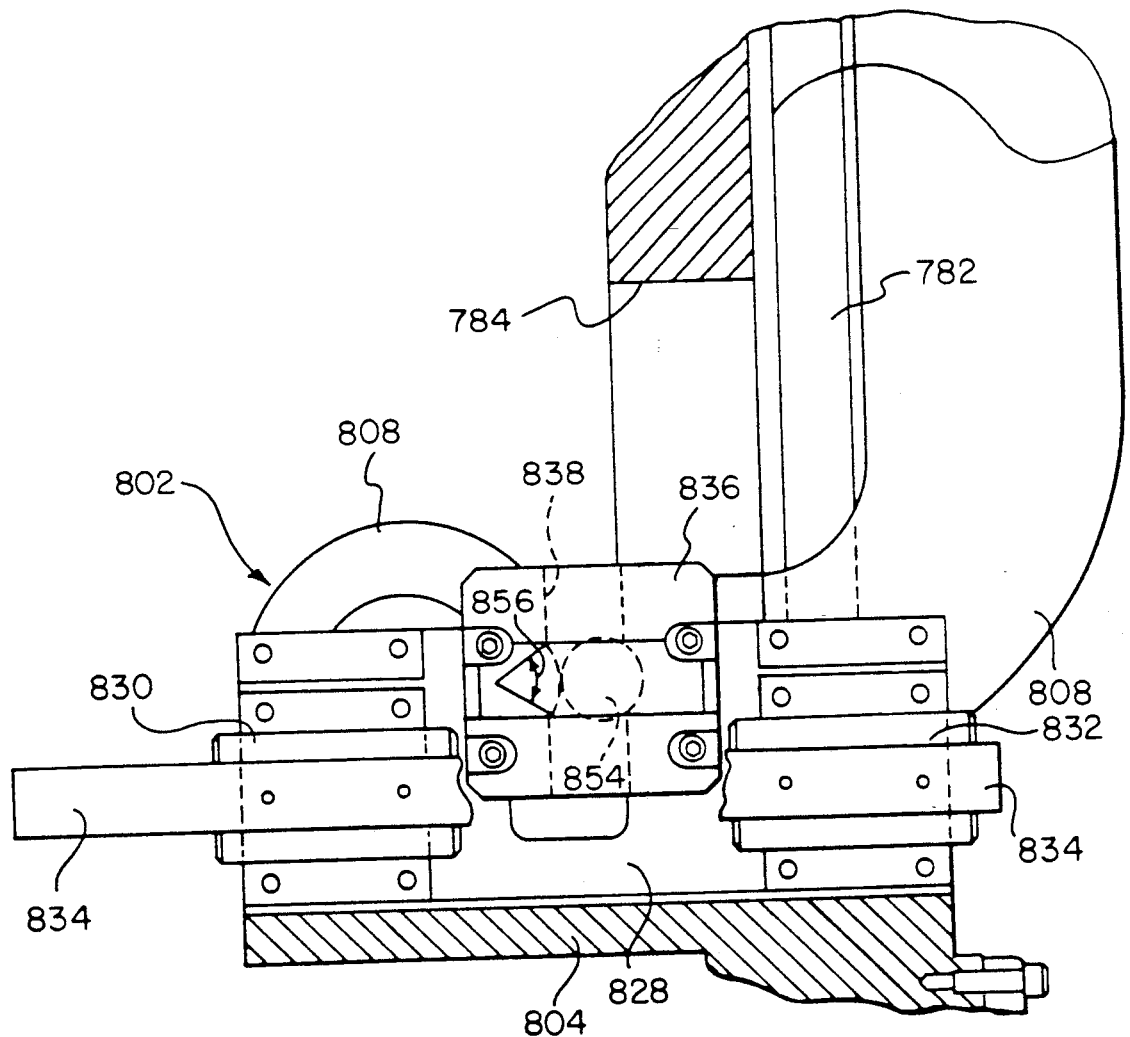
FIG. 52 shows a sectional view taken along line 52—52 of FIG. 51.

FIG. 50 shows a top view, partially broken away, of actuating mechanism 802; FIG. 51 shows a back view, partially broken away; and FIG. 52 shows a view taken along line 52—52 of FIG. 51. The housing for mechanism 802 is attached to the back side of base plate 782 and comprises a top plate 822 and a pair of rigidly attached depending side plates 824,826 between which inboard skewer mechanism 804 is mounted. The housing of mechanism 804 is provided with an upwardly extending mounting flange 828. On the side of flange 828 facing side plate 826 are mounted a pair of slides 830,832 which are slidably engaged with a rail 834 mounted on the side of side plate 826 facing flange 828. Thus mechanism 804 can move back and forth on rail 834. As seen in FIGS. 50 and 52, flange 828 is provided with a notch near its center to fixedly receive a cam block 836 having a sinuous cam slot 838 formed in its side facing side plate 824. Slot 838 extends transverse to the desired direction of movement of skewer assembly 804. To simultaneously move both cam block 836 and dog leg link 808, a double eccentric assembly 840 is mounted in side plate 824. A crank bearing 842 is mounted in side plate 824 and rotatably supports a crank 844 having on its outer end a drive pulley 846 and on its inner end an eccentric throw 848 which supports the inner race of a bearing 850 on whose outer race is mounted the inboard end of dog leg link 808. Drive pulley 846 may be driven by a conventional indexer, not illustrated. To the inner end of throw 848 is fixedly mounted one end of an oppositely eccentric throw or crank arm 852 at whose other end is mounted a cam follower roller 854 which rides in sinuous cam slot 838. Throw 848 and cam follower roller 854 are positioned 180 degrees apart relative to the axis of rotation of crank 844. Thus, as crank 844 is rotated by means not illustrated, the end of dog leg link 808 mounted on bearing 850 and cam block 836 will oscillate back and forth in opposite directions, causing skewer assemblies 804,806 to move into and out of engagement with the spool held by end cap applying mechanism 48. So that inboard skewer assembly 804 will cease movement before outboard skewer assembly 806 in the manner and for the purpose previously described, sinuous cam slot 838 is provided midway with a dwell segment 856 having a radius of curvature equal to that of the path of travel of cam follower roller 854. This causes inboard skewer assembly 804 to move toward the spool until segment 856 is encountered by cam follower roller 854, at which time skewer assembly 804 ceases movement until segment 856 is departed. While cam follower 854 is traversing segment 856 and skewer probe 810 is stationary, throw 848 causes probe 812 to continue to move into the hub of the spool. When probe 812 is properly positioned, mechanism 802 dwells briefly while the magazine is assembled.

Figure 49:
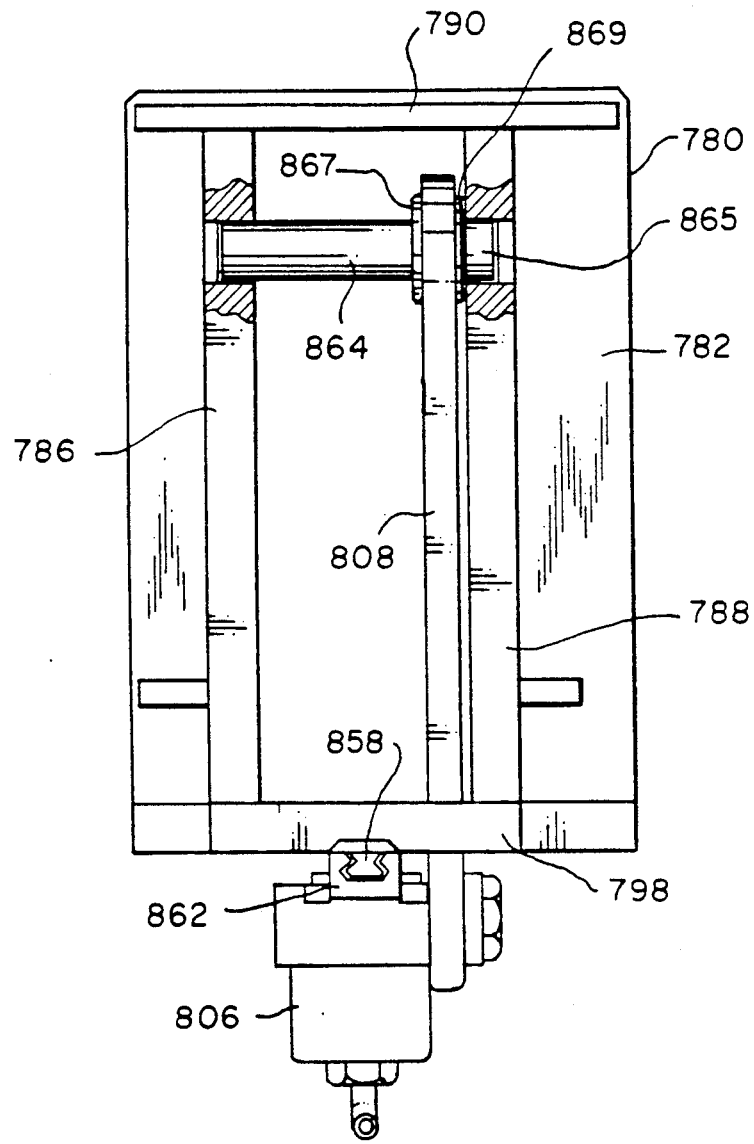
FIG. 49 shows a front elevation view of the mechanism of FIG. 48.

At the other end of dog leg link 808, as seen in FIGS. 48 and 49 outboard skewer assembly 806 is mounted to the underside of bottom plate 798 by means of a rail 858 mounted on bottom plate 798 and a pair of slides 860,862 mounted on the housing of skewer assembly 806. The end of dog leg link 808 is pivotably attached to the housing of skewer assembly 806 by means such as a spherical bearing. To prevent dog leg link 808 from tipping within frame 780, a pair of coaxial support posts 864,865 are rigidly mounted to side plates 786,788 near the upper end of the portion of link 808 which extends downwardly to skewer assembly 806. Posts 864,865 rub against wear plates 867,869 attached to opposite sides of link 808 and thus hold link 808 in an upright position during its periodic movements.

SHELL CLOSING MECHANISM 58

Figure 53:
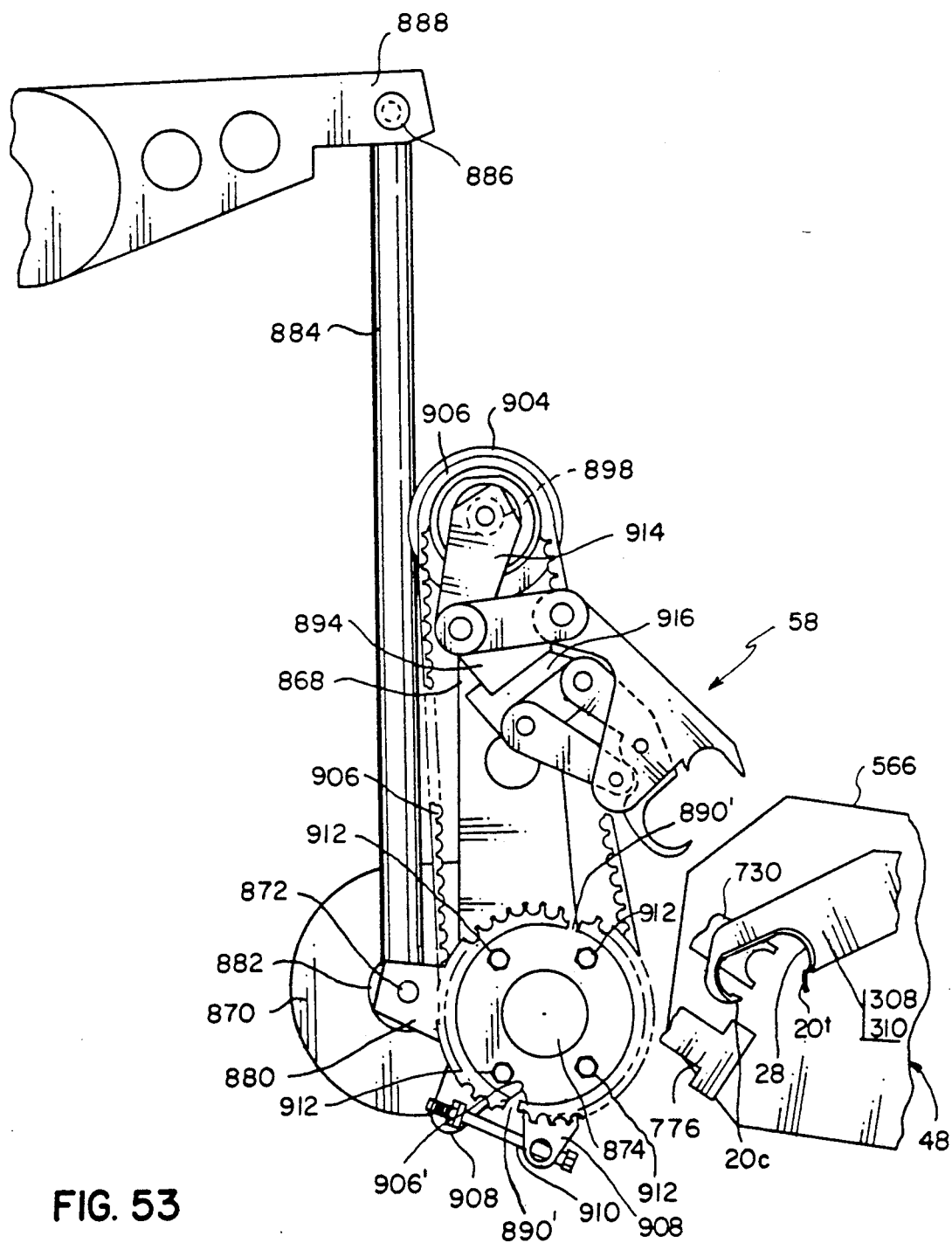
FIG. 53 shows a front elevation view of the mechanism according to the invention for closing a roll formed shell about a prewound spool, in its retracted position.
Figure 54:
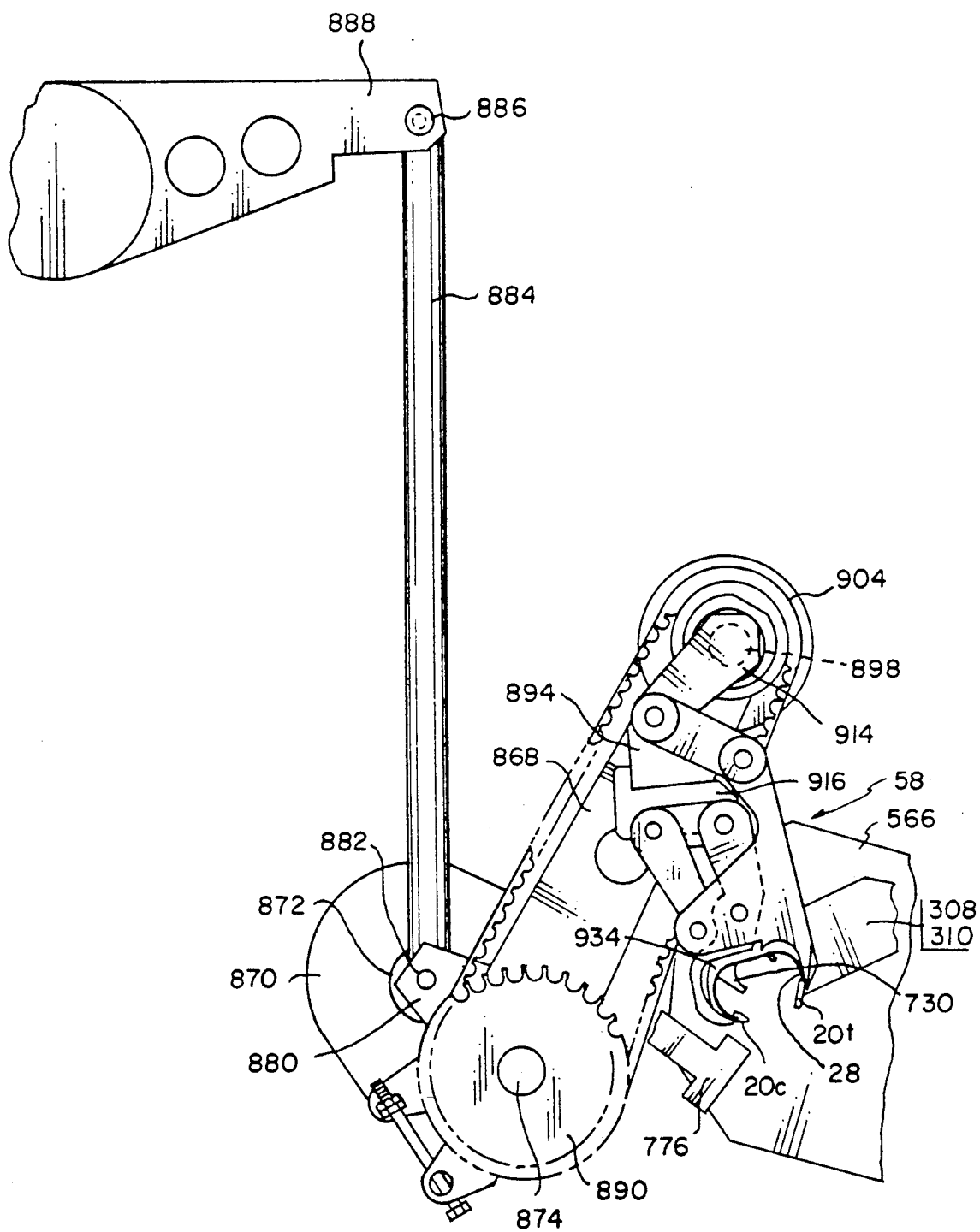
FIG. 54 shows the mechanism of FIG. 53 in its extended, open position.
Figure 55:
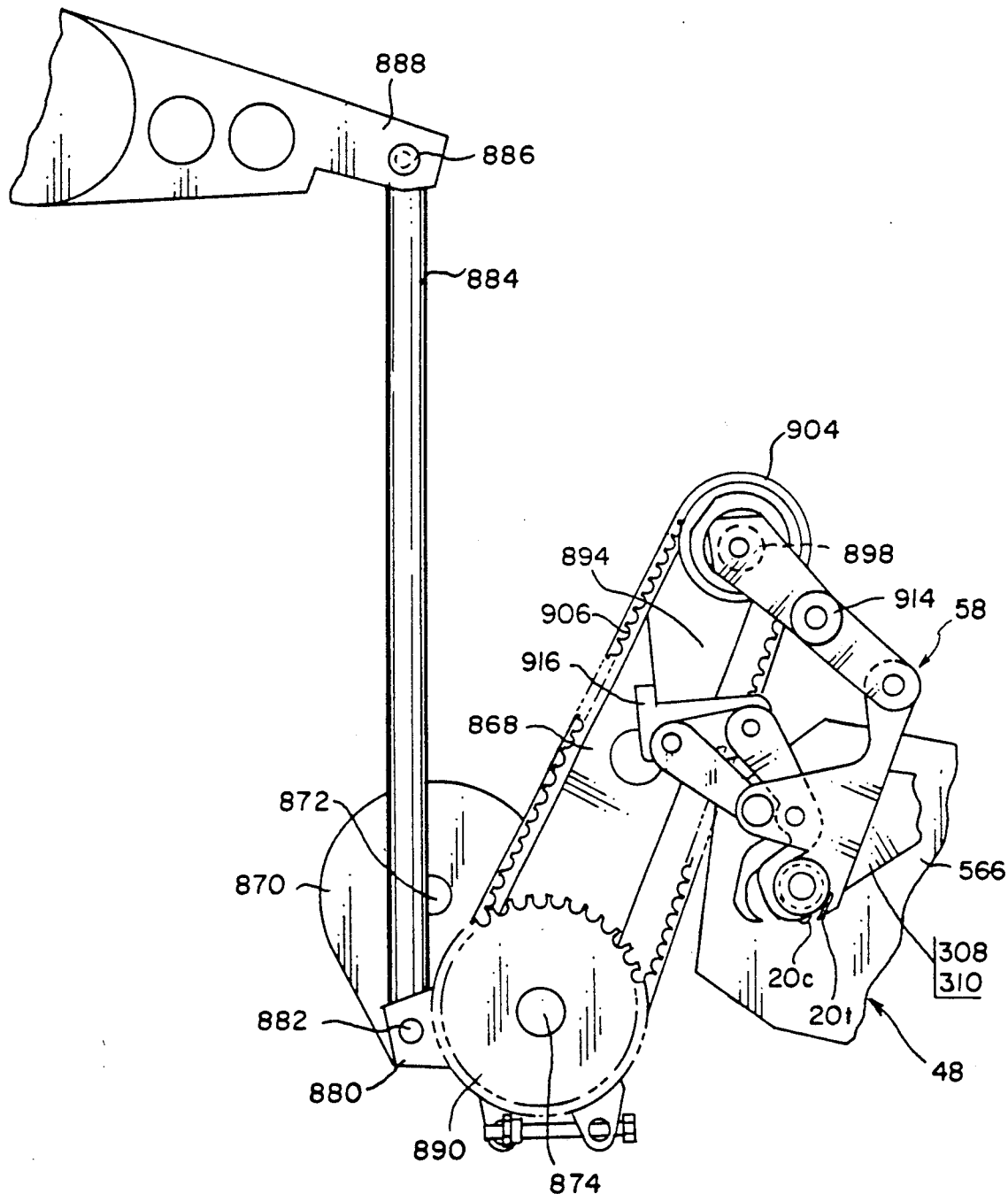
FIG. 55 shows the mechanism of FIG. 53 in its extended, closed position.
Figure 56:
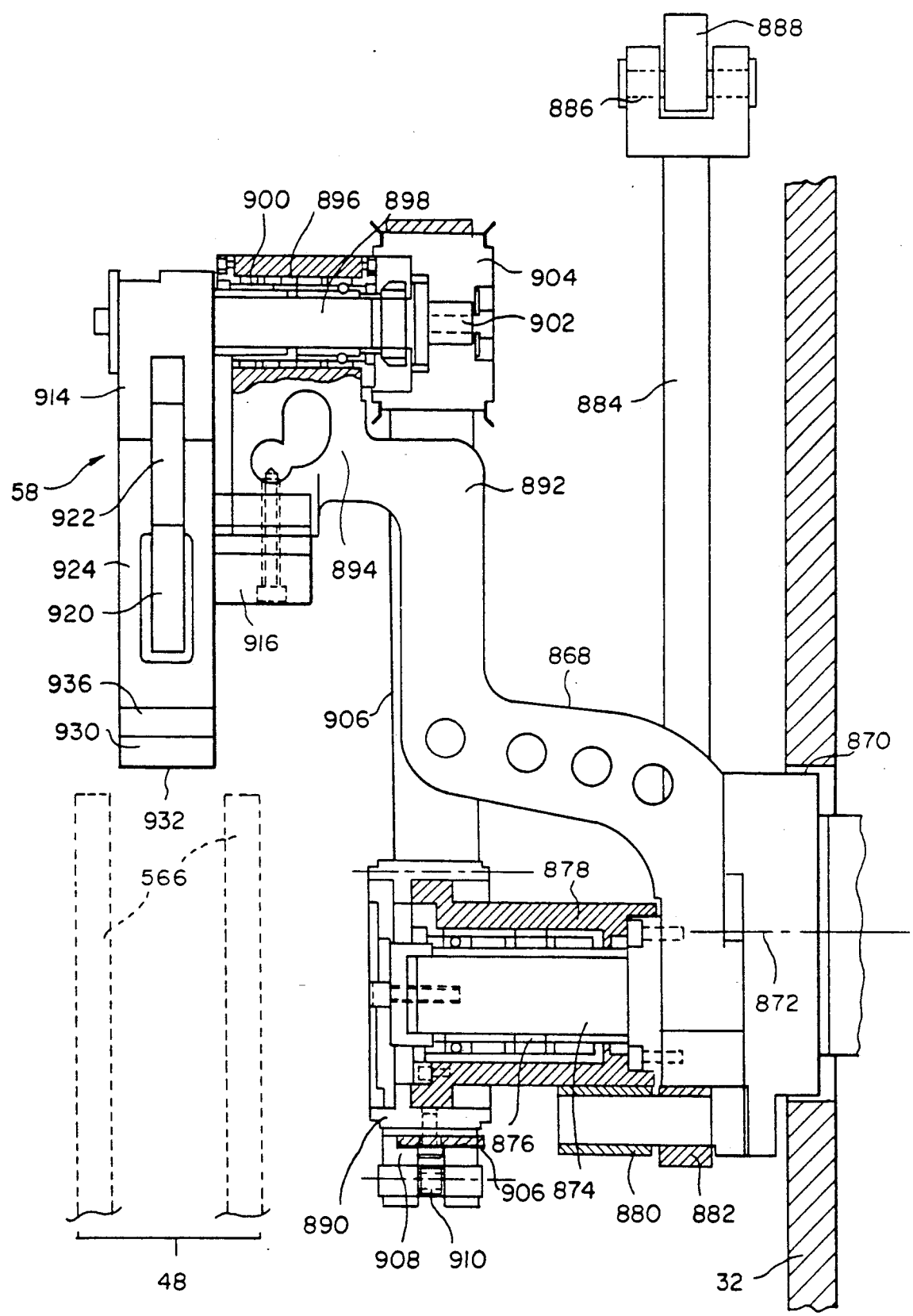
FIG. 56 shows a side elevation view, partially in section, of the mechanism of FIG. 53.

While the probes 810,812 of skewer assemblies 804,806 are properly positioning the prewound spool for closure of the very open shell, shell closing mechanism 58, illustrated in FIGS. 53 to 57, is rotating into position to close the shell. As shown in FIGS. 53 and 56, mechanism 58 comprises an outwardly extending arm 868 having a base flange 870 which is operatively connected to a conventional oscillator, not illustrated, mounted on the opposite side of face plate 32. The center of rotation of base flange 870 is indicated at 872. Offset from center 872, a stub axle 874 is mounted to base flange 870. A roller bearing 876 is supported by stub axle 874 and a sleeve 878 is rotatably mounted on bearing 876. At its end closer to base flange 870, sleeve 878 is provided with a radially extending arm 880, shown rotated into view in FIG. 56, for ease of illustration. Arm 880 is pivotably attached to one end 882 of a connecting rod 884 whose other end 886 is pivotably attached to a rotatable actuator arm 888 operatively connected to a conventional oscillator, not illustrated, mounted on the opposite side of face plate 32. Thus, movement of actuator arm 888 causes arm 880 to rotate sleeve 878, for a purpose to be discussed. At its other end, sleeve 878 is fixedly attached to a timing belt pulley 890 which is shown in FIG. 56 in a position corresponding to FIGS. 53 and 55. Arm 868 dog legs outwardly from base flange 870 above the assembly of shaft 874, sleeve 878 and timing pulley 890 and then radially above timing pulley 890. At the upper end 892 of its radial portion above timing pulley 890, arm 868 is provided with an outwardly extending boss 894 having a through bore 896 parallel to stub axle 874. Within bore 896, a shaft 898 is rotatably mounted on bearings 900. On the end 902 of shaft 898 above timing pulley 890 is fixedly mounted a timing pulley 904 and a timing belt 906 is fitted around pulleys 890 and 904. Thus, rotation of timing pulley 890 due to movement of actuator arm 888 causes shaft 898 to rotate. To facilitate adjustment of the tension in timing belt 906, the outer cylindrical flange of timing pulley 890 is split axially at diametrally opposed locations 890'; and timing belt 906 is cut and clamped at its ends 906' directly to the halves of the split flange. The halves of the flange each are provided with radially outwardly extending flanges 908 between which a tension adjustment bolt 910 extends. By adjusting the circumferential distance between the two flanges 908, the tension in timing belt 906 can be changed. Once the desired tension has been achieved, the halves of the split flange are secured to the body of the pulley by means of bolts 912 which extend through circumferentially elongated slots in the halves of the split flange. Timing of the rotation of the split flange relative to the rotation of radially extending arm 880 may adjusted by conventional means familiar to those skilled in the art, not illustrated.

Figure 57:
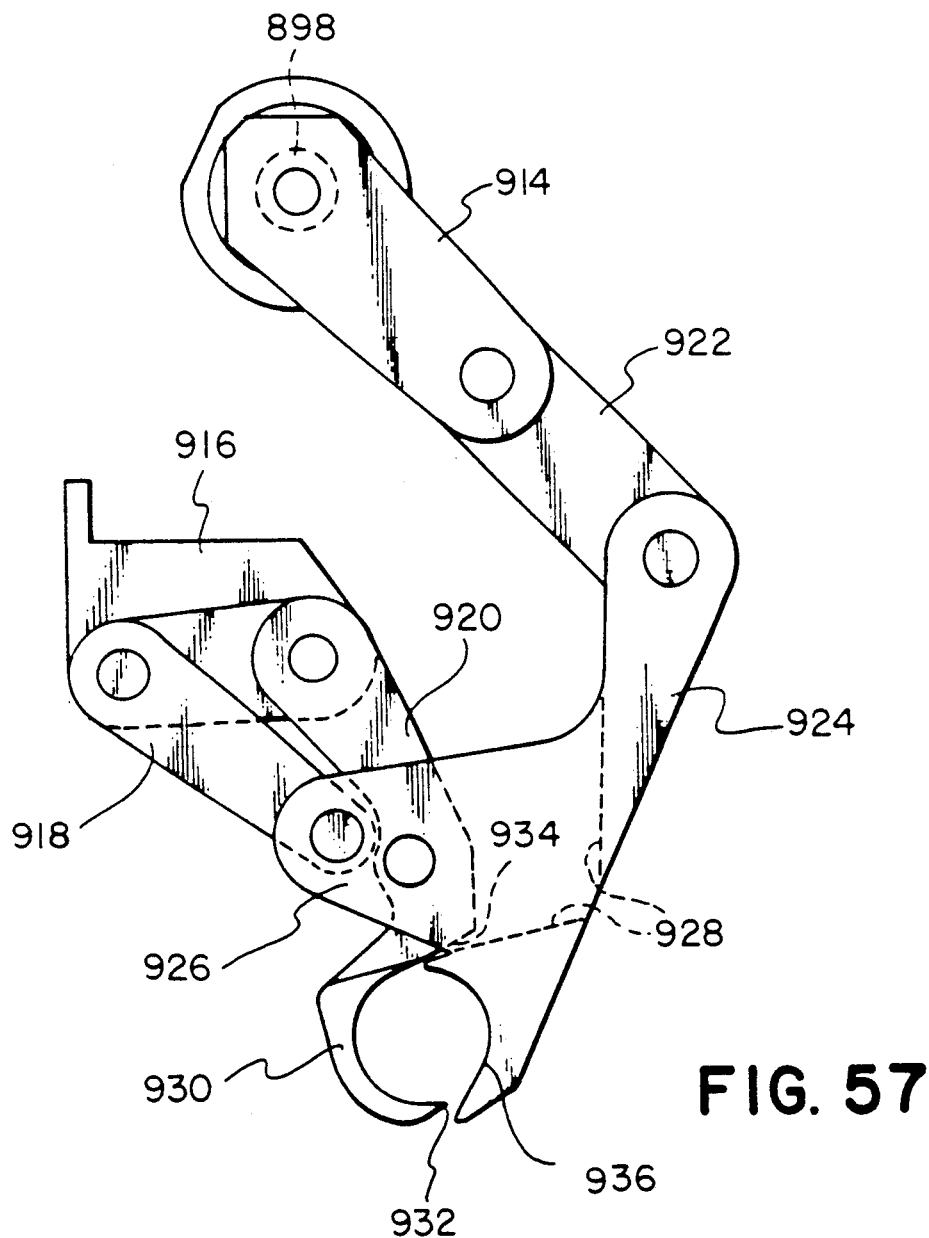
FIG. 57 shows an enlarged elevation view of the shell closing mechanism.

On the end of shaft 898 opposite to timing pulley 904 is fixedly mounted the actuator crank 914 of a linkage which is adapted to close very open shell 28 held within end cap applying mechanism 48, illustrated fragmentarily in FIGS. 53 to 55. The linkage is illustrated in larger scale in FIG. 57. A ground member 916 is attached to the underside of boss 894 and extends laterally beneath crank 914. Pivotably attached to the underside of ground member 916 is a first rocker link 918 and a second rocker link 920. The outer end of crank 914 is pivotably attached to one end of a link 922 whose other end is pivotably attached to a coupler link 924. A pair of attachment flanges 926, only one of which is visible in FIG. 57, extend on either side of a central slot 928 in coupler link 924, shown in phantom, slot 928 being sized to allow the passage of rocker links 918, 920 which are pivotably attached to coupler link 924 between flanges 926. As seen in phantom in FIG. 57, rocker link 920 extends past its pivot of flanges 926 and includes at its outer end an essentially semicylindrical jaw portion 930 having an axial length somewhat less than the spacing between fixed claws 308, 310 of shell removal mechanism 44; so that, jaw portion 930 can pass between fixed claws 308, 310 during closure of very open shell 28. Jaw portion 930 is provided with an inner semicylindrical geometry essentially congruent with that desired for the finished magazine over approximately 180 degrees measured from lip 20c of the very open shell and from an axially extending tip edge 932 for engaging lip 20c. Jaw portion 930 is also provided with a heel portion 934 which extends beyond its cylindrical portion and extends within slot 928 when the mechanism is closed as seen in FIG. 57. Heel portion 934 provides support for the very open shell during closure, thus preventing the formation of a bulge as the shell is closed. See also FIG. 54 where the closure mechanism is open. Beyond slot 928 and opposite jaw portion 930, coupler link 924 is provided with an essentially cylindrical jaw portion 936 with an inner cylindrical geometry which extends on both sides of slot 928 and is essentially congruent with the geometry desired for the finished magazine cover over somewhat less than 180 degrees, to allow for clearance for lips 20c, 20t.

The cycle of operation of shell closing mechanism 58 commences from the position shown in FIG. 53. Actuator arm 888 has been rotated counterclockwise to lift end 882 upwardly, thus rotating timing pulleys 890, 904 and causing actuator crank 914 to pull jaw portions 930, 936 apart. In the illustrated embodiment, pulley 904 must turn about ninety degrees to fully open jaws 930, 936; but pulley 890 turns less since it is somewhat larger in diameter. In the position of FIG. 53, the center of the pivot connecting end 882 to arm 880 coincides with center of rotation 872 of arm 868, thus preventing inadvertent rotation of actuator crank 914 when arm 868 rotates about center 872. As end cap applying mechanism 48 moves into magazine assembly station 52, arm 868 is rotated in synchronism, so that it reaches the position shown in FIG. 54 just as mechanism 48 comes to a stop. To reach this position, separated jaw portions 930, 936 pass between fixed claws 308, 310 and over very open shell 28 where it is held by fixed claws 308, 310. Actuator arm 888 is then rotated clockwise to force end 882 downwardly to the position of FIG. 55, thus rotating timing pulleys 890, 894 and causing actuator crank 914 to force jaw portions 930, 936 together. As the jaw portions move together, they engage very open shell 28 with essentially no relative rotation, thus minimizing any scratching of the surface of the completed magazine. The jaws close the shell to a good cylindrical shape and remain closed until end caps 24 have been installed. After the jaws have closed, the wound spool transfer mechanism 56 releases the hubs of the spool and the tail end of the film and withdraws to pick up the next spool, as previously described.

The mechanism for actuating end cap applying mechanism 48 is illustrated in FIG. 26. A stand off hub 938 is attached to the outer end of central stationary support tube 336 and supports a pair of bearings 940 surrounding the end of actuator shaft 348. A bevel gear 942 is attached to the end of shaft 348 and meshed with a further pair of angularly spaced bevel gears 944, 946 rotatably supported by stand off hub 938 in bearings 948. Bevel gears 944,946 are fixedly attached to stub shafts 950,952 which carry at their outer ends plates 954,956 having diametral slots 958. Plates 954,956 are positioned relative to magazine assembly station 52 and magazine removal station 62, respectively, so that when end cap applying mechanism 48 is indexed into such stations, both slots 958 are entered by a cam follower roller 960, carried by a cam follower arm 962 affixed to the end of crank shaft 474 as shown in FIGS. 32, 33 and 35. Thus, when actuator shaft 348 is rotated by a conventional oscillator, not illustrated, plates 954,956 cause crank shaft 474 to rotate to close the anvils 566 and apply end caps 24 at magazine assembly station 52, and simultaneously to open the anvils 566 to release a completed magazine at magazine removal station 62.

After end cap applying mechanism 48 has been actuated to apply end caps 24 to the closed shell held by cylindrical jaw portions 930,936, actuator arm 888 is rotated counterclockwise to lift end 882 upwardly, thus rotating timing pulleys 890,904 clockwise and causing actuator crank 914 to pull jaw portions 930,936 apart. Due to the configuration of the linkage shown in FIG. 57, jaw portions 930,936 do not contact the closed shell as the jaws open. Simultaneously, skewer assemblies 804,806 are withdrawn in the manner previously described. Finally, arm 868 is rotated back to the position of FIG. 53 to permit assembly dial 46 to index the just assembled magazine to end cap staking station 60.

END CAP STAKING STATION 60

Figure 58:
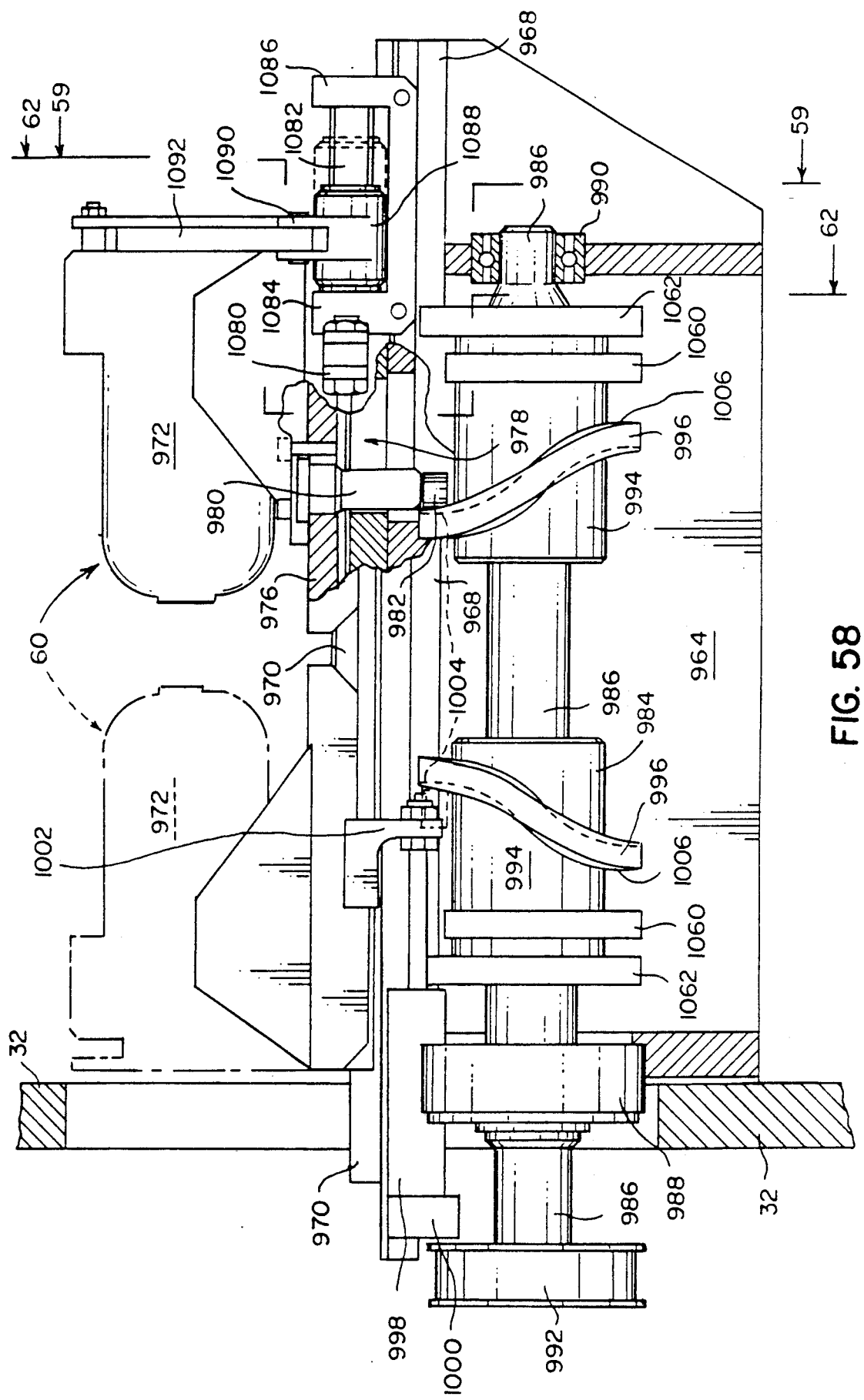
FIG. 58 shows a side elevation view of the mechanism for moving and actuating the staking heads for staking the end caps in place.
Figure 59:
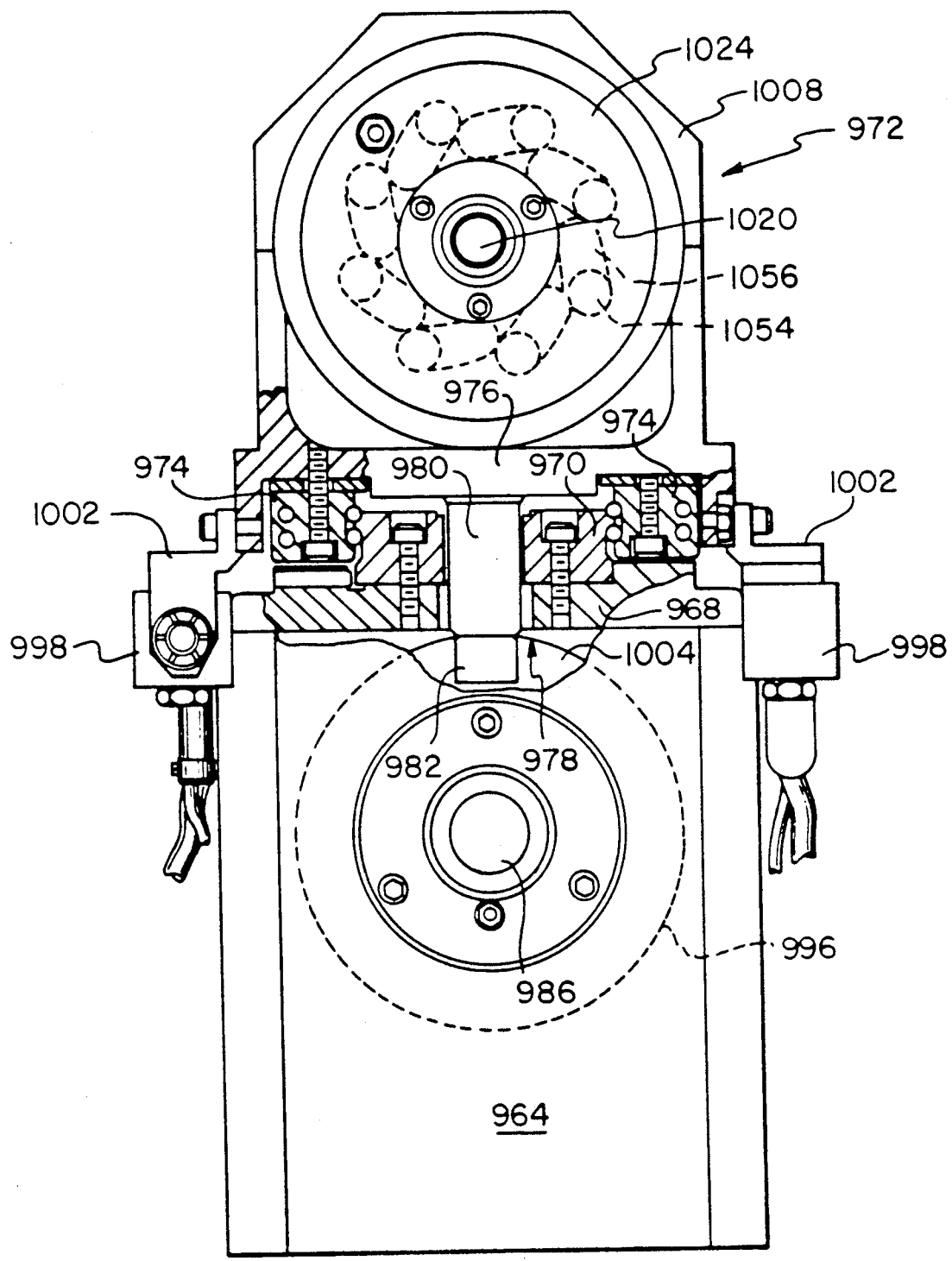
FIG. 59 shows a view taken along line 59—59 of FIG. 58.

FIGS. 58 to 62 illustrate the end cap staking mechanism according to the invention. An outwardly extending box frame 964 is rigidly attached to face plate 32 and comprises an upper plate 968. A slide rail 970 is attached to the upper surface of plate 968 and extends essentially from one end of box frame 964 to the other. A pair of identical end cap stakers 972 are mounted for limited, reciprocating movement along slide rail 970 by pairs of linear bearings 974 which are mounted to the underside of the base plate 976 of stakers 972, as seen in FIG. 59. Beneath each staker 972, slide rail 970 and upper plate 968 are provided with aligned oblong through slots 978, to permit the downward passage of a post 980 attached to base plate 976 as shown in FIGS. 58 and 59. At its lower end, post 980 carries a cam follower roller 982 which engages the drive cam assembly 984 for the staking mechanism.

As shown in FIG. 58, drive cam assembly 984 comprises a shaft 986 rotatably supported at either end by bearings 988,990. A drive pulley 992 is attached to the inner end of shaft 986, for continuous rotation by a conventional means, not illustrated. Beneath each end cap staker 972, shaft 986 supports a barrel cam 994 having a radially outwardly protruding, circumferentially and axially extending vane 996 one side wall of which is constantly in contact with roller 982 in operation. Roller 982 is maintained in contact with vane 996 by means of a pneumatic cylinder 998 whose head end 1000 is attached to frame 964 and whose rod end 1002 is attached to and moves with end cap staker 972. Cylinder 998 is continuously pressurized to maintain contact between roller 982 and vane 996 while barrel cam 994 is rotated with shaft 986. As seen in FIG. 58, the two barrel cams are mirror images of one another; so that, rotation of shaft 986 causes the two end cap stakers 972 to move in opposite directions, toward and away from the end cap applying mechanism 48 which is indexed into and out of position between the two stakers. To achieve this movement, vane 996 extends circumferentially completely around the cam and axially along the cam between diametrically opposed dwell portions 1004,1006 where the stakers stop briefly at their fully inserted and fully withdrawn positions, respectively. Thus, as vane 996 rotates from the position shown in FIG. 58, it forces roller 982 and staker 972 to move away from the illustrated position against the force of cylinder 998, until dwell portion 1006 is reached. Later, when it is necessary to move staker 972 back to the illustrated position, the force of cylinder 998 causes roller 982 to remain in contact with vane 996, causing staker 972 to move in the desired direction until dwell portion 1004 is reached.

Figure 60:
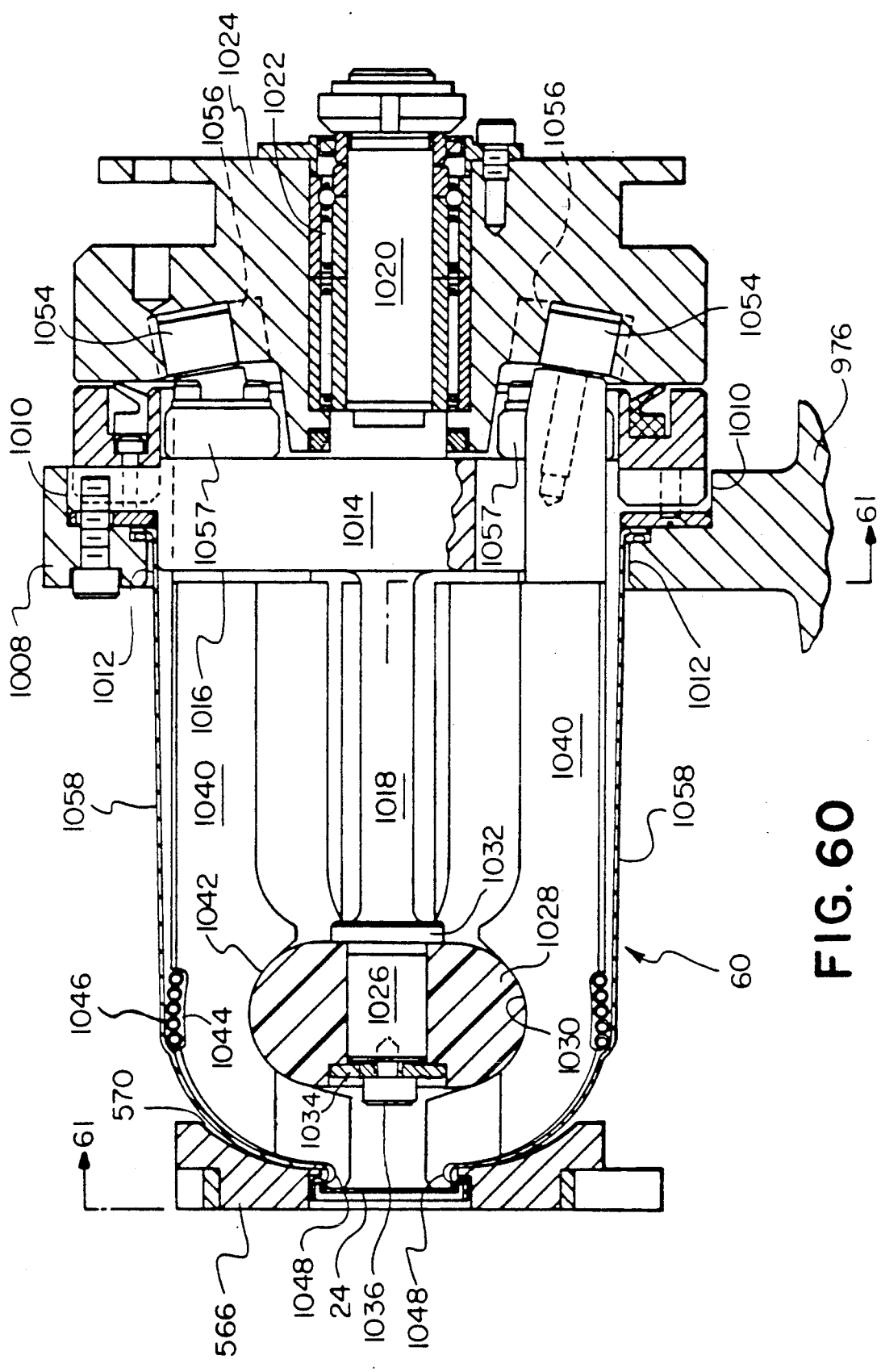
FIG. 60 shows a side elevation view, partially in section, illustrating the interior details of the staking head.
Figures 61, 62:
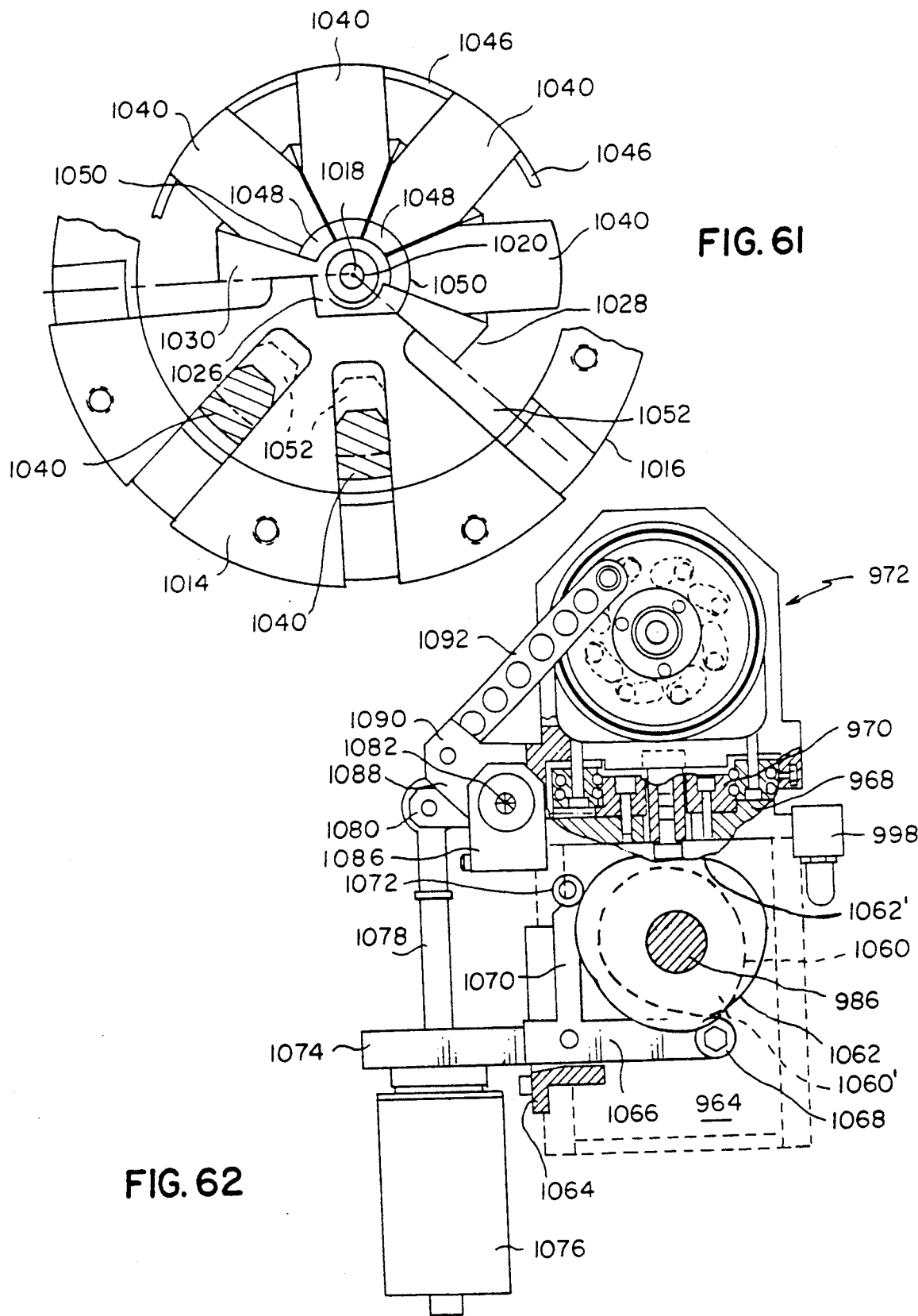
FIG. 61 shows a view taken along line 61—61 of FIG. 60.
FIG. 62 shows a view taken along line 62—62 of FIG. 58.

The details of end cap staker 972 are shown in FIGS. 59 to 62. An upwardly extending mounting flange 1008 is attached to base plate 976. In its outboard surface, mounting flange 1008 is provided with a counter bore 1010 and a through bore 1012 within which a support member 1014 is mounted by means of a plurality of circumferentially spaced bolts. As seen in FIGS. 60 and 61, support member 1014 comprises a central disk 1016 formed integrally with a quill shaft 1018 extended to the left as illustrated and a stub axle 1020 extended to the right. On stub axle 1020, a needle bearing assemble 1022 rotatably supports a staker cam 1024. Quill shaft 1018 provides a degree of flexibility and is provided on its free end with a rectangular portion 1026. On portion 1026 is mounted a pivot ring 1028 of somewhat toroidal configuration which, as shown in FIG. 61, comprises a plurality, eight as illustrated, of contiguous, essentially right cylindrical bearing surfaces 1030 each of which tapers inwardly toward shaft 1018. The axis of each bearing surface 1030 is perpendicular to a radius from the center of quill shaft 1018. Rectangular portion 1026 prevents pivot ring 1028 from rotating about quill shaft 1018. Pivot ring 1028 abuts a flange 1032 on quill shaft 1018 and is held in place by a washer 1034 secured by a bolt 1036.

Pivotably mounted on bearing surfaces 1030 are corresponding plurality of elongated staking fingers 1040 each having a cylindrical bearing surface 1042 which rests on one of bearing surfaces 1030. The large bearing area between the staking fingers and the pivot ring reduces load and extends the operating life of the apparatus. The axis of each bearing surface 1042 is perpendicular to the long axis of the associated staking finger 1040. Each of fingers 1040 is provided on its radially outer surface with a circumferentially extending groove 1044 and a plurality of garter springs 1046 are stretched about the plurality of staking fingers within grooves 1044, to hold the staking fingers securely against pivot ring 1028. At their ends nearer pivot ring 1028, staking fingers 1040 are tapered radially inwardly, as seen in FIG. 61, and are provided with outwardly flaring portions or claws 1048 having circular outer edges 1050 sized to engage the inside diameter of the end flanges on end caps 24 during staking. For ease of illustration in FIG. 60, end cap 24 is shown alone within magnetic anvil 566; however, it will be understood from the foregoing description of the operation of the magazine assembly station 52 that end cap 24 by the time it reaches end cap staking station 60 will have been pressed over the cylindrical end edge of the magazine shell and the nearly completed magazine will continue to be held between magnetic anvils 566.

On the opposite side of pivot ring 1028 from claws 1048, staking fingers 1040 are elongated considerably to extend through a corresponding plurality of circumferentially spaced, radially inwardly extending slots 1052 which pass axially through central disk 1016. At their ends farther from pivot ring 1028, staking fingers 1040 are provided with cam follower rollers 1054 which are received in a corresponding plurality of curved cam slots 1056 in the surface of staker cam 1024 facing central disk 1016, as shown in phantom in FIG. 59 and in full section in FIG. 60. The axis of rotation of each roller 1054 extends along the associated staking finger 1040 and is perpendicular to the axis of the associated bearing surface 1042. Thus, as staker cam 1024 is rotated about stub axle 1020, rollers 1054 ride in cam slots 1056 and cause the ends of staking fingers 1040 to move radially inwardly during staking of an end cap or radially outwardly following staking. On the side of central disk 1016 facing cam slots 1056 and between slots 1052 are mounted wedge shaped bearing blocks 1057 of self lubricating material, which contact and guide the sides of staking fingers 1040. To protect the interior of end cap staker 972 from dust and grit, a thin rubber cover 1058 is captured at its base between mounting flange 1008 and central disk 1020 and provided at its other end with a dome shaped portion sized to fit loosely within the concavity 570 provided in magnetic anvil 566. As illustrated in FIG. 60, the tips of staking fingers 1040 pass through an opening in the dome shaped portion of cover 1058.

The mechanism for rotating staker cam 1024 is illustrated in FIGS. 58 and 62. At each end, outboard of barrel cams 994, shaft 986 supports a pair of plate cams 1060,1062. A flange 1064 is mounted to frame 964, as shown partially in section in FIG. 62. Pivotably mounted to flange 1064 is an L-shaped cam follower having a horizontally extending arm portion 1066 with a cam follower roller 1068 at its end and an integral, vertically extending arm portion 1070 with a cam follower roller 1072 at its end. Roller 1068 rides on the circumference of cam plate 1060 and roller 1072, of cam plate 1062. The circumferential surfaces of cam plates 1060 and 1062 are configured so that, when shaft 986 rotates clockwise as seen in FIG. 62, rollers 1068 and 1072 will remain always in contact with their respective cams and will move synchronously back and forth as the cams rotate. On most of their circumferences, cam plates 1060, 1062 have constant radii so that portions 1066, 1070 remain stationary; however, cam plate 1060 is provided with a radially outwardly projecting lobe portion 1060' which forces roller 1068 outward and then inward, while cam plate 1062 is provided with a radially inwardly projecting portion 1062' which causes roller 1072 to move inward and then outward. As will be apparent from FIG. 62, the combined effect of portions 1060' is to cause the L-shaped cam follower to rotate clockwise and then counterclockwise during a portion of each complete rotation of the cam plates.

Opposite the pivot point from roller 1068, the L-shaped cam follower is attached to the main support ring 1074 of a gimbal mount attached to the rod end of a load limiting pneumatic cylinder 1076, which preferably is of the rolling diaphragm type. In operation, the rod 1078 of cylinder 1076 is kept fully extended; so that, as cam plates 1060, 1062 cause the L-shaped cam follower to rotate clockwise and then counterclockwise, the assembly of cylinder 1076 and rod 1078 rises and falls essentially vertically due to the use of the gimbal mount. The upper end of rod 1078 is pivotally attached to a crank lever 1080 which, as seen in FIG. 58, is fixedly attached to one end of a spline shaft 1082 rotatably supported by a pair of spaced brackets 1084, 1086 attached to frame 968. Thus, movement of cylinder 1076 and rod 1078 causes spline shaft 1082 to rotate. Slidably mounted on spline shaft 1082 is a spline bearing assembly 1088 which can slide along and rotate with spline shaft 1082. A crank arm 1090 extends radially from the housing of assembly 1088 and is pivotably attached at its outer end to one end of a link 1092 whose other end is pivotably attached at a peripheral location to staker cam 1024. Thus, as cylinder 1076 and rod 1078 move upward, staker cam 1024 is caused to rotate clockwise as viewed in FIG. 59, thereby causing rollers 1054 to move radially inward to force the opposite ends of staking fingers 1040 radially outward to stake end caps 24 in place.

When end cap applying mechanism 48 has been indexed into end caps staking station 60, barrel cams 994 have withdrawn end cap stakers 972 and rollers 982 are at dwell portions 1006. Continued rotation of barrel cams 994 permits pneumatic cylinders 998 to move each staker toward engagement with the waiting assembled magazine until dwell portion 1004 is reached. As end cap stakers 972 move toward engagement, spline bearing assembly 1088 slides along spline shaft 1082. As outwardly flaring portions 1048 move inside flanges 27 of the end caps, rollers 982 enter dwell portion 1004, thus stopping the movement of the end cap stakers 972. Cam plates 1060, 1062 then cause portions 1066,1070 to rotate clockwise and lift cylinder 1076 and rod 1078 upward. This causes outwardly flaring portions 1048 to move radially outwardly into contact with flanges 27 on end caps 24 to deform them into the shell 18 of the magazine and complete the staking operation. Due to the presence of quill shaft portion 1018, any minor misalignments of the magazine can be accommodated as shaft portion 1018 will flex to permit all of outwardly flaring portions 1048 to make good contact with end caps 24 and thus ensure application of uniformly distributed staking force. Excess travel of the staking fingers is prevented by the presence of load limiting pneumatic cylinder 1076. When the staking fingers have been forced into contact with end caps 24 to a predetermined level of force, further motion will simply cause portions 1066,1070 to lift the body of cylinder 1076 upward along rod 1078, thus preventing overstaking or tool damage. When portions 1066,1070 begin to rotate counterclockwise under the influence of cam plates 1060,1072, the body of the cylinder is lowered along rod 1078 until the rod is again fully extended, after which the assembly of cylinder and rod are lowered as a unit. Once outwardly flaring portions 1048 have been withdrawn upon completion of the staking, continued rotation of barrel cams 994 causes end cap stakers 972 to withdraw until dwell portion 1006 is reached again, thus completing the staking cycle.

MAGAZINE REMOVAL STATION 62

Figure 63:
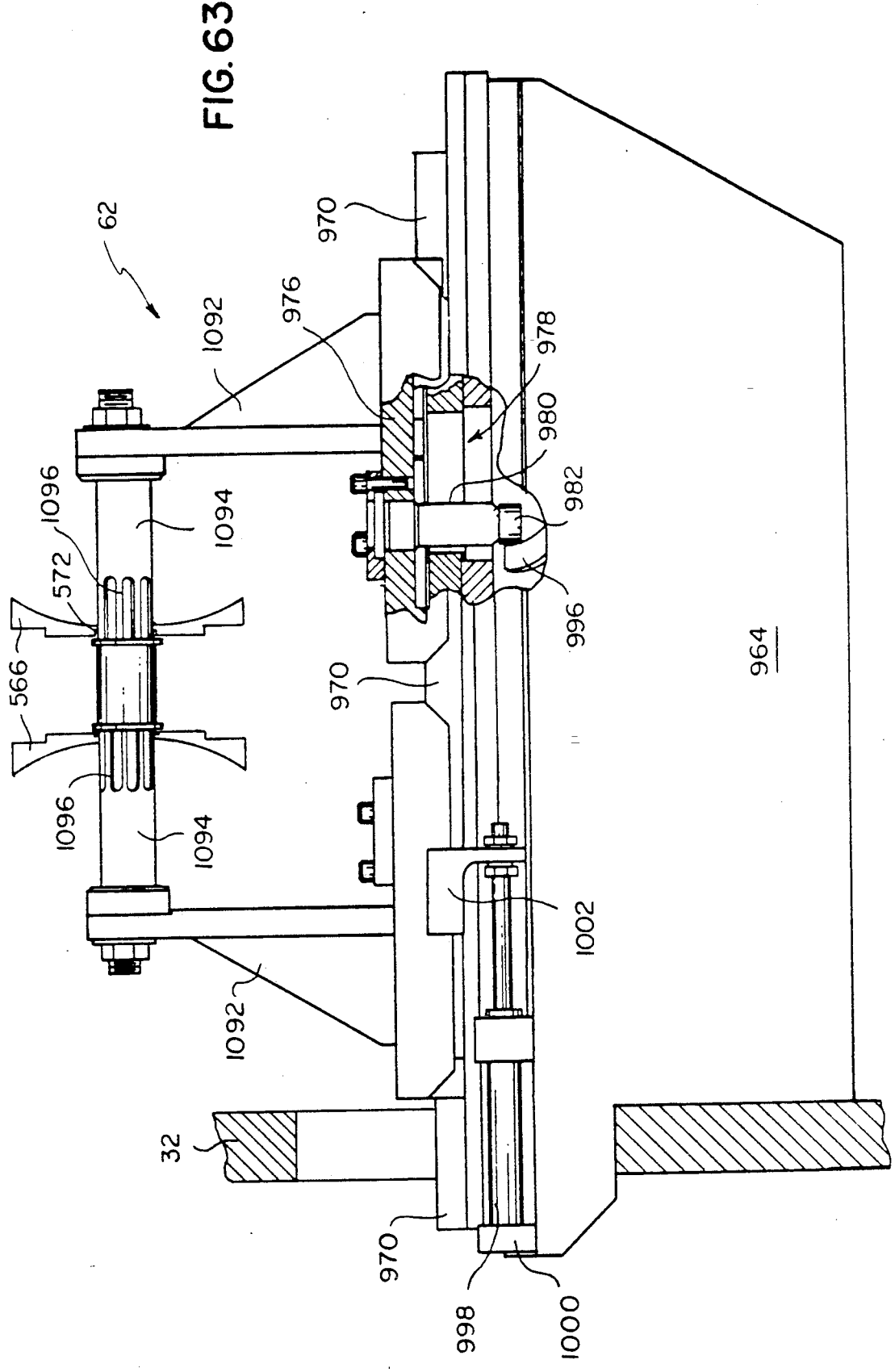
FIG. 63 shows a side elevation view of the mechanism for trapping the ends of completed magazines prior to release of the means for installing the end caps.
Figure 64:
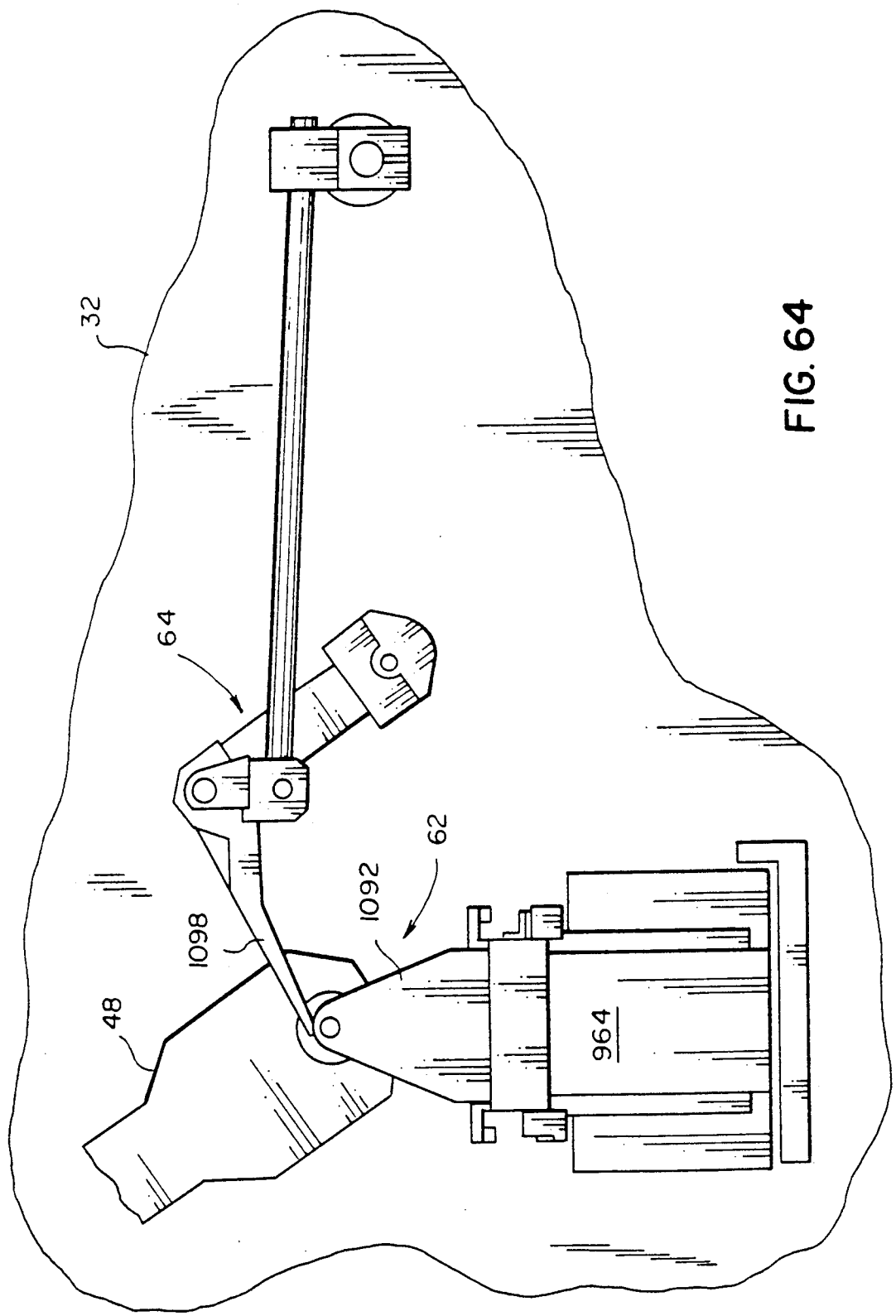
FIG. 64 shows a front elevation view of the mechanism for removing completed magazines.

Assembly dial 46 is then indexed to bring the completed magazine to magazine removal station 62 where cam follower roller 960 of end cap applying mechanism 48 enters slot 958 of the anvil actuating mechanism illustrated in FIG. 26. FIGS. 63 and 64 illustrate mechanisms for ejecting a completed magazine from end cap applying mechanism 48 and removing the magazine for subsequent handling. The cam driven carriage assembly of FIG. 58 is duplicated at magazine removal station 62 from base plate 976 downward, with the exception that cam plates 1060,1072 and their associated followers and linkages for driving the staking mechanism are not required. Attached to the upper surface of base plates 976 are a pair of upwardly extending support brackets 1092 at whose upper ends are mounted horizontally extending ejector probes 1094 which are axially aligned with the completed magazine held by end cap applying mechanism 48. The ends of probes 1094 facing magnetic anvils 566 are provided with a plurality of axially extending splines or flutes 1096 which are sized to pass through notches 576 provided in the central bore 572 of magnetic anvils 566 and into engagement with end caps 24. Counterbores, not illustrated, are provided in the end faces of probes 1094 to accept hubs 16 which project through apertures 26 in end caps 24 in the completed magazine.

After end cap applying mechanism 48 has come to rest between probes 1094, barrel cams 994 are rotated to advance probes 1094 through central bores 572 and into engagement with end caps 24, at which point the probes dwell briefly. Shaft 348 shown in FIG. 26 is then rotated to cause magnetic anvils 566 to move apart to the position illustrated in FIG. 63. Probes 1094 trap the magazine and prevent it from moving with anvils 566. At this point, magazine removal mechanism 64 mounted on face plate 32 and illustrated in FIG. 64 is actuated to advance a magnetic or vacuum probe 1098 which acquires the completed magazine and holds it while barrel cams 994 are rotated to withdraw probes 1094 from central bores 572, leaving the completed magazine held by probe 1098. Mechanism 64 then swings the completed magazine out from between magnetic anvils 566 to permit assembly dial 46 to be indexed to deliver the next magazine to removal station 62. Mechanism 64 then delivers the completed magazine to a suitable receptacle or handling system, not illustrated, for subsequent processing.

Though our invention has been described with regard to the forming and loading of a single magazine, those skilled in the art will understand from the disclosure that the mechanisms of the forming dial and assembly dial are capable, in cooperation with the blank feeding mechanism, the end cap feeding mechanism, the skewer mechanisms, the wound spool transfer mechanism, the very open shell closing mechanism, the staking mechanisms and the magazine removal mechanism, of sequentially forming a plurality of magazines, with various magazines being in different states of completion at any one time. The synchronization of the various indexers and oscillators disclosed for operating the dials and other mechanisms to achieve such operation is well within the skill of those in the mechanical arts.

While our invention has been shown and described with reference to particular embodiments thereof, those skilled in the art will understand that various modifications in form and detail of the apparatus and method may be made without departing from the scope and spirit of our invention.

Having thus described our invention in sufficient detail to enable those skilled in the art to make and use it, we claim as new and desire to secure Letters Patent for:

1. A method of forming and loading a substantially cylindrical magazine for a prewound spool of a strip of material, comprising the steps of:
providing a prewound spool;
providing a substantially rectangular metal blank for the side wall of such substantially cylindrical magazine, said blank having an opposed pair of strip withdrawal lips and an opposed pair of end edges;
providing a pair of substantially circular end caps for such magazine;
providing a mandrel having an exterior surface about which said blank may be formed, said exterior surface being configured so that when said blank is formed about said exterior surface from near one strip withdrawal lip to near the other and said blank is then removed from said mandrel, said blank springs to an open form in which said strip withdrawal lips are spaced sufficiently far apart to permit said prewound spool to pass laterally between said strip withdrawal lips;
forming said blank about said mandrel from near one strip withdrawal lip to near the other;
removing said blank from said mandrel following said forming;
laterally inserting said prewound spool between said strip withdrawal lips of said blank;
closing said blank about said prewound spool so that said end edges of said blank form substantially circular edges and said trailing end projects outwardly between said strip withdrawal lips; and
applying one of said end caps to each of said substantially circular edges to complete such magazine.

2. A method according to claim 1, wherein said prewound spool has a trailing end of such strip projecting outwardly therefrom which projects outwardly between said strip withdrawal lips after said blank is closed about said spool.

3. A method according to claim 1, wherein said forming step comprises the steps of:
clamping one of said strip withdrawal lips against said mandrel;
rolling said blank about said mandrel from near said one strip withdrawal lip to near the other; and
clamping said other strip withdrawal lip against said mandrel.

4. A method according to claim 3, wherein said removing step comprises the steps of:
providing a fixture for holding said blank in said open form;
inserting said mandrel into such fixture with said strip withdrawal lips clamped in place;
releasing said strip withdrawal lips to permit said blank to assume said open form within said fixture; and
withdrawing said mandrel from said open form.

5. A method according to claim 4, wherein said closing step comprises the steps of:
providing a pair of jaws having concave cylindrical surfaces for contacting the exterior surface of said blank between said strip withdrawal lips; and
closing said jaws about said blank within said fixture to form said blank into such substantially cylindrical magazine about said spool.

6. A method according to claim 1, wherein said closing step comprises the steps of:
providing a pair jaws having concave cylindrical surfaces for contacting the exterior surface of said blank between said strip withdrawal lips; and
closing said jaws about said blank to form said blank into such substantially cylindrical magazine about said spool.

7. A method according to claim 2, wherein said forming step comprises the steps of:

clamping one of said strip withdrawal lips against said mandrel;

rolling said blank about said mandrel from near said one strip withdrawal lip to near the other; and clamping said other strip withdrawal lip against said mandrel.

8. A method according to claim 7, wherein said removing step comprises the steps of:

providing a fixture for holding said blank in said open form;

inserting said mandrel into such fixture with said strip withdrawal lips clamped in place;

releasing said strip withdrawal lips to permit said blank to assume said open form within said fixture; and withdrawing said mandrel from said open form.

9. A method according to claim 8, wherein said closing step comprises the steps of:

providing a pair of jaws having concave cylindrical surfaces for contacting the exterior surface of said blank between said strip withdrawal lips; and closing said jaws about said blank within said fixture to form said blank into such substantially cylindrical magazine about said spool.

10. A method according to claim 2, wherein said closing step comprises the steps of:

providing a pair of jaws having concave cylindrical surfaces for contacting the exterior surface of said blank between said strip withdrawal lips; and closing said jaws about said blank to form said blank into such substantially cylindrical magazine about said spool.

11. A method of forming and loading a substantially cylindrical container, comprising the steps of:

providing a substantially rectangular metal blank for the side wall of such a substantially cylindrical container, said blank having an opposed pair of side edges and an opposed pair of end edges;

providing a pair of substantially circular end caps for such container;

providing a mandrel having an exterior surface about which said blank may be formed, said exterior surface being configured so that when said blank is formed about said exterior surface from near one side edge to near the other side edge and said blank is then removed from said mandrel, said blank springs to an open noncircular form in which said side edges are spaced apart;

forming said blank about said mandrel from near one side edge to near the other side edge;

removing said blank from said mandrel following said forming;

inserting a product into said open noncircular form;

closing said blank about said product so that said side edges are brought into close proximity and said end edges form substantially circular edges; and applying one of said end caps to each of said substantially circular edges to complete such substantially circular container.

12. A method according to claim 11, wherein said product is inserted axially into said container.

13. A method according to claim 11, wherein said product is inserted laterally into said container.

14. A method according to claim 11, wherein said forming step comprises the steps of:

clamping of said side edges against said mandrel;

rolling said blank about said mandrel from near one side edge to near the other; and clamping said other side edge against said mandrel.

15. A method according to claim 14, wherein said removing step comprises the steps of:

providing a fixture for holding said blank in said open non-circular form;

inserting said mandrel into said fixture with said side edges clamped in place;

releasing said side edges to permit said blank to spring to said open non-circular form within said fixture; and withdrawing said mandrel form said open non-circular form.

16. A method according to claim 15, wherein said closing step comprises the steps of:

providing a pair of jaws having partially concave cylindrical surfaces for contacting the exterior surface of said blank between said side edges; and closing said jaws about said blank within said fixture to form said blank into a substantially cylindrical container about such product.

17. A method according to claim 11, wherein said closing step comprises the steps of:

providing a pair of jaws having partially concave cylindrical surfaces for contacting the exterior surface of said blank between said side edges; and closing said jaws about said blank to form said blank into a substantially cylindrical container about such product.

18. Apparatus for forming and loading substantially cylindrical magazines for prewound spools of strips of material, comprising;

a source of prewound spools;

a source of substantially rectangular metal blanks for the side walls of such substantially cylindrical magazines, each said blank having an opposed pair of strip withdrawal lips and an opposed pair of end edges;

a source of substantially circular end caps for such magazines;

mandrel means for forming said blanks, said mandrel means having an exterior surface configured so that when said blanks are formed about said exterior surface from near one strip withdrawal lip to near the other and said blank is then removed from said mandrel means, said blank springs to a very open shell form in which said strip withdrawal lips are spaced sufficiently far apart to permit such a prewound spool to pass laterally between said strip withdrawal lips;

means for forming said blank about said mandrel means from near one strip withdrawal lip to near the other;

means for removing said very open shell from said mandrel means following said forming;

means for laterally inserting said prewound spool between said strip withdrawal lips of said very open shell;

means for closing said very open shell about said prewound spool so that said end edges of said blank form substantially circular edges; and means for applying one of said end caps to each of said substantially circular edges to complete such substantially cylindrical magazine.

19. Apparatus according to claim 18, wherein said prewound spools each have a trailing end of such strip of material, said spool passes laterally between said strip withdrawal lips with said trailing end projecting between said strip withdrawal lips and said trailing end projects between said strip withdrawal lips after closing of said very open shell.

20. Apparatus according to claim 18, wherein said means for forming comprises:
   a first rotatable dial having an axis of rotation;
   at least one frame attached to said first dial for supporting said mandrel means;
   means for positioning each said metal blank on said mandrel means prior to forming;
   first means mounted on said frame for clamping one of said strip withdrawal lips to said mandrel prior to forming;
   roller means for contacting said metal blank near said one clamped strip withdrawal lip at a first position of said first dial;
   means for moving said roller means about said mandrel means to roll from said metal blank; and
   second means mounted on said frame for clamping the other of said strip withdrawal lips to said mandrel after roll forming.

21. Apparatus according to claim 20, further comprising;
   means for moving said at least one frame parallel to said axis of rotation, at a second position of said first dial spaced from said first position, at which second position said mandrel means is accessible to said means for removing.

22. Apparatus according to claim 21, further comprising:
   means at said second position for releasing said first and second means for clamping to facilitate removal of said blank from said mandrel means.

23. Apparatus according to claim 21, further comprising;
   a circular guide rail fixedly positioned concentric with said axis of rotation and in proximity to said first dial, said guide rail having a circumferentially extending gap at said second position;
   at least one guide roller mounted on said frame and engaged with said guide rail;
   and said means for moving said at least one frame comprises:
   means connected between said first dial and said frame for permitting said frame to move essentially parallel to the direction of said axis of rotation; and
   means for grasping said guide roller when said guide roller is positioned at said circumferentially extending gap, for moving said frame to a location at which said mandrel means is accessible to said means for removing, for returning said frame to its former position and for releasing said guide roller.

24. Apparatus according to claim 18, wherein said means for removing comprises:
   a second rotatable dial having a second axis of rotation;
   at least one transfer arm pivotably mounted on said second dial;
   means mounted on said transfer arm for receiving said very open shell from said mandrel means and holding said very open shell;
   means responsive to rotation of said second dial for pivoting said transfer arm to position said means for receiving to receive said very open shell, at said second position of said first dial and at a first position of said second dial; and thereafter for pivoting said transfer arm to reposition said very open shell and said means for receiving to permit insertion of said prewound spool by said means for laterally inserting, at a second position of said second dial.

25. Apparatus according to claim 24, further comprising means mounted on said first dial for positioning said means for receiving to receive said very open shell from said mandrel means.

26. Apparatus according to claim 24, wherein said means for receiving comprises:
   a pair of spaced claw elements having aligned openings through which said mandrel means and said very open shell can pass, said openings being sized to hold said very open shell;
   means connected between said claw elements for maintaining the alignment of said openings; and
   means connected between said means for maintaining and said transfer arm for permitting universal movement of said means for maintaining, whereby said openings may be aligned with said mandrel means.

27. Apparatus according to claim 26, further comprising means mounted on said first dial for positioning said means for receiving to receive said very open shell from said mandrel means.

28. Apparatus according to claim 24, wherein said means for pivoting said transfer arm comprises:
   a cam track surrounding said second axis of rotation; and
   cam follower means connected to said transfer arm and engaged with said cam track for pivoting said transfer arm to position said means for receiving to receive said very open shell and thereafter for pivoting said transfer arm to position said very open shell and said means for receiving for insertion of such prewound spool.

29. Apparatus according to claim 24, wherein said means for applying said end caps comprises:
   at least one pair of relatively movable jaws mounted on said second dial, said movable jaws being positioned one opposite each end of said very open shell and said means for receiving following their repositioning to permit insertion of such prewound spool;
   means located on each of said jaws for holding one of such end caps;
   means positioned adjacent said second dial for placing an end cap in each of said means for holding; and
   means for closing said movable jaws to apply said end caps after actuation of said means for closing said very open shell.

30. Apparatus according to claim 29, wherein said movable jaws comprise:
   a pair of elongated frame members;
   means extending between said frame members for constraining said jaws to parallel movement toward and away from each other; and
   wherein said means for closing said jaws comprises:
   a support frame attached to said second dial;
   a rotatable crank shaft mounted in said support frame and connected to said frame members by oppositely-movable connecting rods; and
   means for rotating said crank to close and open said jaws.

31. Apparatus according to claim 30, further comprising means mounted between said movable jaws for positioning said means for receiving to permit said means for closing to close said very open shell.

32. Apparatus according to claim 29, wherein said end caps are made from magnetic material and said means for holding one of said end caps comprises a pair of magnetic members, one mounted on each of said jaws opposite each end of said very open shell.

33. Apparatus according to claim 29, wherein said means for placing an end cap comprises:
a pair of cap delivery wheels rotatably mounted adjacent to said second dial, each of said wheels comprising peripheral pockets for carrying said caps;
means for feeding caps into said pockets on each of said wheels;
means for sequentially removing a pair of said caps from said wheels and transferring said caps to said means for holding.

34. Apparatus according to claim 33, wherein said means for sequentially removing comprises;
a frame mounted for rotation adjacent to said second dial;
a pair of cap transfer arms pivotably mounted to said frame, each cap transfer arm having an outer end selectively positionable upon rotation of said frame into proximity either with one of said peripheral pockets or with one of said means for holding;
means for selectively pivoting said cap transfer arms toward or away from said peripheral pockets, or toward or away from said means for holding;
means at said outer end of each said cap transfer arm for securing a cap to said outer end; and
means for rotating said frame to position said transfer arms alternately in proximity with said peripheral pockets and with said means for holding.

35. Apparatus according to claim 29, wherein said prewound spools comprise axially extending bores surrounded by axially extending hubs; said end caps comprise bores for rotatably receiving said hubs; and said means for holding comprises a further bore aligned with said bores in said spool and end cap, further comprising:
skewer means located at said second position of said second dial for extending through said bores in said means for holding and said end caps, and into said bores in said prewound spools, and for holding said prewound spools during actuation of said means for closing.

36. Apparatus according to claim 35, wherein said skewer means comprises:
a frame positioned adjacent said second position of said second dial, said frame defining an opening through which said movable jaws can pass as said second dial is rotated to said second position;
a first skewer slidably mounted on said frame on one side of said opening;
a second skewer slidably mounted on said frame on the opposite side of said opening, said first and second skewers being aligned with said bores in said means for holding, said end caps and said bores in said prewound spools; and
means for causing said first and second skewers to move toward each other into said bores to hold said prewound spools and thereafter for retracting said first and second skewers.

37. Apparatus according to claim 36, wherein said means for causing comprises:
a crank member rotatably mounted to said frame, said crank member having first and second oppositely eccentric throws;
a U-shaped link pivotably mounted at one end to said first throw and pivotably mounted at the other end to said first skewer, said U-shaped link extending around said opening in said frame;
a cam plate mounted to said second skewer and provided with a cam slot extending transverse to the direction of movement of said second skewer; and
a cam follower mounted to said second throw and extended into said cam slot,
whereby rotation of said crank member causes said first and second skewers to move toward and away from each other.

38. Apparatus according to claim 37, wherein said cam slot comprises a portion having a radius of curvature equal to that of the path of movement of said cam follower, whereby said second skewer dwells while said first skewer continues to move, as said cam follower moves through said portion of said cam slot.

39. Apparatus according to claim 18, wherein said means for closing comprises:
a pair of closure jaws having concave surfaces for contacting the exterior surface of said very open shell between said strip withdrawal lips;
means for placing said closure jaws in an open configuration about said very open shell; and
means for closing and opening said closure jaws.

40. Apparatus according to claim 29, wherein said means for closing comprises:
a pair of closure jaws having concave surfaces for contacting the exterior surface of said very open shell between said strip withdrawal lips;
means for placing said closure jaws in an open configuration between said relatively movable jaws and about said very open shell; and
means for closing and opening said closure jaws.

41. Apparatus according to claim 26, wherein said means for closing comprises:
a pair of closure jaws having concave surfaces for contacting the exterior surface of said very open shell between said strip withdrawal lips;
means for placing said closure jaws in an open configuration between said spaced claw elements and about said very open shell; and
means for closing and opening said closure jaws.

42. Apparatus according to any one of claims 39, 40 or 41, wherein said means for placing comprises:
an arm rotatably mounted in proximity to said second position of said second dial, said closure jaws being mounted on said arm; and
means for rotating said arm to place said closure jaws;
and said means for closing and opening said closure jaws comprises:
a first pulley mounted for rotation on and relative to said arm;
a second pulley mounted for rotation on and relative to said arm;
a belt extending between said pulleys;
means for rotating said first pulley, whereby said second pulley is rotated simultaneously; and
linkage means actuated by rotation of said second pulley for closing and opening said closure jaws.

43. Apparatus according to claim 42, wherein said means for rotating said first pulley comprises a radially extending arm operatively connected to said first pulley; a connecting rod having a first end and a second end, one end of which is pivotably connected to said radially extending arm and the other end of which is pivotably connected to crank means for raising and lowering said connecting rod to raise and lower said arm and thereby rotate said first pulley.

44. Apparatus according to claim 24, wherein said means for laterally inserting said prewound spool comprises:
- a rotatable frame;
- a mounting block slidably mounted on said rotatable frame;
- a pair of gripping fingers pivotably mounted to said mounting block, said gripping fingers comprising surfaces for engaging and holding the ends of a prewound spool from said source;
- a cam plate mounted for rotation about an axis on said mounting block, said cam plate including first and second arcute slots whose centerline distance from said axis decreases from one end to the other of said slots; and a third sinuous slot having a first portion whose centerline distance from said axis is constant and a second portion whose centerline extends away from said axis;
- first and second cam followers, one mounted on each of said gripping fingers and extended into one of said first and second arcuate slots;
- a third cam follower mounted on said rotatable frame and extended into said third sinuous slot; and
- means for rotating said cam plate to cause said gripping fingers to open or close as said first and second cam followers move through said first and second arcuate slots; and to cause said mounting block to dwell as said first portion of said third sinuous slot moves past said third cam follower and to translate relative to said rotatable frame as said second portion of said third sinuous slot moves past said third cam follower.

45. Apparatus according to claim 44, wherein said means for rotating said cam plate comprises an actuator shaft concentric with the axis of rotation of said rotatable frame; means attached to said actuator shaft for permitting said actuator shaft to translate without rotating while said rotatable frame is rotating; a shaft rotatably mounted on said rotatable frame; linkage means connected to said shaft and connected for rotating said cam plate upon rotation of said shaft; and an actuator link connected between said means for permitting and said shaft, whereby translation of said actuator shaft moves said actuator link to rotate said shaft and actuate said linkage means.

46. Apparatus according to claim 45, wherein said spool comprises a trailing end of such strip projecting outwardly therefrom, further comprising means attached to said mounting block for holding said trailing end to prevent unwinding of said strip during transfer of said spool.

47. Apparatus according to claim 29, further comprising means for deforming said end caps radially into said very open shell at said substantially circular edges to secure said end caps to such magazine.

48. Apparatus according to claim 47, wherein said means for holding comprises a bore aligned with said end cap and said means for deforming comprises:
- a frame positioned adjacent to said second dial;
- a slide rail mounted on said frame and extended essentially parallel to said second axis of rotation;
- a pair of end cap staking mechanisms mounted for reciprocating movement on said slide rail on opposite sides of said means for applying end caps, each said staking mechanism comprising a base plate; a mounting flange attached to said base plate and extended toward said second axis of rotation; a quill shaft supported by said mounting flange and extended toward said bore in said means for holding, said quill shaft having a free end; a pivot ring mounted on said free end; a plurality of elongated staking fingers pivotably supported between their ends by and arranged around said pivot ring; an outwardly flaring portion on the end of each staking finger closer to said bore in said means for holding, said flaring portion being sized to pass through said bore to engage said end cap; a cam follower on the opposite end of each staking finger; cam means engaged with said follower on each staking finger; means for rotating said cam means to cause said flaring portions to move radially inward and outward; and means for causing said staking mechanisms to move toward said means for holding until said flared portions extend through said bore in said means for holding in position to engage said end cap and to move away from said means for holding after said end cap has been staked in place on said substantially circular edges.

49. Apparatus according to claim 48, wherein said means for rotating said cam means comprises a spline shaft mounted on said frame essentially parallel to said slide rail; a spline bearing assembly mounted for sliding movement along and rotation with said spline shaft; a link extending between said spline bearing assembly and said cam means, whereby rotation of said spline shaft causes said cam means to rotate to move said staking fingers; and means mounted on said frame for rotating said spline shaft when said flared portions are in position to engage said end cap.

50. Apparatus according to claim 49, wherein said means for rotating said spline shaft comprises a crank lever attached to said spline shaft; a pneumatic cylinder assembly having a rod end pivotably attached to said crank lever; a gimbal mount supporting the cylinder of said assembly; and means, actuated by said means for causing said staking mechanisms to move, for raising and lowering said assembly by said gimbal mount.

51. Apparatus according to claim 47, wherein said means for holding comprises a bore aligned with said end cap and said means for deforming comprises:
- a frame positioned adjacent to said second dial;
- a slide rail mounted on said frame and extended essentially parallel to said second axis of rotation;
- an end cap staking mechanism mounted for reciprocating movements on said slide rail opposite said means for applying end caps, said staking mechanism comprising a base plate; a mounting flange attached to said base plate and extended toward said second axis of rotation; a quill shaft supported by said mounting flange and extended toward said bore in said means for holding, said quill shaft having a free end; a pivot ring mounted on said free end; a plurality of elongated staking fingers pivotably supported between their ends by and arranged around said pivot ring; an outwardly flaring portion on the end of each staking finger closer to said bore in said means for holding, said flaring portion being sized to pass through said bore to engage said end cap; a can follower on the opposite end of each staking finger; cam means engaged with said follower on each staking finger; means for rotating said can means to cause said flaring portions to move radially inward and outward; and means for causing said staking mechanism to move toward said means for holding until said flared portions extend through said bore in said means for holding in position to engage said end cap and to move away from said means for holding after said end cap has been staked in place on said substantially circular edges.

52. Apparatus according to claim 51, wherein said means for rotating said cam means comprises a spline shaft mounted on said frame essentially parallel to said slide rail; a spline bearing assembly mounted for sliding movement along and rotation with said spline shaft; a link extending between said spline bearing assembly and said cam means, whereby rotation of said spline shaft causes said cam means to rotate to move said staking fingers; and means mounted on said frame for rotating said spline shaft when said flared portions are in position to engage said end cap.

53. Apparatus according to claim 52, wherein said means for rotating said spline shaft comprises a crank lever attached to said spline shaft; a pneumatic cylinder assembly having a rod end pivotably attached to said crank lever; a gimbal mount supporting the cylinder of said assembly; and means, actuated by said means for causing said staking mechanisms to move, for raising and lowering said assembly by said gimbal mount.

* * * * *